INVENTORS
R.F. ALBRIGHTON
AND W.R. SMITH
THEIR ATTORNEY

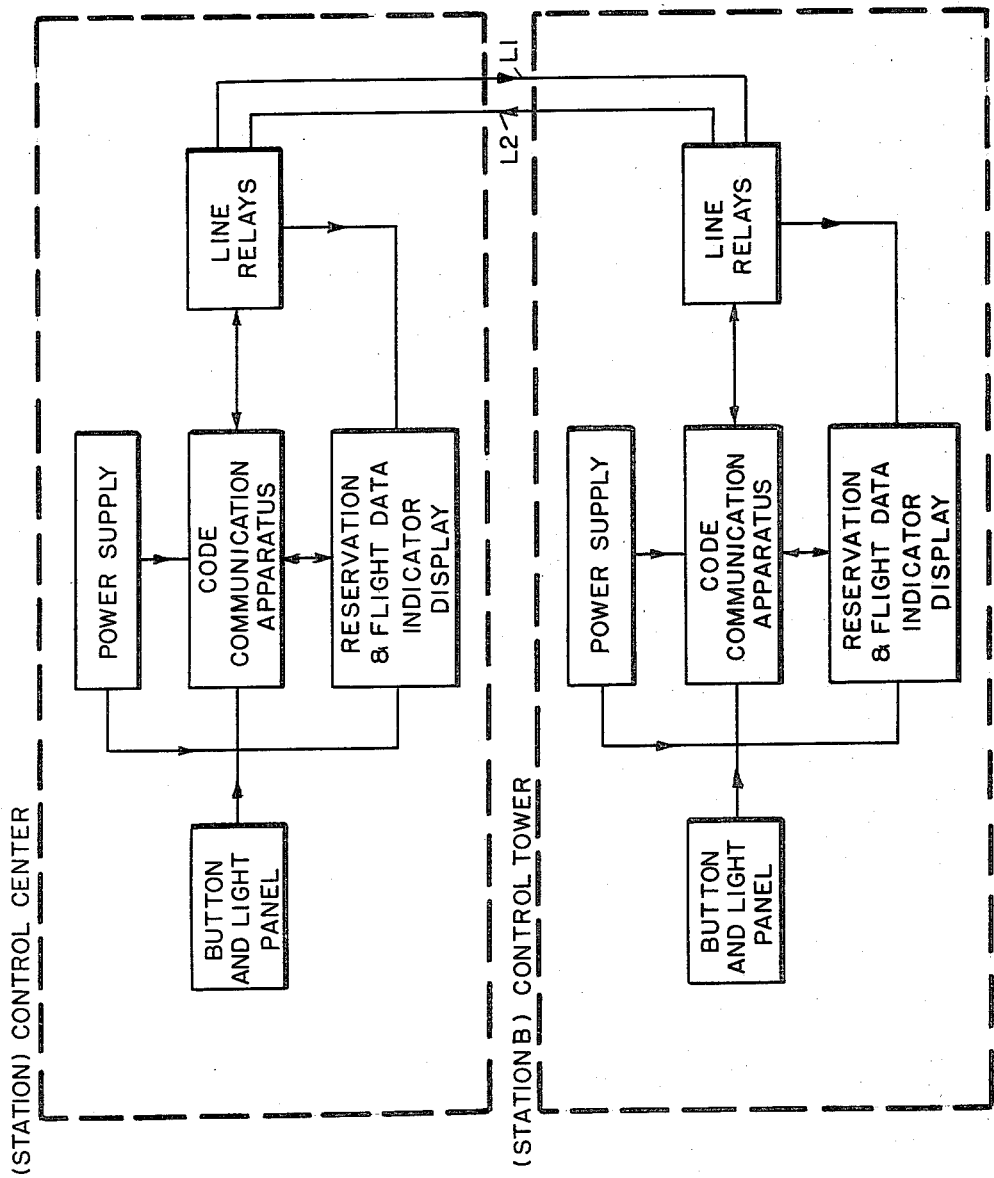

Nov. 5, 1963 R. F. ALBRIGHTON ETAL 3,110,006
AIR TRAFFIC CONTROL SYSTEM
Filed Nov. 9, 1959 30 Sheets-Sheet 5

FIG. 3C.

INVENTORS
R. F. ALBRIGHTON
AND W. R. SMITH
BY
THEIR ATTORNEY

Nov. 5, 1963

R. F. ALBRIGHTON ETAL 3,110,006

AIR TRAFFIC CONTROL SYSTEM

Filed Nov. 9, 1959

INVENTORS
R.F. ALBRIGHTON
AND W.R. SMITH

BY

*Forest D. Hitchcock*

THEIR ATTORNEY

INVENTORS
R. F. ALBRIGHTON
AND W. R. SMITH
BY
THEIR ATTORNEY

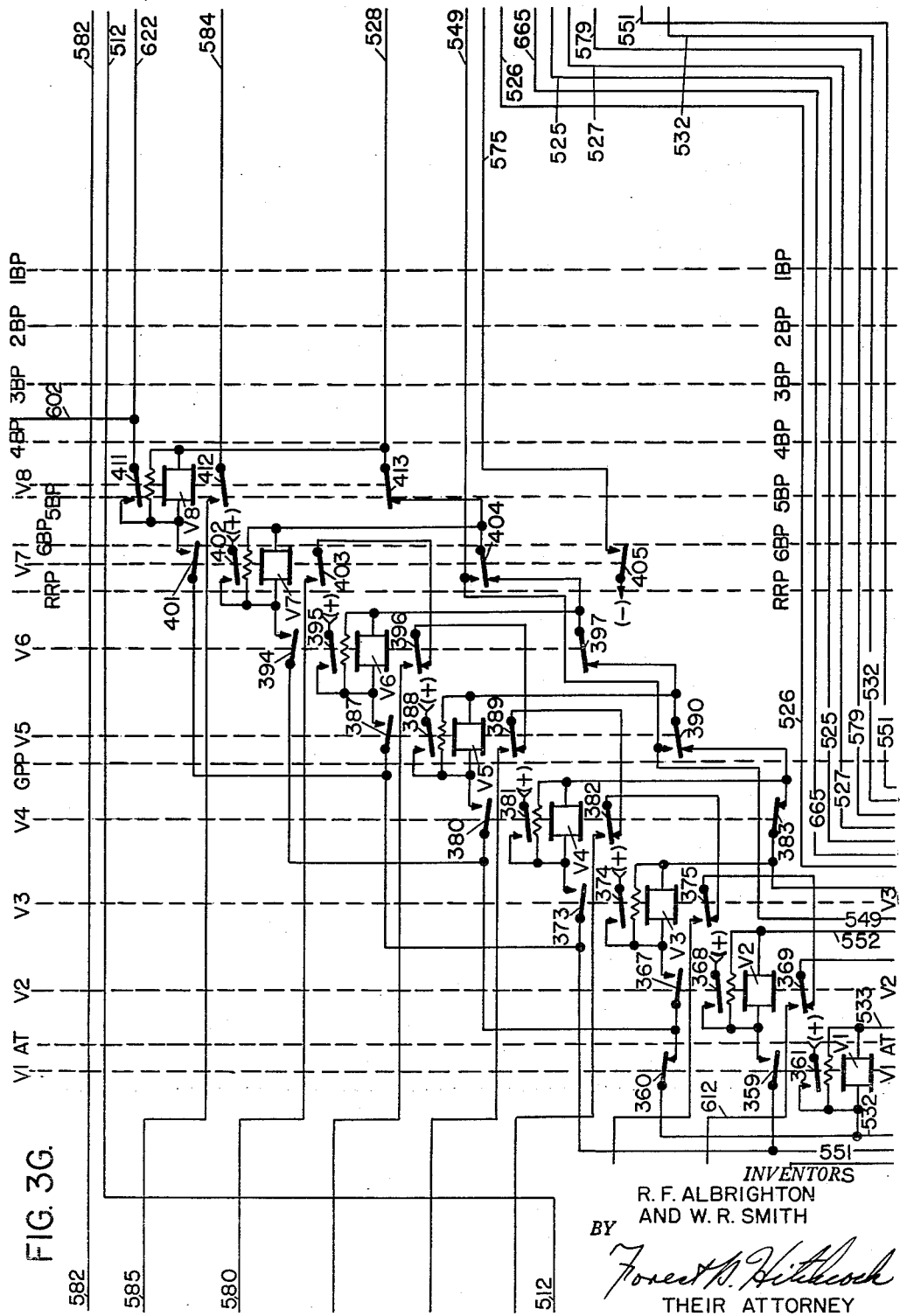

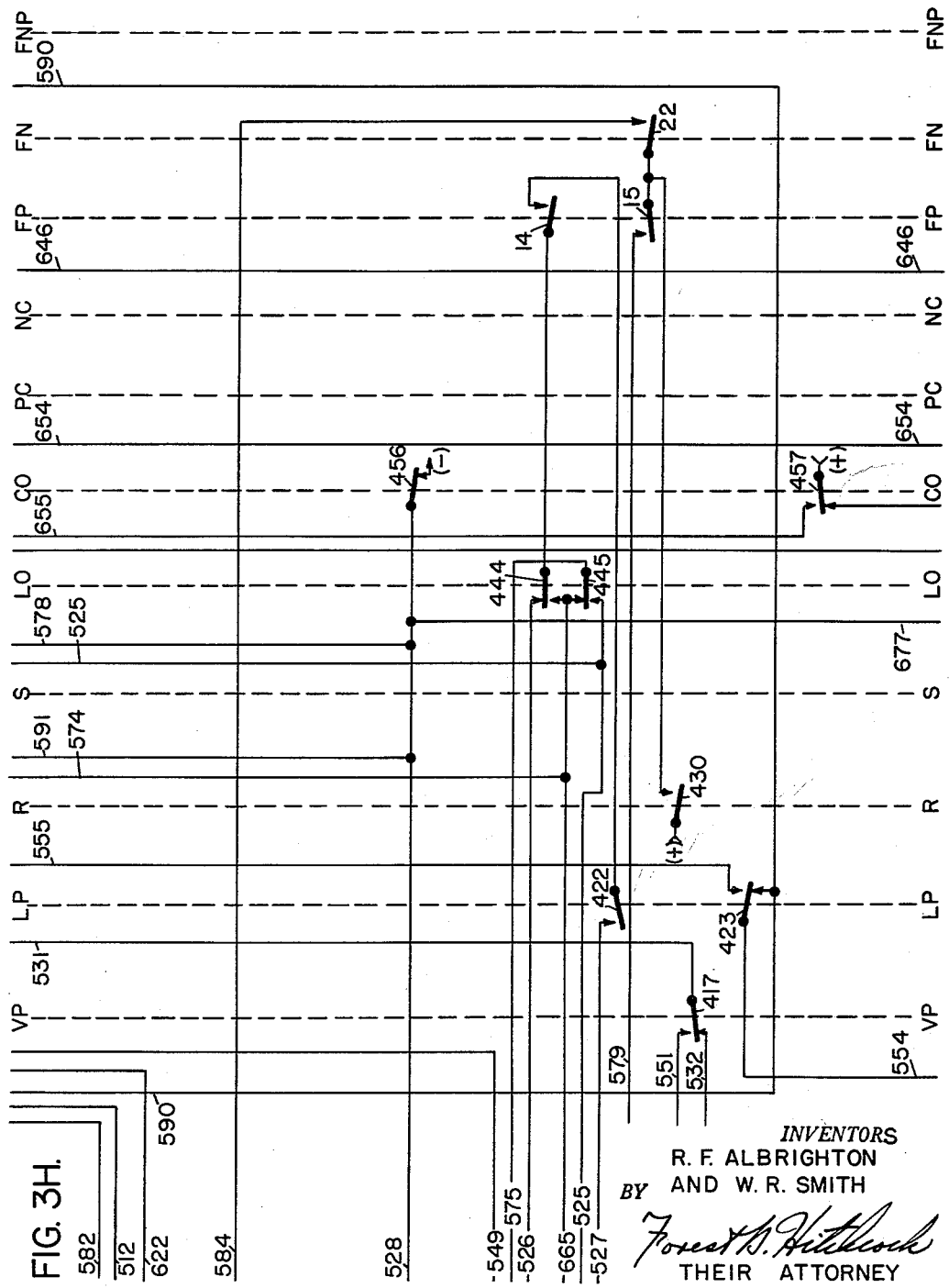

INVENTORS
R. F. ALBRIGHTON
AND W. R. SMITH
BY
THEIR ATTORNEY

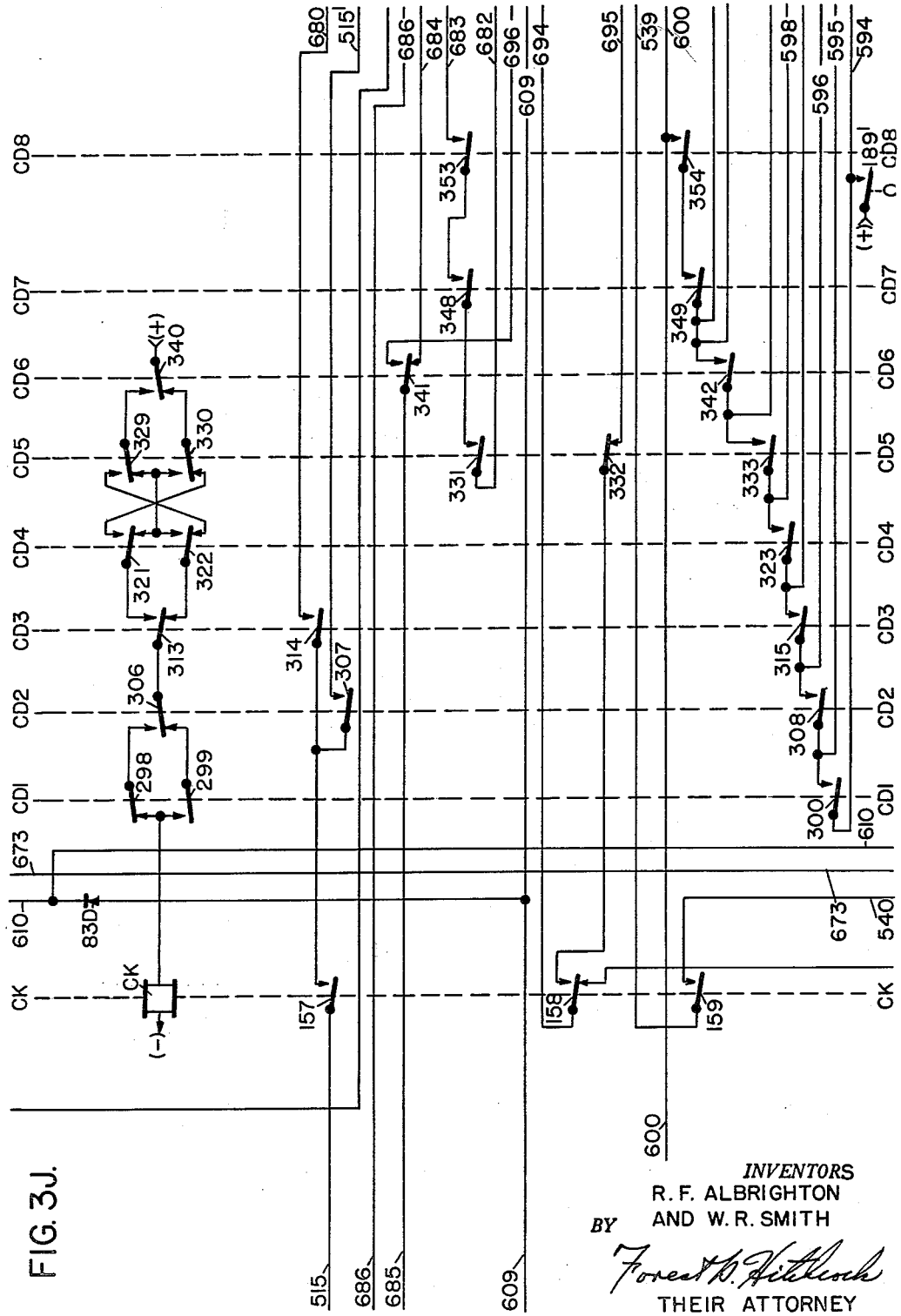

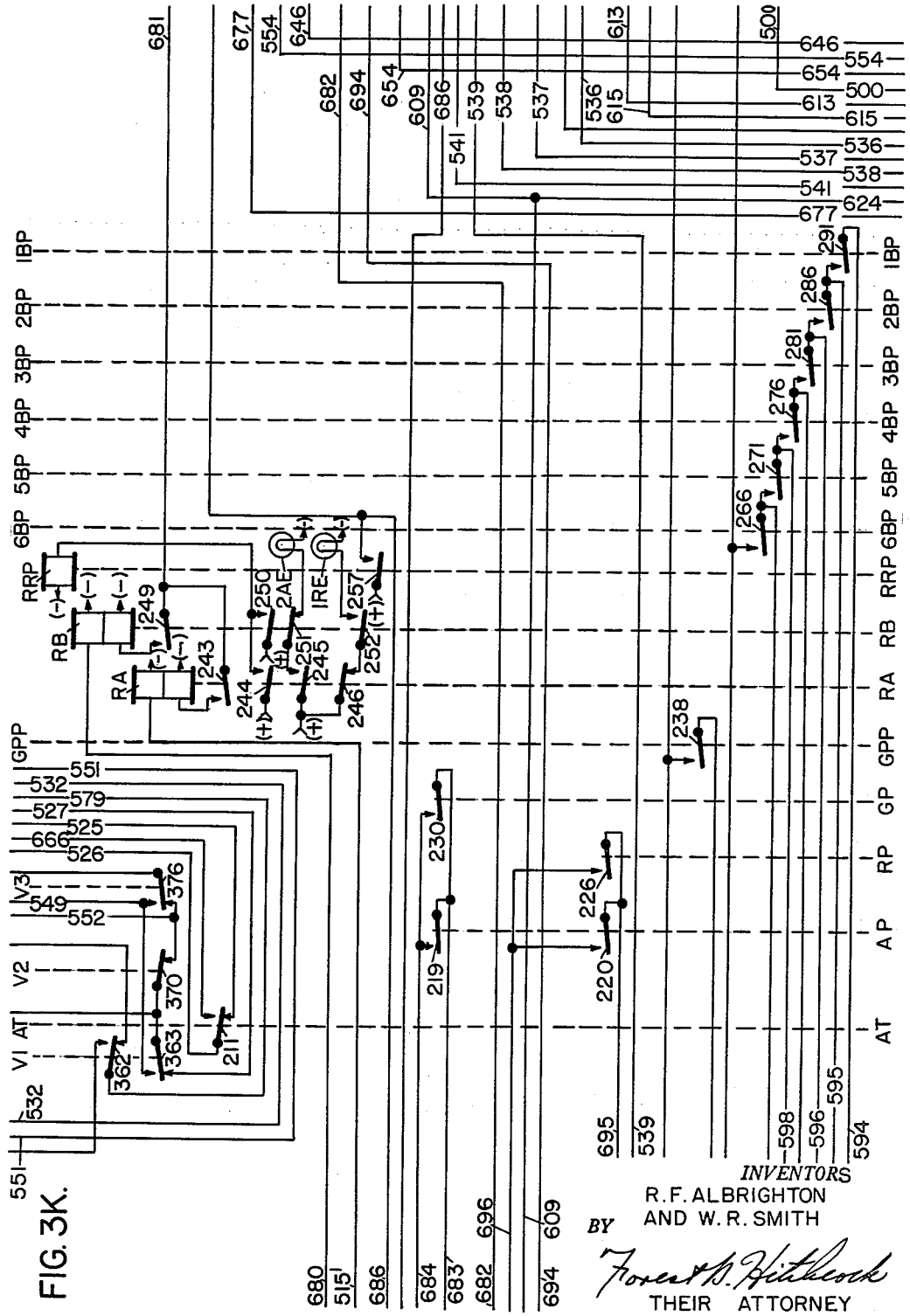

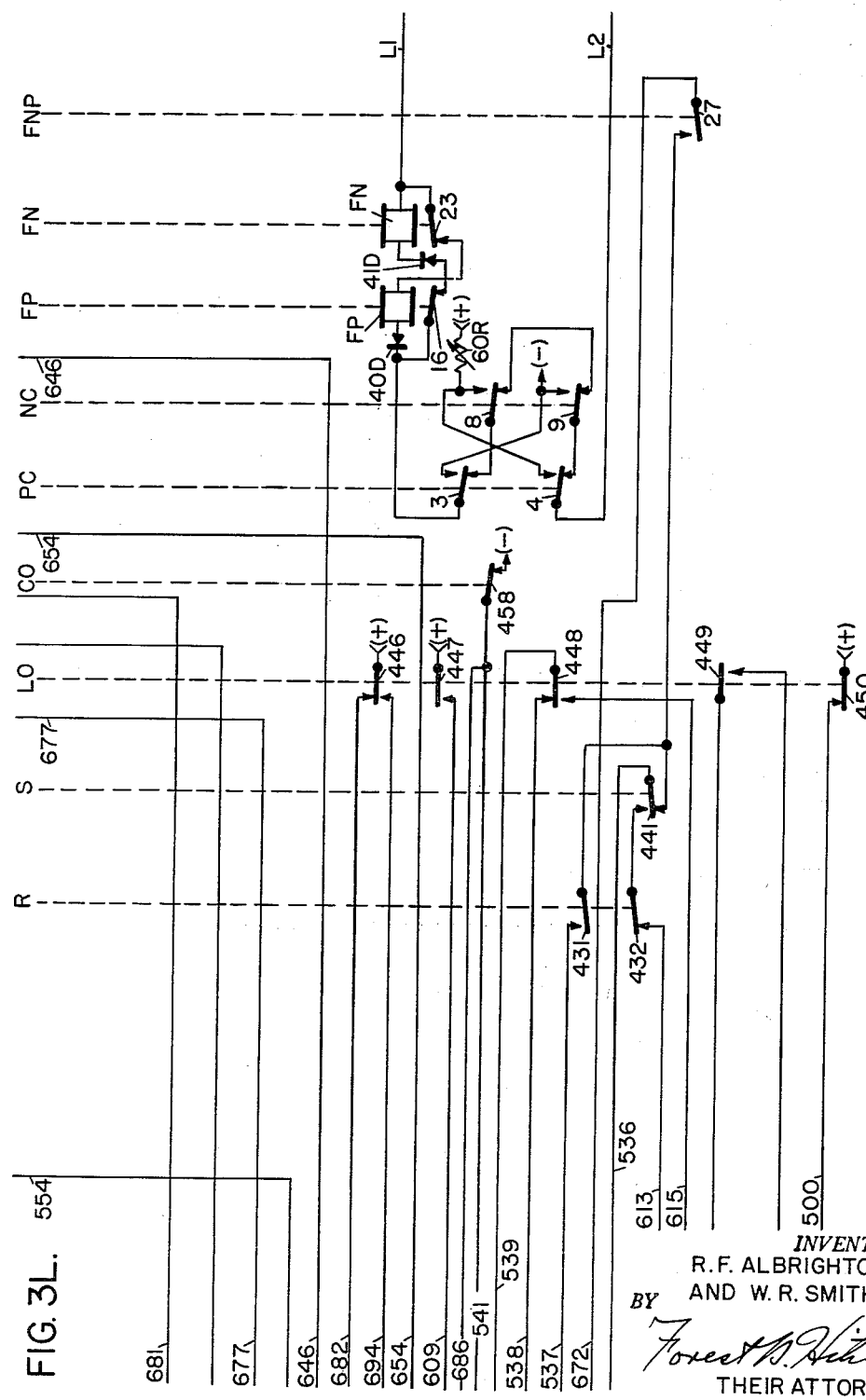

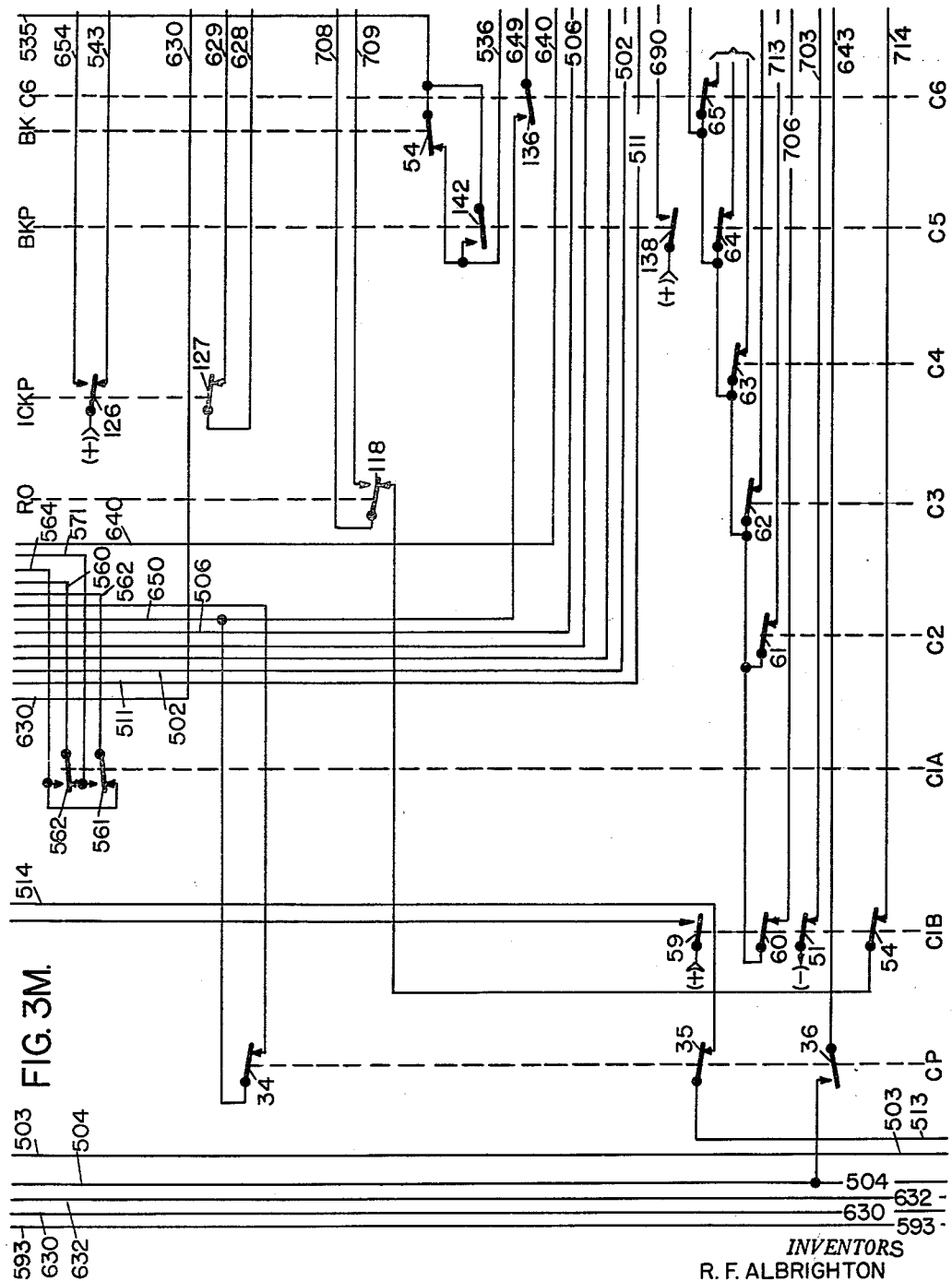

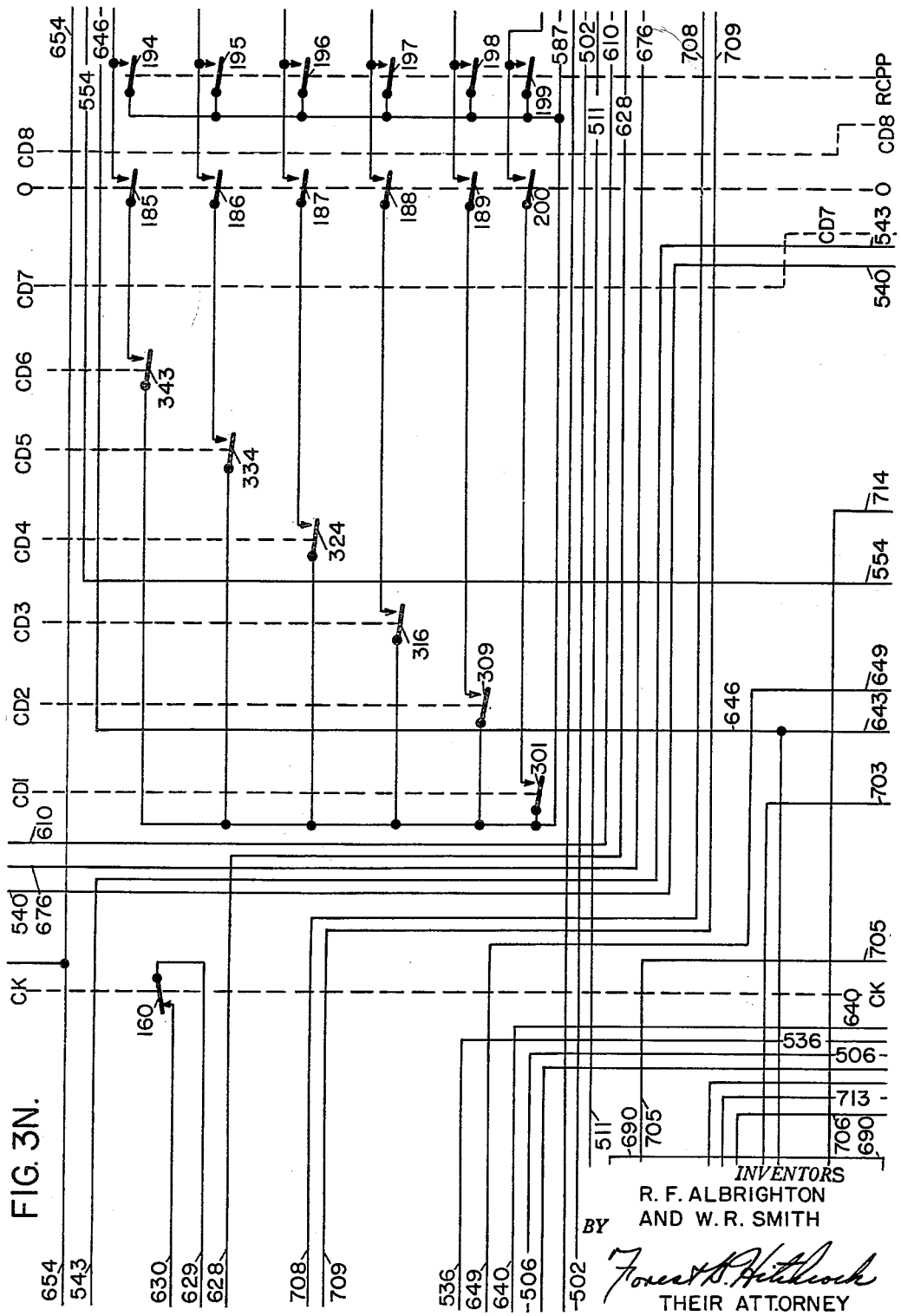

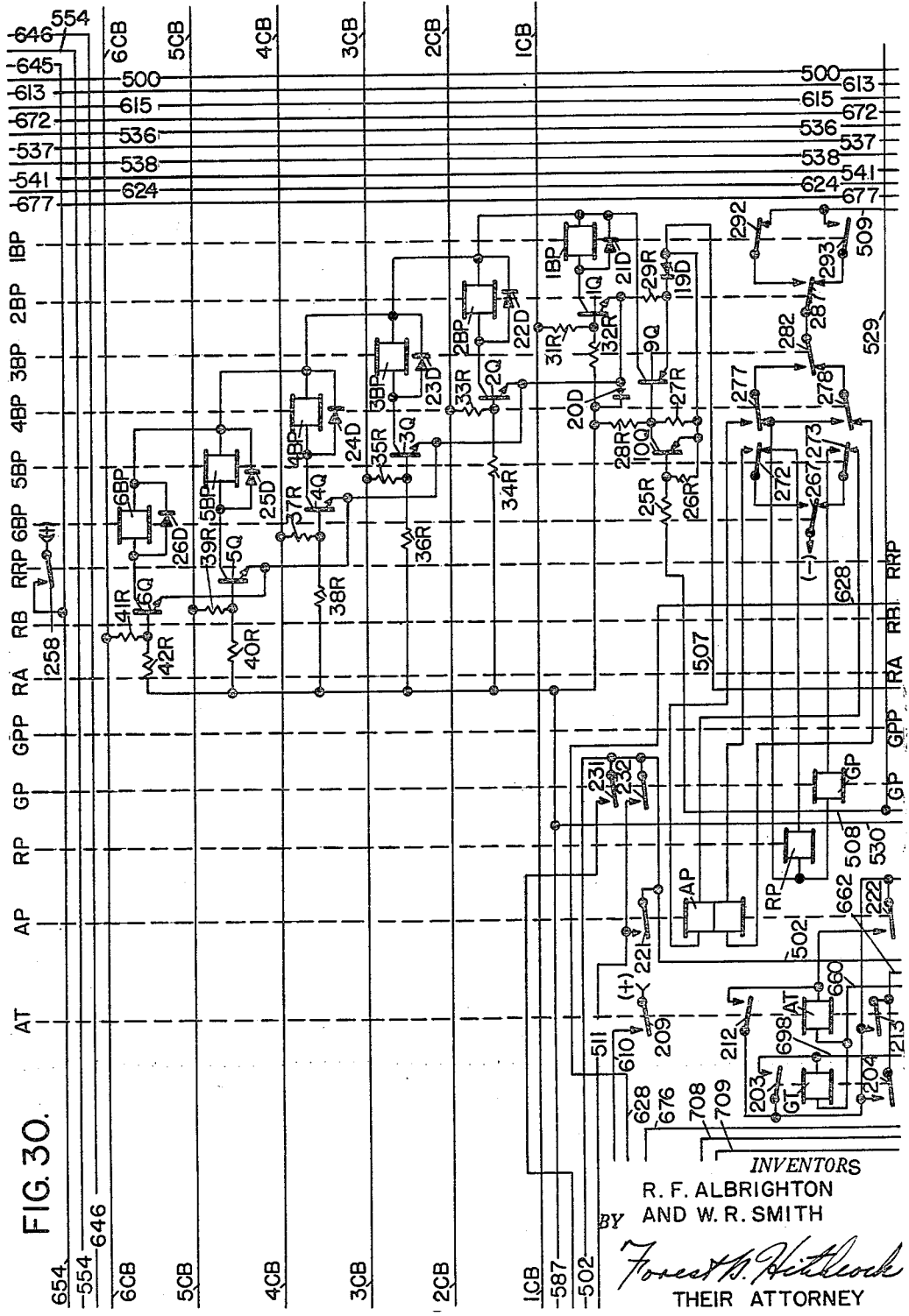

Nov. 5, 1963          R. F. ALBRIGHTON ETAL          3,110,006
                       AIR TRAFFIC CONTROL SYSTEM
Filed Nov. 9, 1959                              30 Sheets-Sheet 18

FIG. 3P.

INVENTORS
R. F. ALBRIGHTON
AND W. R. SMITH
BY
*Forest B. Hitchcock*
THEIR ATTORNEY

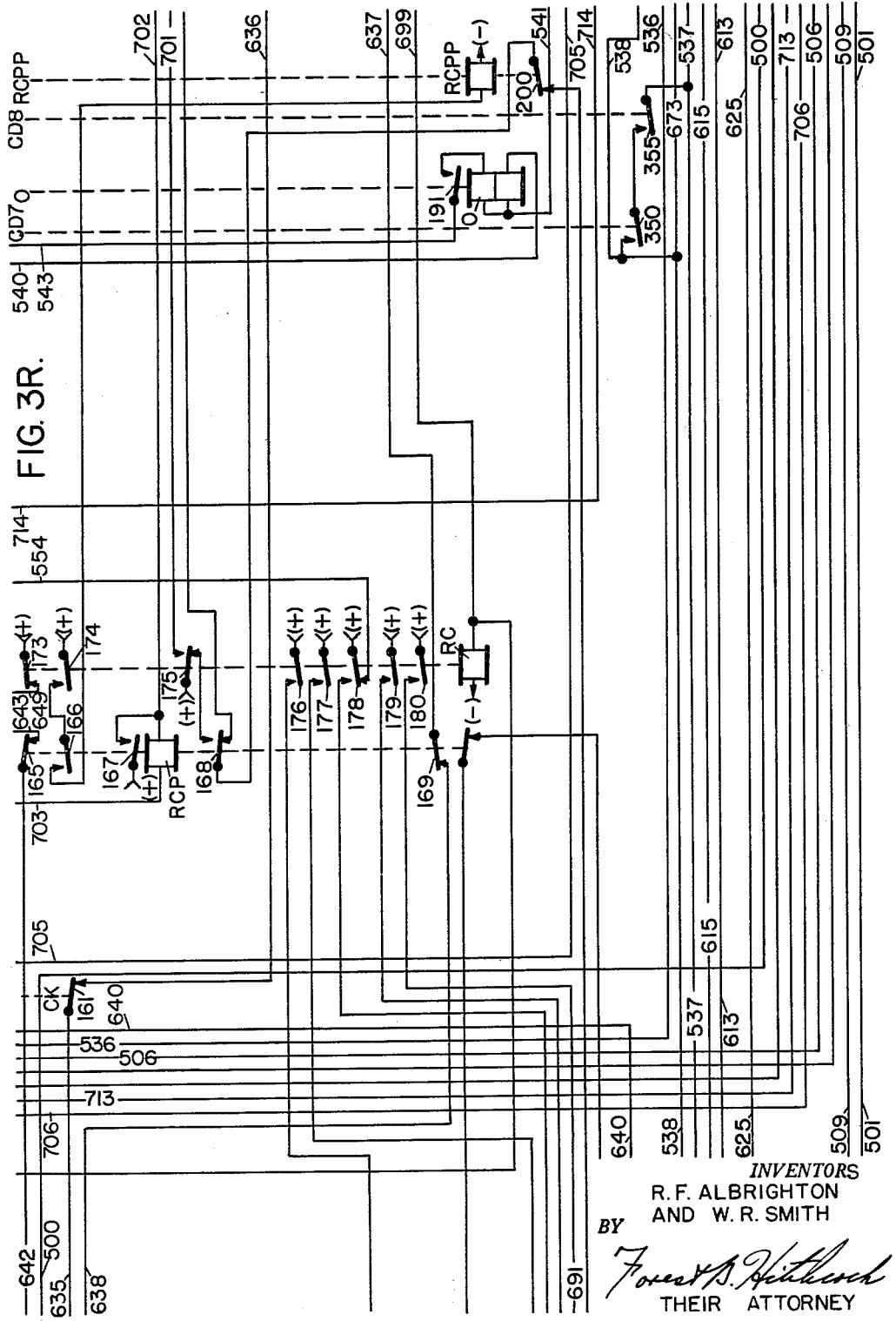

Nov. 5, 1963

R. F. ALBRIGHTON ETAL 3,110,006

AIR TRAFFIC CONTROL SYSTEM

Filed Nov. 9, 1959

INVENTORS
R. F. ALBRIGHTON
AND W. R. SMITH
BY
Forest D. Hitchcock
THEIR ATTORNEY

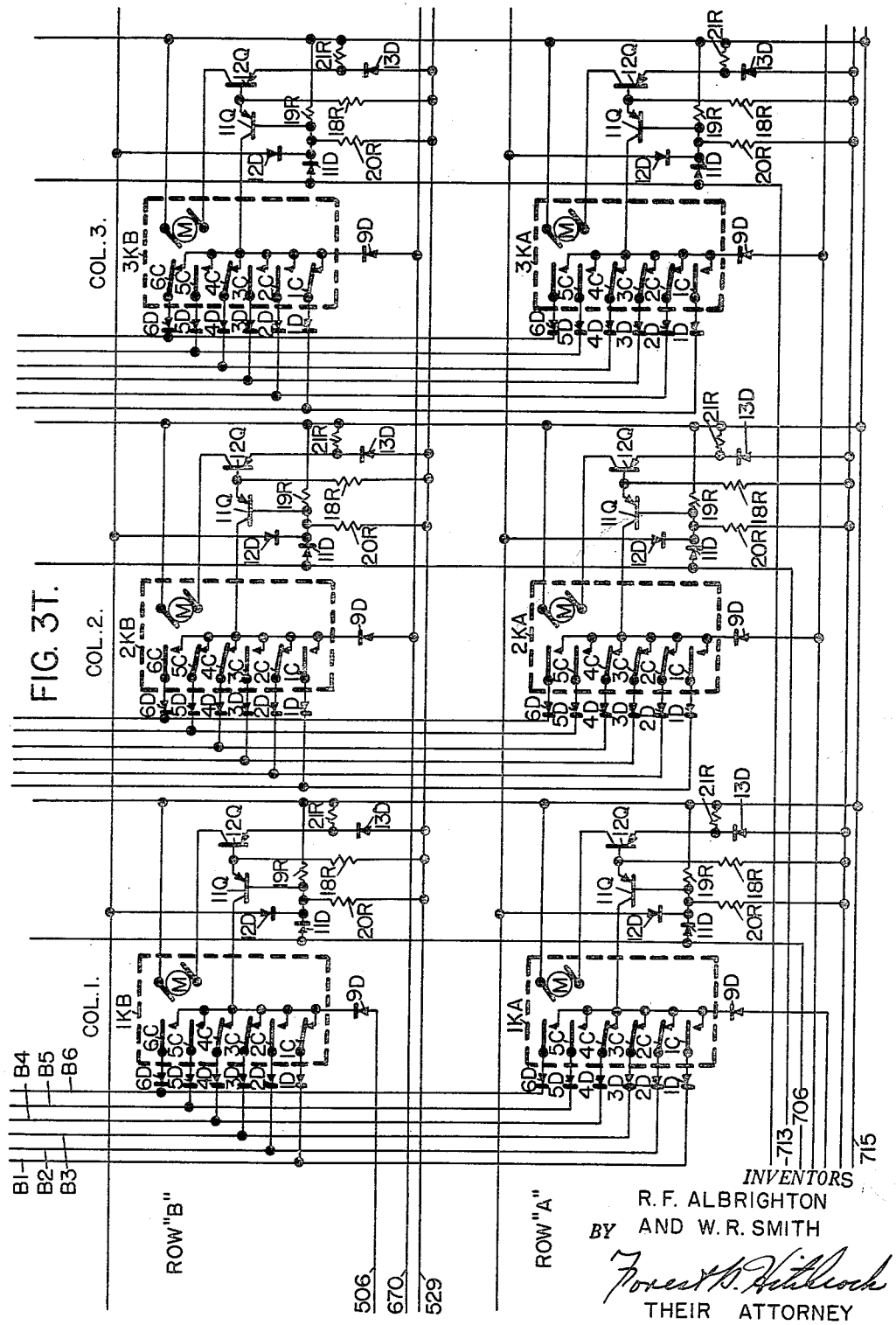

FIG. 4.

CODE CHART

| ALTITUDE | CONTROL BUSES | | | | | | TYPE OF RESERVATION | ITEMS OF FLIGHT DATA |
|---|---|---|---|---|---|---|---|---|
| | 1 | 2 | 3 | 4 | 5 | 6 | | |
| 1 | + | O | + | O | + | O | R | E |
| | | | | O | O | + | G | C |
| | | | | + | O | O | A | D |
| 2 | O | + | O | + | + | O | R | 1 |
| | | | | + | O | + | G | 2 |
| | | | | O | + | + | A | 3 |
| 3 | O | + | + | O | + | O | R | 4 |
| | | | | O | O | + | G | 5 |
| | | | | + | O | O | A | 6 |
| BK | | | | O | + | + | ▭ | |
| SP | + | O | O | + | + | O | R | 7 |
| SP | | | | + | O | + | G | 8 |

BK = BLANK DISPLAY
SP = SPARE
+ = ENERGIZED BUS
O = DEENERGIZED BUS

*INVENTORS*
R. F. ALBRIGHTON
*BY* AND W. R. SMITH

THEIR ATTORNEY

Nov. 5, 1963   R. F. ALBRIGHTON ETAL   3,110,006
AIR TRAFFIC CONTROL SYSTEM
Filed Nov. 9, 1959   30 Sheets-Sheet 24

CODE CHART

| ALTITUDE | CONTROL BUSES |   |   |   |   |   |   |   | TYPE OF RESERVATION | ITEMS OF FLIGHT DATA |
|---|---|---|---|---|---|---|---|---|---|---|
|   | 1 | 2 | 3 | 4 | 5 | 6 | 7 | 8 |   |   |
| 1 | + | o | + | o | o | + | + | o | R | 1 |
|   |   |   |   |   |   | + | o | + | G | 2 |
|   |   |   |   |   |   | o | + | + | A | 3 |
| 2 | o | + | + | o | o | + | + | o | R | 4 |
|   |   |   |   |   |   | + | o | + | G | 5 |
|   |   |   |   |   |   | o | + | + | A | 6 |
| 3 | + | + | o | o | o | + | + | o | R | 7 |
|   |   |   |   |   |   | + | o | + | G | 8 |
|   |   |   |   |   |   | o | + | + | A | 9 |
| 4 | o | + | o | + | o | + | + | o | R | 0 |
|   |   |   |   |   |   | + | o | + | G | A |
|   |   |   |   |   |   | o | + | + | A | B |
| 5 | + | o | o | + | o | + | + | o | R | C |
|   |   |   |   |   |   | + | o | + | G | D |
|   |   |   |   |   |   | o | + | + | A | E |
| 6 | o | o | + | + | o | + | + | o | R | F |
|   |   |   |   |   |   | + | o | + | G | G |
|   |   |   |   |   |   | o | + | + | A | H |
| 7 | + | o | + | o | + | o | + | o | R | I |
|   |   |   |   |   |   | o | o | + | G | J |
|   |   |   |   |   |   | + | o | o | A | K |
| 8 | o | + | + | o | + | o | + | o | R | L |
|   |   |   |   |   |   | o | o | + | G | M |
|   |   |   |   |   |   | + | o | o | A | N |
| 9 | + | + | o | o | + | o | + | o | R | P |
|   |   |   |   |   |   | o | o | + | G | Q |
|   |   |   |   |   |   | + | o | o | A | R |
| 10 | o | + | o | + | + | o | + | o | R | S |
|   |   |   |   |   |   | o | o | + | G | T |
|   |   |   |   |   |   | + | o | o | A | U |
| 11 | + | o | o | + | + | o | + | o | R | V |
|   |   |   |   |   |   | o | o | + | G | W |
|   |   |   |   |   |   | + | o | o | A | X |
| BK |   |   |   |   |   | + | o | o | ▭ |   |
| SP | o | o | + | + | + | o | + | o | R | Y |
| SP |   |   |   |   |   | o | o | + | G | Z |

BK = BLANK DISPLAY
SP = SPARE

FIG. 5.

INVENTORS
R. F. ALBRIGHTON
BY  AND W. R. SMITH

THEIR ATTORNEY

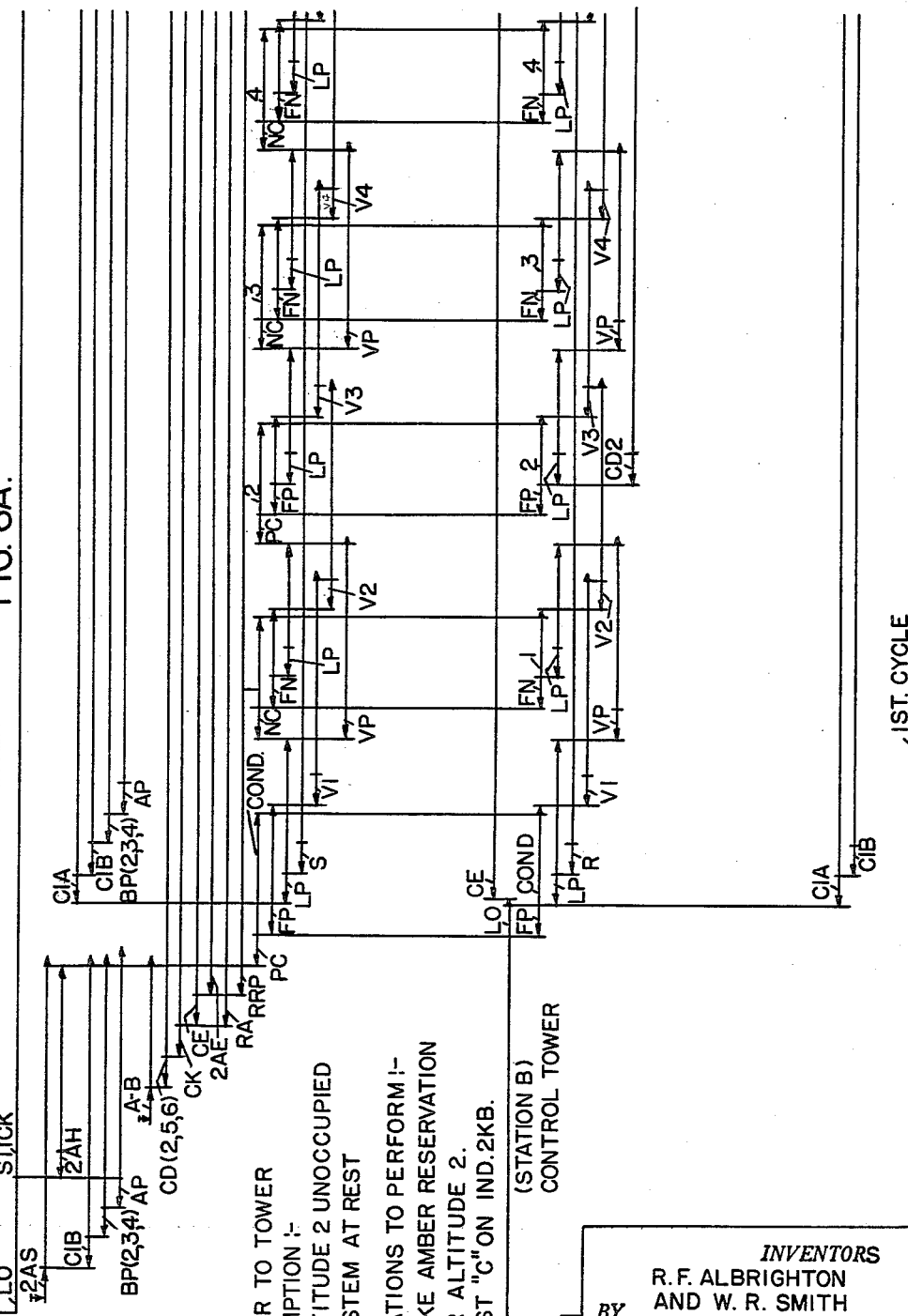

INVENTORS
R. F. ALBRIGHTON
AND W. R. SMITH
BY
THEIR ATTORNEY

Nov. 5, 1963  R. F. ALBRIGHTON ETAL  3,110,006
AIR TRAFFIC CONTROL SYSTEM
Filed Nov. 9, 1959  30 Sheets-Sheet 29

INVENTORS
R.F. ALBRIGHTON
AND W.R. SMITH
BY
THEIR ATTORNEY

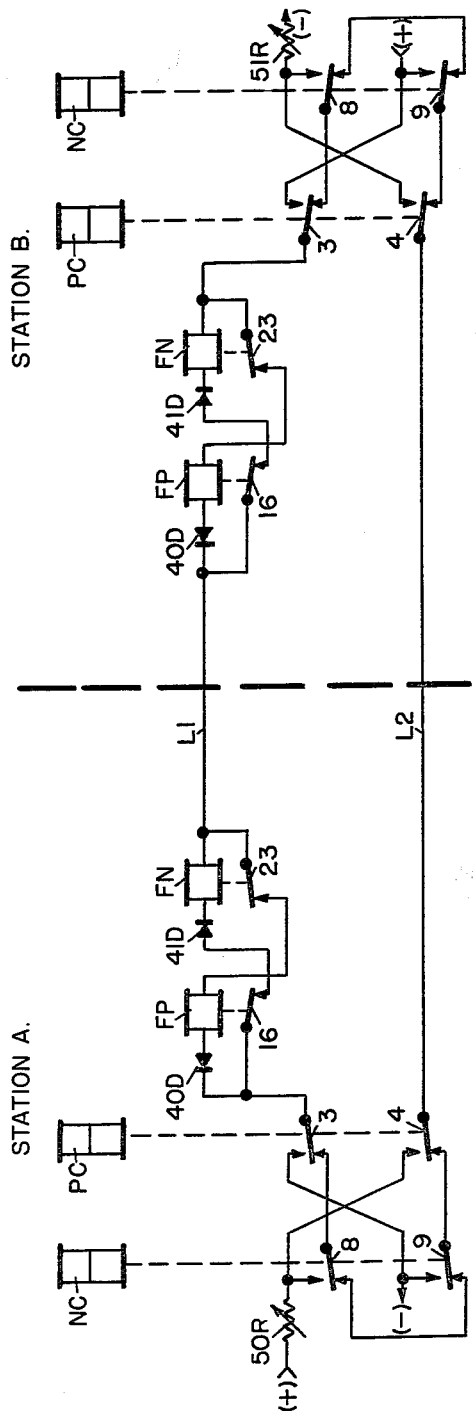

United States Patent Office 3,110,006
Patented Nov. 5, 1963

3,110,006
AIR TRAFFIC CONTROL SYSTEM
Reginald F. Albrighton and Willis R. Smith, Rochester, N.Y., assignors to General Signal Corporation, a corporation of New York
Filed Nov. 9, 1959, Ser. No. 851,682
31 Claims. (Cl. 340—23)

This invention relates to an air traffic control system, and more particularly pertains to an air traffic control system wherein prevailing flight information designated at either of two remotely spaced stations may be displayed at one or both of such stations according to altitudes for particular airplane flights in the airway therebetween for facilitating the coordination of such airplane flights in the airway.

Airplane traffic between remotely spaced stations in respective airways is normally supervised by controllers located at the spaced stations by regulating the time at which an airplane should be at a particular location or fix and the altitude at which such airplane should fly. As a result, flight information must be communicated from one controller at one station to another controller at another station in accordance with the flight of an airplane between such stations so as to enable transfer of authority when the position of such airplane in flight warrants such transfer. Normally, each station employs a plurality of flight progress boards each being assigned to a particular fix in an airway and each having a plurality of slots therein each for receiving a flight progress strip on which the flight information pertaining to a particular airplane flight is manually written. When a particular airplane is in flight between two such stations, the controllers of the stations are at times in radio contact with the pilot of such aircraft. When the airplane passes each of the predetermined fixes, the pilot communicates such information to the controllers of the assigned stations. The controllers at the respective stations then move the respective flight progress strips on which the flight information pertaining to that airplane is written from one of the progress boards to another of the flight progress boards in accordance with the last reported position of such airplane.

The present invention proposes to provide means for transmitting controls from one station to the other station or vice versa for causing a changeable display indicator in a selected altitude to display a reservation symbol, thus indicating either reservation or occupancy of such altitude, for a given airplane flight and for further controlling a number of changeable display indicators in that reserved altitude to display flight data pertinent to such airplane flight for facilitating in coordinating the assignments of other airplane flights to respective flight altitudes in the airway. Also, the present invention proposes to provide means automatically responsive to controls designated at one of two stations for changing the fix designation with respect to a particular airplane flight at each of the two stations to correspond to the current communication between the pilot of the particular aircraft and the controller at the designating station.

Thus, one purpose of the present invention is to provide a normally at-rest code communication system wherein a designated control at one station is transmitted over a duplex line circuit to the other station to reserve an altitude, the reservation of which gives control to the other station for effecting transmission of controls over the duplex line circuit to the one station to effect a similar reservation.

Another purpose of the present invention is the provision of similar line circuit means at each station simultaneously responsive to controls initiated at one or the other of the stations for simultaneously conditioning normally at-rest code communication apparatus at each station.

Another purpose of the present invention is the provision of a plurality of changeable display indicators for each altitude at each station for displaying flight data in sequence for a selected altitude, but having the changeable display indicators disposed in corresponding positions for the respective altitudes operate simultaneously in accordance with the initiation of controls from one or the other of the stations.

Another purpose of the present invention is the provision of normally at-rest code communication apparatus at each station wherein suitable correction controls provided may be initiated at one station to cause such apparatus at both stations to assume a characteristic position corresponding to a changeable display indicator in an altitude after such altitude is selected and the proper reservation is made or during the posting of flight data in the changeable display indicators of such selected altitude, thus permitting different flight data to be displayed in such changeable display indicators when desirable.

Another purpose of the present invention is the provision of a normally at-rest code communication system wherein means is provided at each station to automatically return the system to the at-rest condition after all the operations are performed for posting flight data in each of the changeable display indicators of a selected altitude at both stations or, when manually designated, to return the system to the at-rest condition at both stations during the operation of posting flight data in the changeable display indicators of a selected altitude.

Another purpose of the present invention is the provision of a normally at-rest code communication system wherein means is provided at each station to simultaneously transfer the flight data previously posted in the changeable display indicators of a previously selected altitude to the changeable display indicators of another selected altitude at both stations or at the control designating station in accordance with the reservation designation.

Another purpose of the present invention is the provision of a normally at-rest code communication system wherein means is provided at each station to simultaneously operate all changeable display indicators in a selected altitude to a blank position at one station in accordance with controls initiated at the other station, with the code communication apparatus at such one station assuming control of transmission to thus cause the changeable display indicators at the other station to be simultaneously operated to a blank position.

Another purpose of the present invention is the provision of a normally at-rest code communication system wherein means is provided at each station for returning its respective apparatus to its at-rest condition at various times when it is considered desirable in accordance with various normal or abnormal operations of the system.

Other objects, purposes and characteristic features of the present invention will be in part obvious from the accompanying drawings and in part pointed out as the description of the invention progresses.

In describing the invention in detail, reference is made to the accompanying drawings in which similar and corresponding parts are designated by like reference characters, and in which:

FIG. 2 illustrates by block diagram the general organization of the system provided according to the present invention for the communication of controls between a control center (station A) and a control tower (station B) for facilitating the control of airplane flights therebetween;

FIG. 4 is a code chart showing the manner in which codes are assigned for the respective flight altitudes and the functions associated therewith for this embodiment of the present invention;

FIG. 5 is a code chart showing the manner in which codes are assigned for the respective flight altitudes and the functions associated therewith for an enlarged version of the present invention;

Figure 3A:
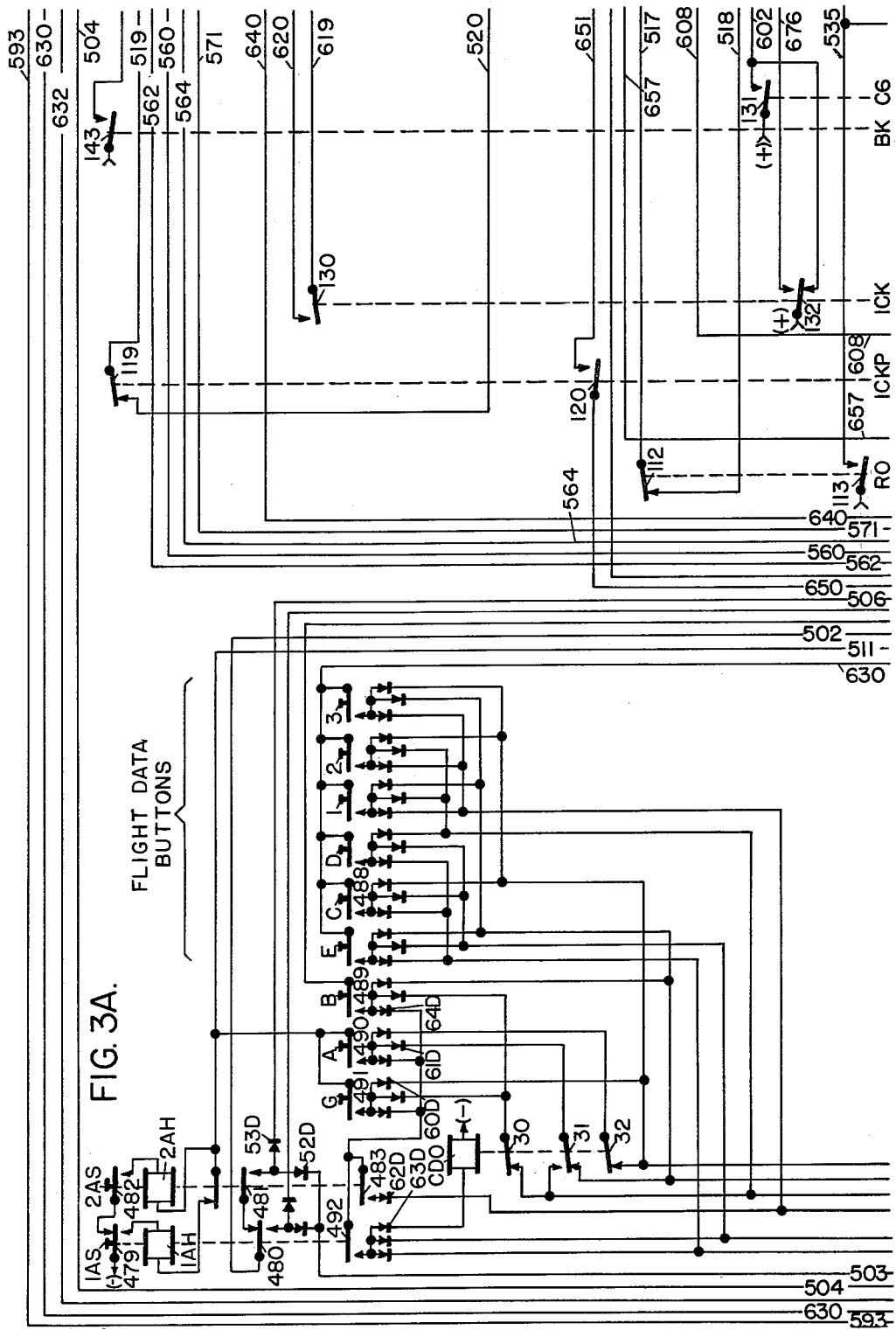
FIGS. 3A to 3T illustrate a circuit organization for apparatus such as is provided at each of the stations.
Figure 3B:
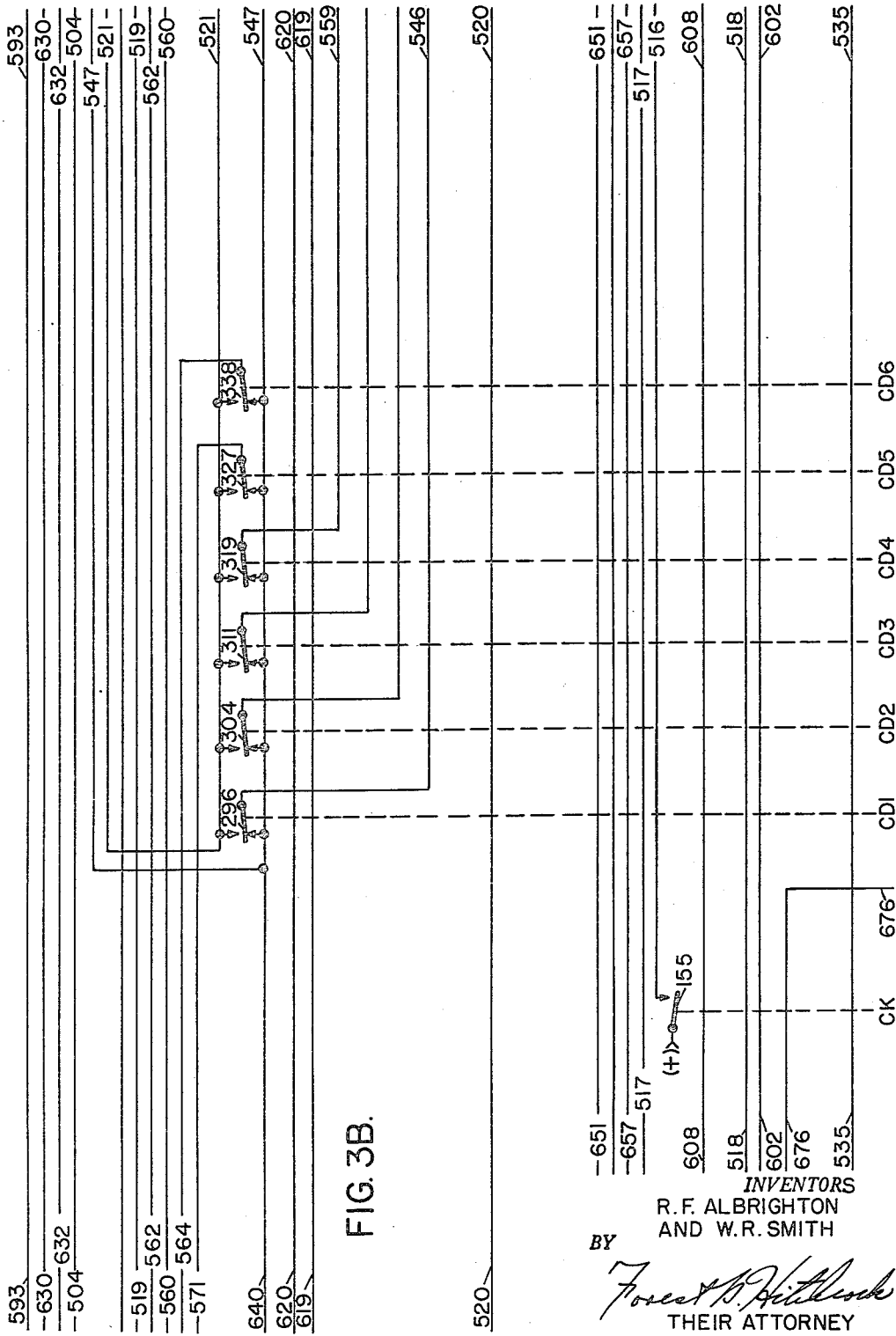
Figure 3E:
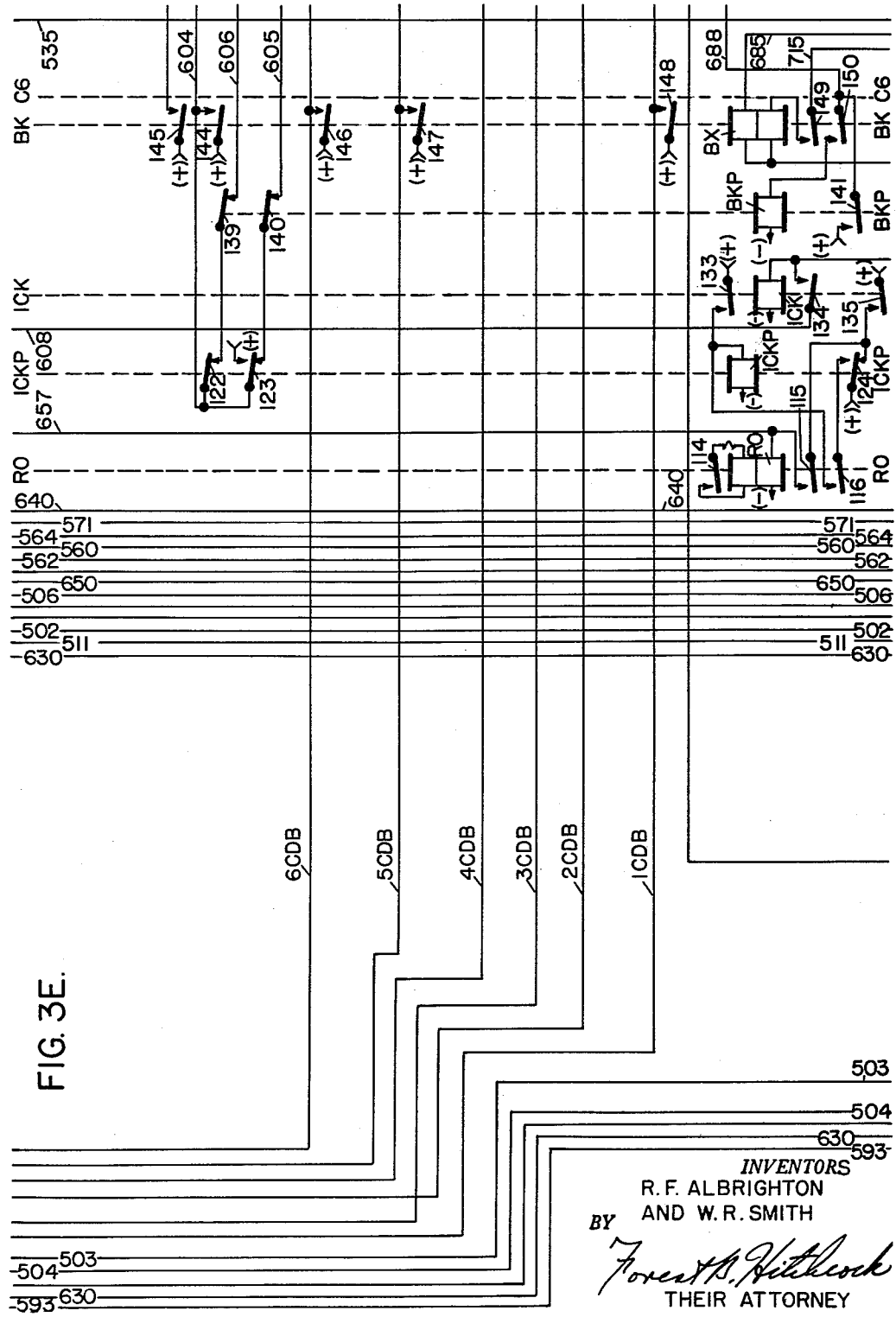
Figure 3F:
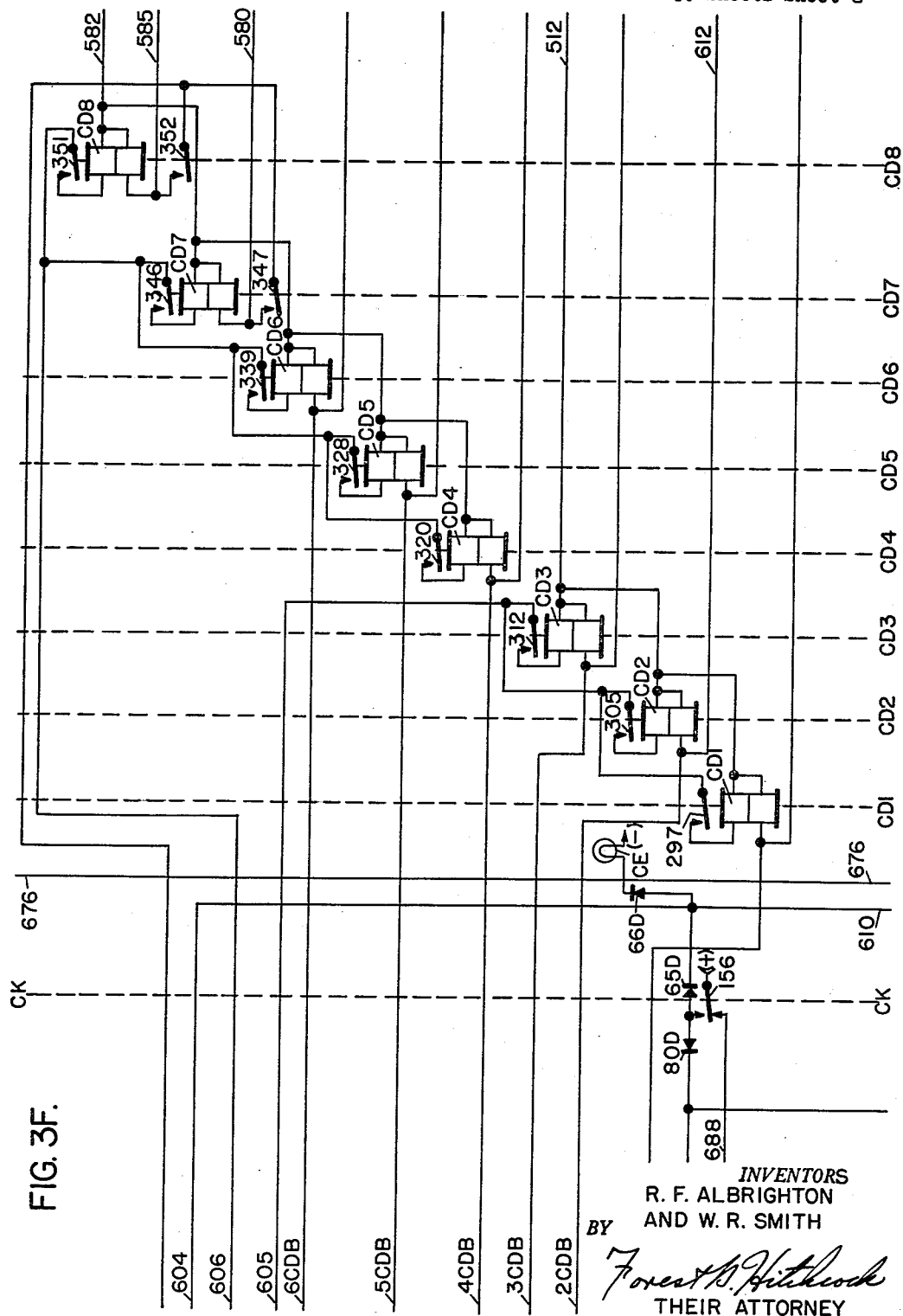
Figure 31:
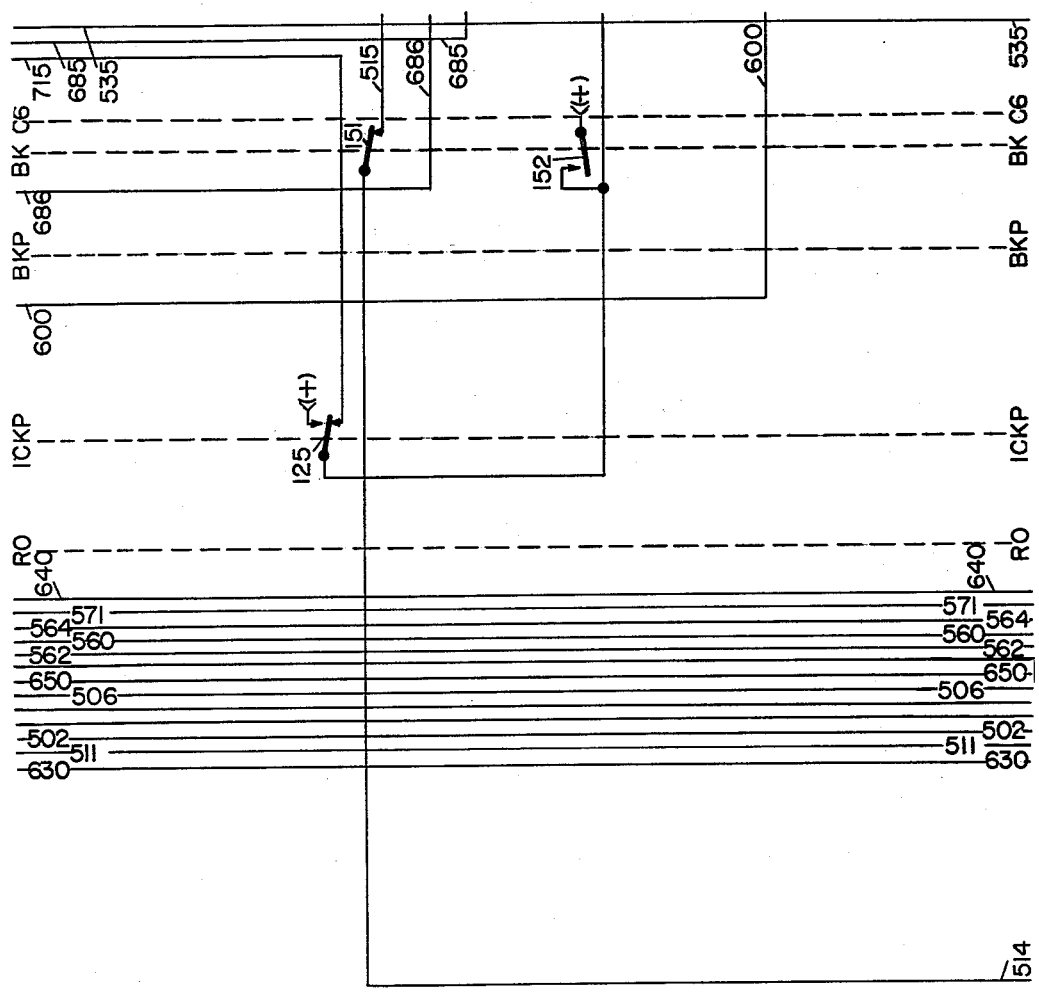

FIGS. 6A, 6B, 6C, 6D and 6E when placed side by side constitute a sequence chart illustrating the sequence of operation of relays, cycle light, and changeable display indicators for a selected altitude at the control center (station A) and the control tower (station B) during typical cycles of operation;

FIG. 7 illustrates diagrammatically a suitable line circuit organization for the communication system connecting the stations A and B; and FIG. 8 illustrates by block diagram the manner in which FIGS. 3A to 3T would be placed with respect to each other to provide a more comprehensive understanding of the circuitry shown therein.

For the purposes of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner. The symbols (+) and (−) are employed to indicate the positive and negative terminals respectively of suitable batteries, or other sources of direct current; and the circuits with which these symbols are used, always have current flowing in the same direction.

SYSTEM APPARATUS

The general organization of the system for directing air traffic is such that the control of airplane flights along an airway is provided by respective controllers at either a control center or a control tower located at opposite ends of such airway and which are identified for purpose of description in the present disclosure as station A and station B, respectively. It is the duty of the respective controllers at station A and station B to direct the flights of airplanes over the airway in such a manner as to avoid confliction and unnecessary congestion of air traffic. For the purpose of facilitating in the coordination of airplane flights within such airway, the present invention provides suitable means at station A and station B to display altitude reservations and pertinent flight data for such airplane flights. More particularly, with reference to FIG. 1, a flight controller's control panel CP is illustrated as having three rows of changeable display indicators, a cycle light, and various buttons, the functions of which will be explained more in detail hereinafter. This control panel CP is only representative of a flight controller's control panel included in an air traffic control system wherein the present invention is employed, one of which would normally be located at station A and one located at station B. Such a control panel CP serves to provide several indications to the respective controller. These indications used herein for purposes of illustration include the altitude at which an airplane is or will be flying, whether or not the airplane is occupying that altitude, what type of airplane, the fix designation, and the time at which the airplane is scheduled to be at that predetermined location or fix. It is to be understood, however, that other indications such as the flight number and the like may be displayed to the controller by enlarging the system in accordance with the code chart shown in FIG. 5, as will be discussed more fully hereinafter. Also, the cycle light CE serves to indicate to the controller at times various indications pertinent to the conditions of at-rest and during operation of the system. These various indications will be more apparent as the description progresses.

The changeable display indicators, such as changeable display indicator 1KB, are of the type having changeable contacts adapted to be operated to opened and closed positional code combinations characteristic of the different positions to which such indicator can be operated. This type of changeable display indicator is more fully disclosed in the pending application, Ser. No. 763,569 filed on September 26, 1958, by W. D. Maynard. In such pending application, two forms of the above general type of changeable display indicator are disclosed. These two forms are at 12 position changeable display indicator and a 36 position changeable display indicator. The 12 position indicator employs 6 bus wires which are energized in a different code combination for each of the 12 positions by energizing 3 of the bus wires and leaving the other 3 bus wires deenergized. In a similar manner, the 36 position indicator employs 8 bus wires which are energized in a different code combination for each of the 36 positions by energizing 4 of the bus wires and leaving the other 4 bus wires deenergized. For the sake of simplicity in the illustration of the present invention, the detailed circuit organization shown in FIGS. 3A to 3T employs the 12 position changeable display indicator which, as a result, provides a 6 bus wire system. It is to be understood that the present invention could readily be enlarged to an 8 bus wire system with which the code chart shown in FIG. 5 would be applicable. This will be more apparent as the description progresses.

In connection with the changeable display indicators shown in FIG. 3T, a transistorized motor controlling circuit including two PNP type transistors 11Q and 12Q with associated resistors 18R, 19R, 20R and 21R and associated diodes 9D, 11D, 12D and 13D is provided for each changeable display indicator to effect the operation of a motor M associated with each of the changeable display indicators in response to various control designations. The specific arrangement of the transistors, resistors and diodes associated with each changeable display indicator to provide various operations in response to appropriately applied potentials is more fully disclosed in the Pat. No. 3,054,984 granted to C. S. Wilcox on September 18, 1962. Similar control of the transistors 11Q and 12Q is effected herein by the appropriate application of potentials in a manner similar to that disclosed in the above named Wilcox application. In view of the above, no claims will be directed towards the changeable display indicators and their associated transistorized motor controlling circuits.

A controller utilizing the control panel CP at a designated location may cause the operation of one changeable display indicator or the operation of several changeable display indicators simultaneously dependent upon the selective designation of a number of buttons. To the extreme left of each row of changeable display indicators is disposed an altitude selector button, such as altitude selector button 2AS, for selecting an altitude in conjuction with the designation of a reservation button, such as amber button AB, disposed in the lower right-hand corner of the control panel CP. After such an altitude reservation is made, flight data may be caused to be displayed on the changeable display indicators associated with the altitude reservation indicators by designation of desirable data button, such as button CB for the letter C. A correction button is disposed on the control panel CP directly beneath an associated column of changeable display indicators, such as correction button CB2 for changeable display indicators 2KA and 2KB, for the purpose of causing the system to assume a condition characteristic of its particular column of changeable display indicators. A cancel button CNB is disposed on the left-hand side of the control panel CP and is provided for the purpose of permitting the controller at one station to bring the system to its at-rest condition at both stations A and B. A transfer button provided for each row or altitude of changeable display indicators, such as transfer button 2TB for row or altitude 2, is provided for the purpose of transferring the flight data in the changeable display indicators representing one flight altitude to the changeable display indicators representing another flight altitude. A blanking button RB is provided for the purpose of permitting the controller to cause the changeable display indicators of a selected flight altitude to be operated to a blank position to display a blank indication. A reset button RSB is provided for the purpose of permitting the controller to cause the apparatus at his station to be returned to the at-rest condition at desirable times.

The altitude selector, correction, cancel and transfer buttons each have a holding coil associated therewith which is energized upon designation of the associated button for providing a stick circuit for that button in accordance with the associated circuits of the code communication apparatus. Also, a lamp is connected in shunt with each holding coil of the correction, cancel and transfer buttons for indicating at what time its respective button is or is not designated. Although the altitude selector buttons are of the same general type as the correction, cancel and transfer buttons, the light for each altitude selector button is not connected in shunt with its respective holding coil, but is energized through front and back contacts of relays which are used for selecting a particular row or altitude of changeable display indicators. This change in the connection of the altitude selector lights is provided to make the function of the lights more consistent with the present system. This will be more apparent during the description of typical cycles of operation.

A circuit organization responsive to the selective designation of the above named buttons is shown in FIGS. 3A to 3T. This circuit organization is used at only one station and is more particularly indicated to be the circuit organization employed at station A. Inasmuch as the circuits for this system organization of the communication apparatus are similar for both stations A and B, the apparatus shown in FIG. 3A to 3T is to be understood as being provided at each of the stations A and B.

A suitable duplex line circuit organization appropriate for connecting similar circuits of code communication apparatus, as that shown in FIGS. 3A to 3T, located at station A and station B is shown in FIG. 7. With reference to FIG. 7, it will be seen that the duplex line circuit includes two line wires L1 and L2 with line wire L1 having two line relays FP and FN normally connected in shunt at both stations A and B. Two diodes 40D and 41D are connected in series with the line relays FP and FN respectively at each station so as to allow energization of its associated line relay in only one direction as dictated by the application of appropriate potentials to the duplex line circuit through front and back contacts of control relays NC and PC at either station A or station B. Control of the energization of control relays NC and PC at either station A or station B by the appropriate operation of the associated code communication apparatus provides simultaneous conditioning of the code communication apparatus at both stations A and B as identical line relays are energized simultaneously. This will be more apparent as the description progresses.

Appropriate control of other relays included in the code communication apparatus located at each station upon designation of some of the various buttons mentioned above provide selective control of the control relays NC and PC for conditioning such code communication apparatus at each station to effect the subsequent operation of selected changeable display indicators.

Referring to the detailed circuits of the code communication apparatus for station A shown in FIGS. 3A to 3T, column relays C1A, C1B, C2, C3, C4, C5 and C6 are provided for effecting the operation of the changeable display indicators in a selected row or altitude in sequence during typical posting cycles of operation. A column relay repeater CP is provided to be energized at the end of a cycle of operation for effecting the transition between the deenergization of the column relay energized during that cycle of operation and the energization of the next column relay in sequence for effecting another cycle of operation.

A number of bus repeater relays 1BP, 2BP, 3BP, 4BP, 5BP and 6BP are provided for several reasons. Initially, during a typical cycle of reservation, the BP relays are energized in a combination corresponding to the closed changeable contacts of the first indicator or reservation indicator in a selected altitude for indicating the position of that indicator to thus determine whether or not such selected altitude is available. During the same cycle of operation, after the changeable display indicator has operated to its called for position, the BP relays are again energized in a combination corresponding to the closed changeable contacts of the operated changeable display indicator for initiating a checking circuit.

Reservation relays AP, GP and RP are conditioned in accordance with the energization of the BP relays in combination to condition the code communication apparatus at both stations A and B in accordance with the reservation selected. A reservation repeater relay GPP is provided for conditioning the code communication apparatus at the station initiating a reservation cycle wherein the relay GP is energized.

Relays CD1 through CD6 are adapted to be energized in combination in accordance with the particular reservation button or flight data button designated to condition the code communication apparatus at both stations A and B in accordance with the particular button selected. Relays CD7 and CD8 are provided to condition the code communication apparatus at a controlling station for operating a changeable display indicator in a selected altitude to display the selected reservation and to condition the code communication apparatus at that station for each cycle of operation wherein flight data is posted in a changeable display indicator so as to allow a check circuit to be initiated, thereby conditioning the system for another cycle of operation.

Stepping relays V1 through V8 and relay VP are provided to effect the sequential stepping of the system. More particularly, these stepping relays are used in association with the CD relays to provide energizing circuits for the control relays PC and NC.

Check relays CK, 1CK, and 1CKP are effective to provide a check on the code communication apparatus at both stations A and B during the conditioning of the system after control has been initiated at either station A or B and after the respective changeable display indicators have completed their operations.

Row relays RA, RB and RRP provide for the individual selection of a row or altitude of changeable display indicators in accordance with the actuation of an altitude selector button and a reservation button. Also, the altitude selector light is energized in accordance with the energization of either relay RA or RB to provide a visual indication to the controller showing that the altitude requested or desired is in correspondence with the selection made. The altitude selector light is adapted then to be illuminated during the time the controller is posting flight data in the selected row or altitude.

A line relay repeater LP is controlled by each of the line relays FN or FP at each station to effect the sequential control of the stepping relays V and the code determining relays CD when a typical cycle of operation is initiated at either station A or station B.

Relays S, R, LO and CO are provided at each station to effect interlock controls between the apparatus at each station during the time when the system is at rest and during the time when the respective controller at either station A or B initiates a control cycle.

An operate relay O is provided to control the supply of controlling energy over control buses 1CB, 2CB, 3CB, 4CB, 5CB and 6CB to a changeable display indicator selected in accordance with the designation of appropriate buttons to allow the changeable display indicator to operate to the desired position.

Transfer relays AT, GT and RO are provided to effect the transfer of flight data from one altitude to corresponding changeable display indicators of another altitude in accordance with the selection of an altitude selector button and a reservation button. During the transfer of flight data from one altitude to another altitude wherein the relay AT is energized the relay RO is energized during each cycle of operation to thereby cause the flight data at both stations A and B to be transferred in sequence. That is, corresponding changeable display indicators in one altitude at both stations A and B will operate simultaneously to display flight data transferred from corresponding indicators in another altitude at their respective stations. Control relays RC, RCP and RCPP are adapted to be energized in accordance with the energization of transfer relay GT to cause all of the changeable display indicators in a selected altitude to be operated simultaneously in accordance with the designated transfer button for a row or altitude of changeable display indicators having flight data posted therein. This transfer operation is different than the above transfer operation where relay AT is energized in that the changeable display indicators operate simultaneously and that only the changeable display indicators at the station where the controls are designated are operated.

Blank relays BK and BKP are provided to effect the operation of all changeable display indicators in a selected altitude at both stations A and B to a blank position in accordance with the actuation of a blank button BB. The code communication system is such that when controls are designated at one station, the apparatus at the other station will be conditioned to operate all of its changeable display indicators in the selected altitude to blank after which the apparatus at the designating station is conditioned to operate all of the indicators in the selected altitude to a blank position.

It is believed that the nature of the invention, its advantages and characteristic features can be best understood with further description being set forth from the standpoint of operation.

OPERATION

General

In considering the general mode of operation of the system before considering the specific circuit organizations that are included herein to effect such mode of operation, reference can be made to FIG. 2 which illustrates the general organization of a system for the communication of controls between station A and station B for facilitating the control of airplane flights therebetween. As shown in FIG. 2, the apparatus at each station is indicated to be a button and light panel, code communication apparatus, a reservation and flight data indicator display, a power supply and line relays. Connection is made between the apparatus at each station, and more particularly the line relay, by line wires L1 and L2.

In considering the general sequence of operation during a reservation cycle of operation, let it be assumed that it is desired to designate controls at station A for effecting a reservation indication at both stations A and B. In accordance then with this assumption, appropriate altitude selector and reservation buttons are designated on the button and light panel at station A.

Generally speaking, in response to designation of such buttons, energy sources are supplied from the power supply to the code communication apparatus and the reservation and flight data indicator display for conditioning such apparatus and indicator display. During conditioning of the code communication apparatus, similar line relays at both stations A and B are correspondingly conditioned. Such conditioning of the line relays at station B is effective to condition the associated code communication apparatus in a similar manner to that of the code communication apparatus at station A. The reservation and flight data indicator display at station B is conditioned in accordance with its associated code communication apparatus and power supply to operate a selected changeable display indicator to a reservation position following which the code communication apparatus at station B assumes control of transmission. Transmission is then initiated from station B to station A over line wires L1 and L2 via the line relays to further condition the code communication apparatus at station A. A similar changeable display indicator at station A in the selected altitude is operated to display the reservation indication initially called for. The code communication apparatus at station B meanwhile is automatically cleared out and awaits to be conditioned in a similar manner to provide for the operation of a succeeding changeable display indicator in the selected altitude. After operation of the changeable display indicator at station A, the code communication apparatus is automatically cleared out. Knowledge of such clear out is conveyed to the controller at the control initiating station (station A) by means of a cycle light which is normally energized during the conditioning period of the system and the operation of the corresponding indicators and is deenergized when such clear out at station A is completed.

Should it have been assumed that it was desired to designate controls at station B, the conditions as above stated would have occurred in a reverse manner. This should be obvious in view of the fact that it has been stated heretofore that similar apparatus is located at both stations A and B.

Other cycles of operation may be initiated at either station A or B for controlling the changeable display indicators at each station to provide the display of flight data in desired altitudes or the cancelling of such data wherein the above apparatus is conditioned in a similar manner. Examples of these other cycles of operation will be considered in more detail in the following discussion of the detailed operation.

In connection with the detailed circuit provided for use in describing the detailed operation with respect to typical cycles of operation, only the detailed circuits which would be required at one station are included in the drawings. Inasmuch as these circuits are duplicated for the stations, it is believed expedient not to duplicate the detailed circuits herein, but to consider typical cycles of operation wherein conditioning of the apparatus and operation of the changeable display indicators in response to designation of appropriate buttons are considered separately at each station. The complexity of the detailed circuits shown in FIGS. 3A to 3T necessitates such separate consideration at each station. With this in mind, then, typical cycles of operation will be discussed in a more detailed manner.

Normal Conditions

For the purpose of facilitating the description of the present invention, normal conditions are assumed to exist when the code communication apparatus is at rest, and when there has been no button designated on the control panel CP. Thus, under these conditions, the lights associated with the various buttons and the cycle light are all deenergized. The changeable display indicators provided for each altitude in module form may be in a blank position or may display a reservation indication and/or items of flight data. As each of these changeable display indicators are of the type which remains in its last position to which it has been operated, it can readily be seen that under normal conditions each indicator will display the indication corresponding to its last operated position.

With reference to FIG. 7, it is seen that the control relays PC and NC are indicated as being in their deenergized conditions. The detailed circuits for providing such relays deenergized are shown in FIGS. 3A to 3T. With control relays PC and NC deenergized at both stations A and B, the line relays FP and FN are also deenergized at both stations A and B. FIG. 7 shows that either control relay PC or control relay NC at either station A or station B must be energized to cause the energization of either line relay FP or line relay FN at both stations A and B.

The lock out relay LO which has to do with lock out conditions between the two stations A and B is normally energized at each station. Such relay LO is normally held energized through a stick circuit including contacts of the line relays FP and FN. More specifically, this energization circuit extends from (+), through back contact 21 of relay FN, through back contact 13 of relay FP, through front contact 443 of relay LO, through a resistor 5R, through the winding of relay LO, to (—). Several stick circuits are provided to hold relay LO energized at the control initiating station during cycles of operation, at one station by the initiation of controls at the other thus preventing interruption of the operation of apparatus station. This will be more apparent as the description progresses. The resistor 5R included in the above energization circuit for relay LO is included to reduce the current flow through the lower winding or the relay LO. This is to insure proper control of relay LO by the stick circuits during cycles of operation and periods of at-rest, as will be apparent from the following description.

*Altitude Reservation*

Initiation of a reservation cycle can be rendered effective at either station A or B by the manual designation of an altitude selector button on the panel CP corresponding to the altitude desired and a reservation button on the panel CP corresponding to the particular reservation desired. A sequence chart for an amber reservation in altitude 2 is shown in FIGS. 6A to 6E. Such chart also shows the sequence of operation for an additional cycle of operation. The first cycle of operation corresponds to an amber reservation while the second cycle of operation corresponds to the posting of letter "C" in the second indicator of altitude 2 or indicator 2KB. It is considered necessary to include the sequence chart for such two cycles of operation to show that the changeable display indicators at stations A and B do not operate simultaneously during a reservation cycle while the changeable display indicators for displaying flight data at both stations A and B do operate simultaneously.

Figure 1:
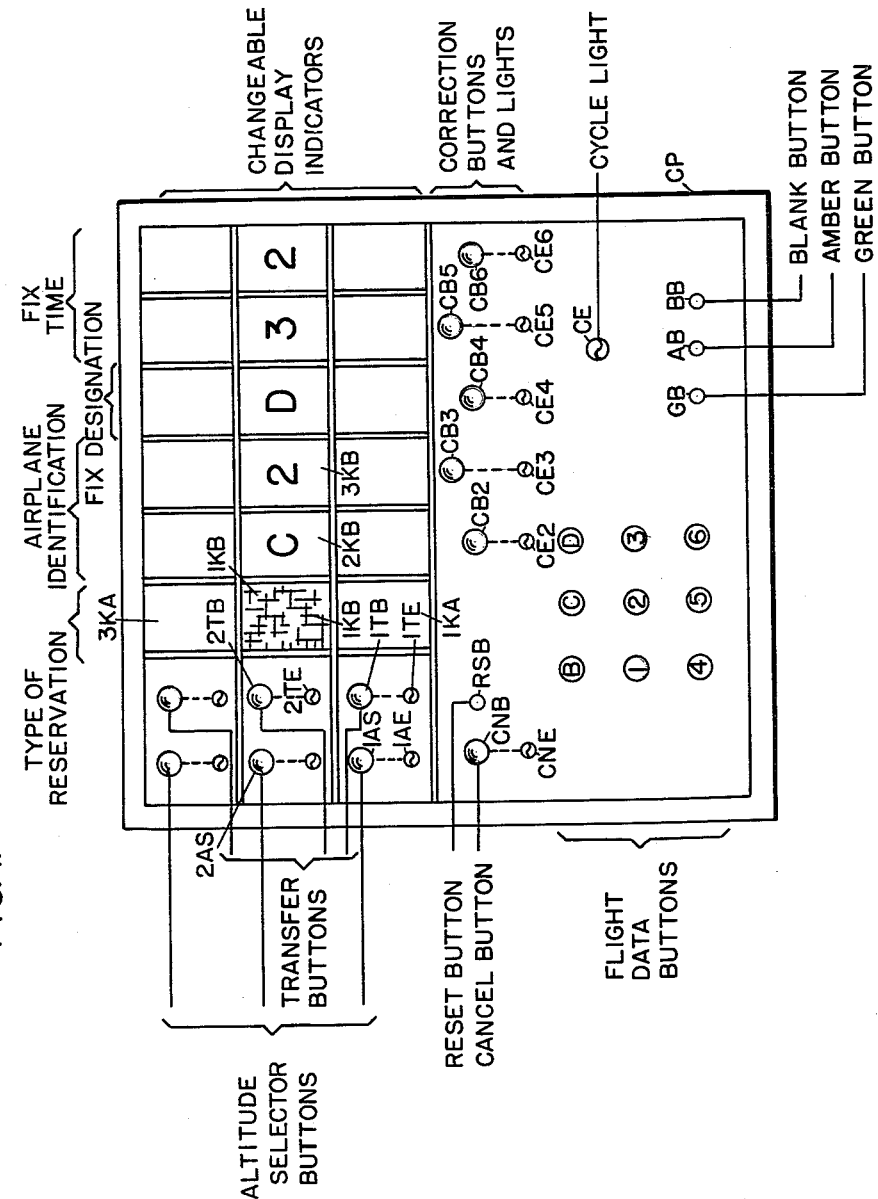
FIG. 1 illustrates a typical flight controller's control panel having a plurality of changeable display indicators for each flight altitude module, a cycle light and manually operated buttons for designating the various controls.

The changeable display indicators, shown in FIG. 1 as being on the panel CP for altitude 2, are positioned to display the reservation amber color and flight data as shown. With reference to the code chart shown in FIG. 4 and the changeable display indicators for altitude 2 shown in FIG. 3T, it will be noted that the position of the changeable contacts for such indicators correspond to the indications as shown on the indicators in FIG. 1. That is, considering changeable display indicator 1KB, changeable contacts 1C, 3C and 4C are closed while changeable contacts 2C, 5C and 6C are open. In this connection, a (+) in the code chart of FIG. 4 indicates the corresponding changeable contact of an indicator is open for that position while a (0) indicates the corresponding changeable contact of such indicator for that position is closed. In discussing the typical cycles of operation as shown in the sequence chart of FIGS. 6A to 6C, it will be assumed that each of the changeable display indicators is in a blank position. Referring to the code chart shown in FIG. 4, it will be seen that for an indicator to be in the blank position, its changeable contacts 1C, 5C and 6C must be open while changeable contacts 2C, 3C and 4C must be closed assuming the control buses were energized in the combination indicated.

In considering the detailed operation for an altitude reservation, let it be assumed that the controller at station A desires to obtain an amber reservation in altitude 2. To initiate the code communication apparatus at station A into an amber reservation cycle of operation for altitude 2, the controller must designate altitude selector button 2AS and amber button AB. Upon the designation of buttons 2AS and AB, and assuming the code communication apparatus at both stations A and B is at rest, the following sequence of operation will occur at stations A and B in their respective code communication apparatus to cause an amber color or reservation to be displayed in the first indicator located in the second altitude, or changeable display indicator 1KB.

At station A, upon designation of altitude selector button 2AS by the controller, column relay C1B is energized by a circuit extending from (+), through front contact 450 of relay LO, over wire 500, through front contact 470 of cancel button CNB, through front contacts 471, 472, 473, 474 and 475 of correction buttons CB6, CB5, CB4, CB3, and CB2 respectively, over wire 501, through front contacts 477 and 478 of transfer buttons 2TB and 1TB respectively, through back contact 259 of row registration relay RRP, over wire 502, through front contact 480 of altitude selector button 1AS, through back contact 481 of altitude selector button 2AS, through diode 52D, over wire 503, through the lower winding of relay C1B, over wire 504, through back contact 451 of relay CO, to (—). (+) from the same source, i.e., through front contact 450 of relay LO, is also applied to the common connection of the changeable contacts 1C through 6C through the same circuit as given above up to and including the back contact 481 of button 2AS with the energizing circuit continuing through diode 53D, over wire 506, through diode 9D associated with changeable display indicator 1KB, to the common connection of the changeable contacts 1C through 6C. With these two conditions prevailing, a combination of three-out-of-six bus relays BP are energized in accordance with the closed changeable contacts of changeable display indicator 1KB to further provide an energizing circuit for one of the reservation relays AP, GP or RP, the energization of which affects the conditioning of the code communication apparatus at both stations A and B accordingly. The manner in which the BP relays are energized in combinations is fully disclosed in the Patent No. 3,054,984 granted to C. S. Wilcox on September 18, 1962, as mentioned above.

It should be noted here that, generally speaking, the applicant, Wilcox, discloses a posting and transfer system wherein changeable display indicators of the 36 position type as disclosed in the above named Maynard application are adapted to be operated when suitable energy sources are applied to four out of eight bus wires with appropriate buttons being actuated for conditioning the transistorized motor controlling circuit of a selected changeable display indicator. The manner in which the transistorized motor controlling circuit controls the motor M, the bus repeater relays BP are energized and the manner in which the transistorized disabling circuit (transistors 9Q and 10Q and associated elements) is employed in controlling the energization of the BP relays is fully shown and described in the pending application by C. S. Wilcox as noted above. For convenience, similar reference characters have been employed herein to identify similar circuit elements and changeable display indicators shown in the Wilcox pending application which serve similar functions. For these reasons, it is believed unnecessary to provide a detailed explanation of the posting and transfer system as such, but to provide only an explanation of the operations which occur in response to the actuation of appropriate buttons included herein for controlling the operation of selected changeable display indicators.

In response to positive (+) potential being applied to the common connection of the changeable contacts 1C through 6C of changeable display indicator 1KB as stated above, and assuming such indicator 1KB to be in a blank position wherein changeable contacts 1C, 5C and 6C are opened while changeable contacts 2C, 3C and 4C are closed, bus relays 2BP, 3BP and 4BP are energized. Such relay energization and the energizing circuits therefor will be given for relay 2BP here as being typical for the relays 3BP and 4BP, as well. Referring to FIGS. 3O, 3P, 3S and 3T, and more particularly to the transistorized disabling circuit including transistors 9Q and 10Q, it will be seen that transistor 9Q is energized during periods when no changeable display indicator is being operated while transistor 10Q is deenergized during such periods. With transistors 9Q and 10Q in these respective conditions, transistor 9Q is effective to provide a positive (+) potential to the collectors of NPN type transistors 1Q through 6Q. In general, NPN type transistors require positive (+) potential on the collector, positive (+) potential on the base and negative (—) potential on the emitter to cause energization. Considering NPN type transistor 2Q associated with bus relay 2BP and the present circuit conditions as stated above, these three conditions for energization of transistor 2Q are satisfied. That is, a positive (+) potential is applied to the collector of transistor 2Q from the positive (+) terminal of a battery 48, over wire 507, through the transistor 9Q from emitter to collector, through the winding of relay 2BP, to the collector of transistor 2Q; a positive (+) potential is applied to the base of transistor 2Q by reason of the voltage drop occurring in resistor 34R which results from a current flow established from (+) being applied to the common connection of the changeable contacts 1C through 6C for changeable display indicator 1KB as stated above, through closed changeable contact 2C, through diode 2D, over column bus B2, through resistor 2R, over control bus 2CB, through resistor 33R, through resistor 34R, to (—); and a negative (—) potential is applied to the emitter of transistor 2Q from the negative (—) terminal of battery 48, over wire 508, through diode 20D, to the emitter of transistor 2Q. The transistor 2Q is thus energized which energization is effective to cause energization of relay 2BP connected in its collector circuit. Relays 3BP and 4BP are similarly energized. Amber reservation relay AP is energized by a circuit including front and back contacts of all the BP relays and a front contact of relay C1B. Such energization circuit extends from (+), through front contact 52 of relay C1B, over wire 509, through back contact 292 of relay 1BP, through front contact 287 of relay 2BP, through front contact 282 of relay 3BP, through front contact 277 of relay 4BP, through the upper winding of relay AP, through back contact 273 of relay 5BP, through back contact 267 of relay 6BP, to (—). Energization of amber reservation relay AP in this manner is effective to condition the code communication apparatus at both stations A and B in accordance with the actuation of the button AB by the controller at station A.

The above circuits are maintained energized due to the fact that altitude selector button 2AS is maintained depressed by reason of its associated holding coil 2AH being energized by a circuit extending from (+), through front contact 450 of relay LO, over wire 500, through front contact 470 of cancel button CNB, through front contacts 471, 472, 473, 474 and 475 of correction buttons CB6, CB5, CB4, CB3 and CB2 respectively, over wire 501, through front contacts 477 and 478 of transfer buttons 2TB and 1TB respectively, through back contact 259 of relay RRP, over wire 502, through front contact 221 of relay AP, over wire 511, through the holding coil 2AH, through back contact 482 of altitude selector button 2AS, through front contact 479 of altitude selector button 1AS, to (—). This circuit is maintained until relay RRP is energized; then, such circuit is disconnected by reason of the back contact 259 of relay RRP being opened.

Upon actuation of amber button AB following actuation of altitude selector button 2AS, the code communication apparatus at station A is further conditioned. With reference to the sequence chart shown in FIGS. 6A to 6E, it will be seen that the code determining relays CD1 through CD6 are energized in particular code combinations in accordance with the altitude selector buttons and reservation or flight data buttons selectively actuated. In the present case, actuation of buttons 2AS and AB causes code buses 2CDB, 5DB and 6CDB to be energized. The energizing circuits for code determining relays CD2, CD5 and CD6 are thus established. One such circuit, for example, for relay CD2 extends from (+), through front contact 450 of relay LO, over wire 500, through front contact 470 of cancel button CNB, through front contacts 471, 472, 473, 474 and 475 of correction buttons CB6, CB5, CB4, CB3 and CB2 respectively, over wire 501, through front contacts 477 and 478 of transfer buttons 2TB and 1TB respectively, through back contact 259 of relay RRP, over wire 502, through front contact 221 of relay AP, over wire 511, through back contact 490 of amber button AB, through diode 60D, through back contact 483 of altitude selector button 2AS, through diode 62D, over bus 2CDB, through the lower winding of relay CD2, over wire 512, through back contact 455 of relay CO, to (—). With relays CD2, CD5 and CD6 thus energized, an energizing circuit for check relay CK is established through front and back contacts of the code determining relays CD1 through CD6. Such circuit extends from (+), through front contact 340 of relay CD6, through front contact 329 of relay CD5, through back contact 322 of relay CD4, through back contact 313 of relay CD3, through front contact 306 of relay CD2, through back contact 298 of relay CD1, through the winding of relay CK, to (—). Energization of relay CK establishes energizing circuits for the row or altitude relay RA for conditioning the transistorized motor controlling circuit of changeable display indicator 1KB and for the cycle light CE for illuminating such light CE to thus indicate to the controller at station A that the CD relays are conditioned in accordance with the altitude selector button and the reservation button selected. The energizing circuit for relay RA extends from (+), through front contact 52 of relay C1B, over wire 513, through back contact 35 of relay CP, over wire 514, through back contact 151 of relay BK, over wire 515, through front contact 157 of relay CK, through front contact 307 of relay CD2, over wire 515, through the upper winding of relay RA, to (—). The energizing circuit established for cycle light CE extends from (+), through front contact 156 of relay CK, through diodes 65D and 66D, through the cycle light CE, to (—). Energization of relay RA establishes an energizing circuit for relay RRP extending from (+), through front contact 244 of relay RA, through the winding of relay RRP, to (—). Energization of relay RA for altitude 2 also conditions the transistorized motor controlling circuit associated with each of the changeable display indicators in altitude 2 or row B. That is, energization of relay RA causes the normally energized transistor 16Q to be deenergized, thereby conditioning the base of each transistor 11Q associated with a changeable display indicator in altitude 2 or row B. More specifically, the transistor 16Q has positive (+) potential applied directly to its base from the positive (+) terminal of battery 48, through back contact 216 of amber transfer relay AT, through front contact 247 of relay RA, through back contact 253 of relay RB, to the base of transistor 16Q to thus deenergize transistor 16Q. The positive (+) potential applied through the diodes 12D to the bases of transistors 11Q for the changeable display indicators 1KB, 2KB and 3KB by reason of the energization of transistor 16Q is thus removed. Also, upon energization of relay RA, the altitude light 2AE for altitude 2 is illuminated through the energizing circuit extending from (+), through front contact 245 of relay RA, through back contact 251 of relay RB, through the light 2AE, to (—) thus indicating to the controller at station A that the code communication apparatus is being conditioned for reservation in altitude 2 in accordance with the button selections made.

Upon the energization of relay RRP, the above stated energizing circuits dependent upon back contact 259 of relay RRP, including the holding or stick circuit for altitude selector button 2AS, the column relay C1B, the relays 2BP, 3BP and 4BP and amber button AB are deenergized or released as the case may be. The amber relay AP is deenergized following the release of the BP relays. Following the energization of relay RRP, the control relay PC is energized and is further effective to condition the code communication apparatus to initiate the stepping relays in sequence at both stations A and B to thereby cause the line relays at each station to be sequentially energized in accordance with the CD relays previously energized at station A. The energizing circuit for control relay PC established when relay RRP is energized extends from (+), through front contact 155 of relay CK, over wire 516, through back contact 408 of stepping relay V8, over wire 517, through back contact 112 of relay RO, over wire 518, through back contact 425 of relay R, through back contact 434 of relay S, over wire 519, through back contact 119 of relay 1CKP, over wire 520, through front contact 256 of relay RRP, through back contact 237 of relay GPP, over wire 521, through back contact 6 of relay NC, through the upper winding of relay PC, through the back contact 419 of relay LP, through the back contact 455 of relay CO, to (—).

It has been stated heretofore that, during a cycle of operation, energization of either control relay NC or PC at either station A or station B causes the corresponding line relays FN or FP at both stations A and B to be simultaneously energized. This condition may be seen for the control relay PC energized via the circuit given above by referring to FIG. 7. In FIG. 7, it is seen that the energizing circuits for line relays FP and FN at both stations A and B are established through front and back contacts of the control relays PC and NC. More particularly, line relay FP is energized at both stations A and B by the circuit extending from (+), through a variable resistor 50R, through front contact 4 or relay PC located at station A, over line wire L2, through back contact 4 of relay PC located at station B, through back contact 9 of relay NC, through back contact 8 of relay NC, through back contact 3 of relay PC, through back contact 23 of relay FN, through the winding of relay FP located at station B, through diode 40D, over line wire L1, through back contact 23 of relay FN located at station A, through the winding of relay FP located at station A, through diode 40D, through front contact 30 of relay PC, to (—). With the line relays FP at both stations A and B thus energized, the code communication apparatus at each station is further conditioned in simultaneous steps and subsequently initiates the stepping operation or the energization of the stepping relays V for conditioning the code communication apparatus at each of the stations for causing the changeable display indicator 1KB at each of the stations to display a reservation indication. The sequence of operation for the stepping relays V and other suitable relays is given in the sections A, B and C of FIG. 6. The operation of the code communication apparatus located at station A will be considered first or separately while the operation of the code communication apparatus located at station B will be considered second so as to avoid confusion in describing the various circuits.

With reference to FIG. 6A, it will be noted that the line pulsing relay LP and the column relay C1A are energized following the energization of line relay FP at station A. The line pulsing relay LP is energized by a circuit extending from (+), through the upper winding of relay LP, through front contact 10 of relay FP, through back contact 451 of relay CO, to (—). The column relay C1A is energized in response to the energization of line relay FP for providing an energizing circuit for the column relay C1B previously energized by the circuit established when altitude selector button 2AS was actuated and which was deenergized upon the energization of row relay RRP. The energizing circuit for column relay C1A extends from (+), through back contact 440 of the send relay S, through the back contact 429 of the receive relay R, through diode 68D, through front contact 12 of relay FP, through back contact 37 of relay CP, through the upper winding of relay C1A, through back contacts 86, 92, 98, 104 and 109 of column relays C2, C3, C4, C5 and C6 respectively, through back contact 451 of relay CO, to (—). The energization circuit established for column relay C1B extends from (+), through front contact 44 of relay C1A, through the upper winding of relay C1B, through back contact 451 of relay C1, to (—). Simultaneous with the energization of relay C1B is the energization of send relay S. The energizing circuit for relay S extends from (+), through the lower winding of relay S, over wire 525, through back contact 211 of relay AT, over wire 526, through front contact 444 of relay LO, through front contact 14 of relay FP, through front contact 422 of relay LP, over wire 527, through back contacts 363, 370, 376, 383, 390, 397, 404 and 413 of stepping relays V1, V2, V3, V4, V5, V6, V7 and V8 respectively, over wire 528, through back contact 456 of relay CO, to (—). With the line pulsing relay LP and the send relay S both energized, the energizing circuit for control relay PC is disconnected and control relay PC thus is released. The line relay FP dependent upon energization of control relay PC is released following the release of control relay PC. A stick circuit established for column relay C1A after such relay C1A is initially energized by the above circuit extends from (+), through front contact 262 of relay RRP, over wire 625, through front contact 45 of relay C1A, through the upper winding of relay C1A, through back contacts 86, 92, 98, 104 and 109 of column relays C2, C3, C4, C5 and C6 respectively, over wire 504, through back contact 451 of relay CO, to (—).

The bus repeater relays 2BP, 3BP and 4BP were previously energized upon the actuation of altitude selector button 2AS and the energization of column relay C1B. These relays were initially energized to show the position of changeable display indicator 1KB. If the changeable display indicator 1KB displayed a red symbol denoting that the respective altitude was occupied at station B, the code communication apparatus located at station A would not respond to the selection of an amber button for conditioning the code communication apparatus. In the present case, it has been assumed that the indicator 1KB is displaying a blank indication and has its changeable contacts 1C through 6C opened and closed accordingly. To make the code communication apparatus responsive to the buttons selected, the bus repeater relays 2BP, 3BP and 4BP are again energized following the energization of column relay C1B. Each of these relays is energized by a different circuit than has been stated heretofore. Considering bus repeater relay 2BP once more, a circuit for causing the energization of transistor 2Q extends from the (+) terminal of battery 48, through diode 15D, through diode 14D and resistor 23R in shunt, over wire 508, over wire 529, through resistor 18R, through the PNP type transistor 11Q, through closed commutator contact 2C, through diode 2D, over bus B2, through resistor 2R, over control bus 2CB, through the resistor 33R, through resistor 34R, to the (—) terminal of battery 48. This circuit is effective to cause a potential drop across resistor 34R to thereby place the base of transistor 2Q at a positive (+) potential. The energizing circuit for bus repeater relay 2BP then extends from (+) developed by the voltage dividing network consisting of resistor 29R and diodes 19D and 20D, through transistor 9Q, through the winding of relay 2BP, through transistor 2Q, through diode 20D, over wire 530, to the (—) terminal of battery 48. The bus repeater relays 3BP and 4BP have similar energizing circuits established and are thus energized simultaneously with the energization of relay 2BP. The amber relay AP is energized as before and is indicative of the type of reservation requested. The code communication apparatus will be conditioned accordingly for operation of the indicators 1KB located at both station A and station B in response to the energization of the amber relay AP.

In connection with the energization circuit given above for conditioning the base of transistor 2Q, it is to be understood that insufficient current flows through transistor 11Q to cause a very substantial potential drop across resistor 18R. It is shown and described in the above named Wilcox application how a potential drop across resistor 18R causes the base of transistor 12Q to be placed at a negative (—) potential for causing such transistor 12Q to be energized for completing the motor operating circuit. The addition of resistors 33R and 34R in the energizing circuit for transistor 2Q limits the current through the base controlling circuit for transistor 2Q which circuit includes transistor 11Q and resistor 18R associated with indicator 1KB. In the operation of indicator 1KB which will be given hereinafter, negative (—) potential is applied directly to three of the control buses 1CB to 6CB for causing a substantial potential drop in resistor 18R to subsequently cause energization of transistor 12Q for operating the motor M.

Following the deenergization of line relay FP, the stepping relays V are energized in sequence. Stepping relay V1 is energized by the circuit extending from (+), through front contact 440 of relay S, through back contact 11 of relay FP, through back contact 18 of relay FN, through front contact 421 of relay LP, over wire 531, through back contact 417 of relay VP, over wire 532, through the winding of relay V1, over wire 533, through back contacts 370, 376, 383, 390, 397, 404 and 413 of relays V2, V3, V4, V5, V6, V7 and V8 respectively, over wire 528, through back contact 456 of relay CO, to (—). Following the dropping away of relay FP, the line pulsing relay LP is released slowly. This relay is made a slow release relay by shunting the lower winding with a resistor R78 which is in series with a contact 420 of such relay. It will be noted above that the front contact 421 of relay LP is included in the energization circuit for stepping relay V1. Knowing this, it is obvious that the relay LP must be a slow release relay to allow ample time for energizing the stepping relay V1. Referring to the sections A, B, C, D and E of FIG. 6, it will be noted that the relay LP is indicated to be released slowly following the release of either the FP or FN line relays for allowing ample time for energizing the respective stepping relays V. Following the release of line pulsing relay LP, stepping relay V1 is held energized by a stick circuit extending from (+), through front contact 361 of relay V1, through the winding of relay V1, over wire 533, through back contacts 370, 376, 383, 390, 397, 404 and 413 of stepping relays V2, V3, V4, V5, V6, V7 and V8 respectively, over wire 528, through back contact 456 of relay CO, to (—). Referring now to FIG. 6A and more particularly to the sequence chart for the station A, it will be noted that the code communication apparatus located at station A is now conditioned for the six stepping pulses which must follow before, in this instance, the changeable display indicator 1KB located at station A may be operated to a position characteristic of the amber symbol. Before continuing with such six stepping cycles, it is considered expedient to refer to the code chart shown in FIG. 4 to explain the direct and indirect meanings that such code chart can convey in connection with the various circuits of FIG. 3.

Referring now to the code chart shown in FIG. 4, it will be noted that three three-out-of-six type codes are provided in connection with control buses 1 to 6 for each of the altitudes 1 to 3. Each of the three codes for each of the altitudes has a letter indicative of the type of reservation assigned to it as well as either a numeral or a letter assigned to it indicative of an item of flight data. In other words, each code represented in the code chart shown in FIG. 4 has assigned to it a letter indicative of the type of reservation and a numeral or letter indicative of an item of flight data. The code communication apparatus located at both station A and station B is responsive to the actuation of a reservation button and a flight data button at either station A or station B having the same code assigned to their respective indications as shown in the code chart of FIG. 4 for successively operating the respective changeable display indicators in a selected altitude at both stations A and B. In the code chart shown in FIG. 4, the (+) denotes that the control bus for that position is energized, while a (0) denotes that the control bus for that position is deenergized. In this connection, the (+) does not necessarily denote that the control buses are energized with a positive (+) potential or a negative (—) potential. As will be explained in more detail hereinafter, the control buses 1 to 6 are energized directly with a negative (—) potential for operating the motor M of a selected changeable display indicator. It has been described heretofore how the code determining relays CD1 to CD6 are energized in code combinations in response to the actuation of an altitude selector button and a reservation button. It has been shown that energizing circuits for the code determining relays CD1 to CD6 are made through closed contacts of these buttons. In particular, it has been shown and described that the code determining relays CD2, CD5 and CD6 were energized upon actuation of altitude selector button 2AS and reservation button AB. By referring to the code chart shown in FIG. 4, it is seen that for altitude 2 and the amber reservation, a (+) is allotted to control buses 2, 5 and 6. In other words, the (+) characters for each code combination shown in the code chart indirectly represent the code determining relays CD which must be energized when the respective buttons are actuated. This is also true for each button actuated which is representative of an item of flight data. This will be apparent as the description progresses.

In connection with the changeable display indicators shown in FIG. 3T, the code chart shown in FIG. 4 indirectly shows which of the commutator contacts 1C to 6C will be opened and which will be closed when the display of that indicator corresponds to a reservation amber or item of flight data with respect to a selected altitude. This is true as well when such indicator displays a blank. As noted in the sequence chart of FIG. 6 and more particularly section A, the bus relays 2BP, 3BP and 4BP were energized. The energization of these three relays was made possible by the closed commutator contacts 2C, 3C and 4C of changeable display indicator 1KB. Referring to the code chart shown in FIG. 4, and understanding that the indicator 1KB was previously assumed to be in the blank position, it will be noted that negative (—) potential is required on control buses 1, 5 and 6 in order to operate an indicator to the blank position. When the indicator is operated to the called for position, the commutator contacts corresponding to the deenergized buses are closed while the commutator contacts corresponding to the energized buses are open. The bus relays BP are then energized in accordance with the closed commutator contacts or, in other words, the control buses having a (0) for a particular three-out-of-six code.

In connection with the six stepping cycles which will be explained shortly, the control relays PC and NC are energized in code combinations corresponding to the combination of code determining relays CD energized in response to the selection of suitable buttons. By referring to the sequence chart shown in FIG. 6 and more particularly sections A and B, it will be noted that the control relay PC is indicated to be energized on the second, fifth and sixth stepping cycles while the control relay NC is indicated to be energized on the first, third and fourth stepping cycle. It will be noted that the stepping cycles in which it is indicated that the control relay PC is energized corresponds to the numbering of the code determining relays CD1 to CD6 that are energized in response to the actuation of the altitude selector button 2AS and the reservation button AB. This correspondence is true for each cycle of operation which will be apparent as the description progresses. The code chart shown in FIG. 4 is helpful again in that it indirectly conveys information as to which of the control relays PC and NC will be energized for any one of the six stepping cycles for a given cycle of operation. It would be necessary to assume that the control buses 1 to 6 are replaced by stepping cycles 1 to 6 for a given cycle of operation. With such assumption in mind, the (+) would denote that the control relay PC is energized for the respective stepping cycle while the (0) denotes that the control relay NC is energized for the respective stepping cycle. In the present case then, according to the code chart shown in FIG. 4, the control relay PC must be energized in stepping cycles 2, 5 and 6 while the control relay NC must be energized for stepping cycles 1, 3 and 4. Reference will now be made to the circuitry shown in FIG. 3 to describe how circuitwise this assumption is true.

Figure 6B:
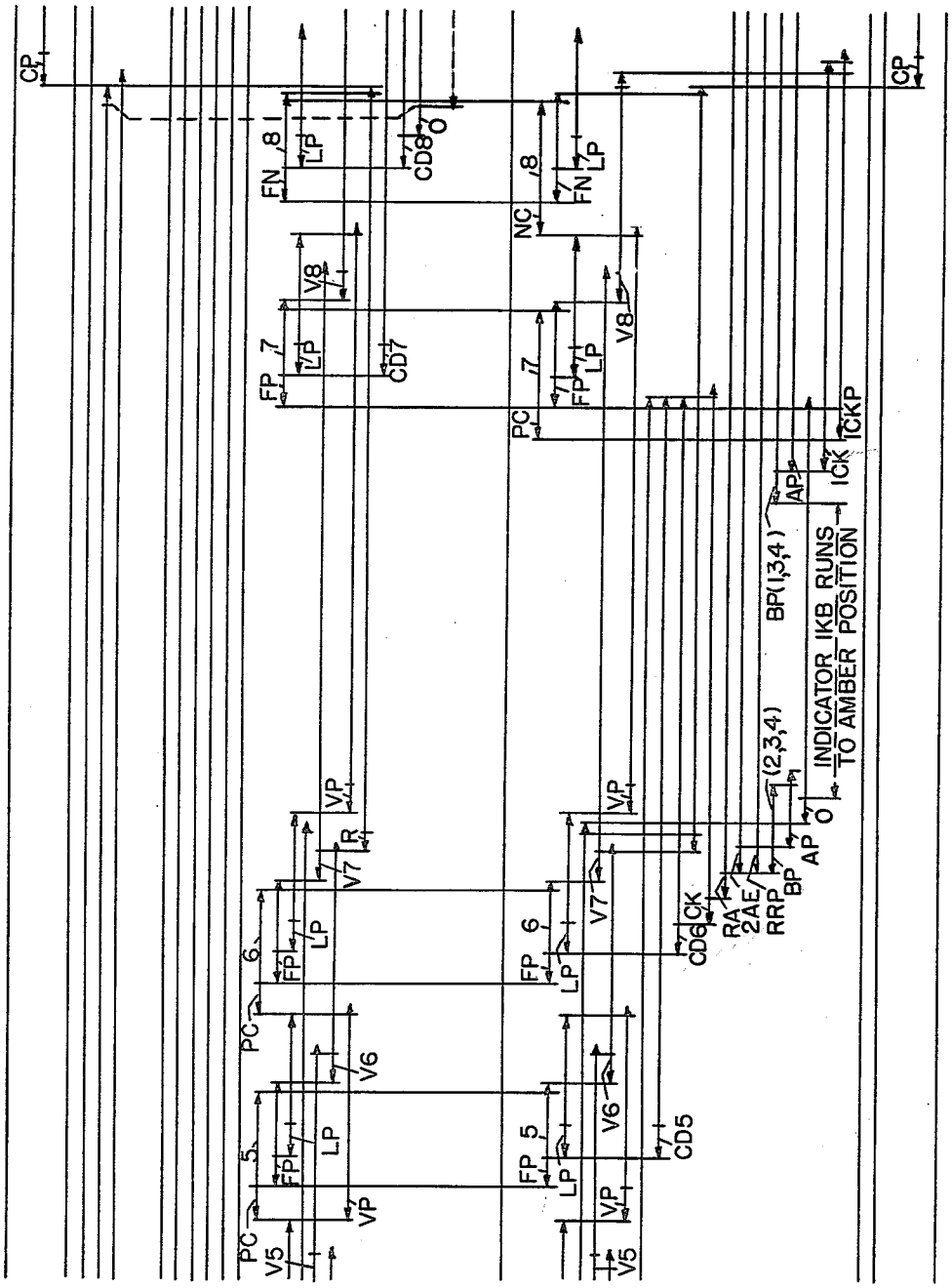
Figure 6C:
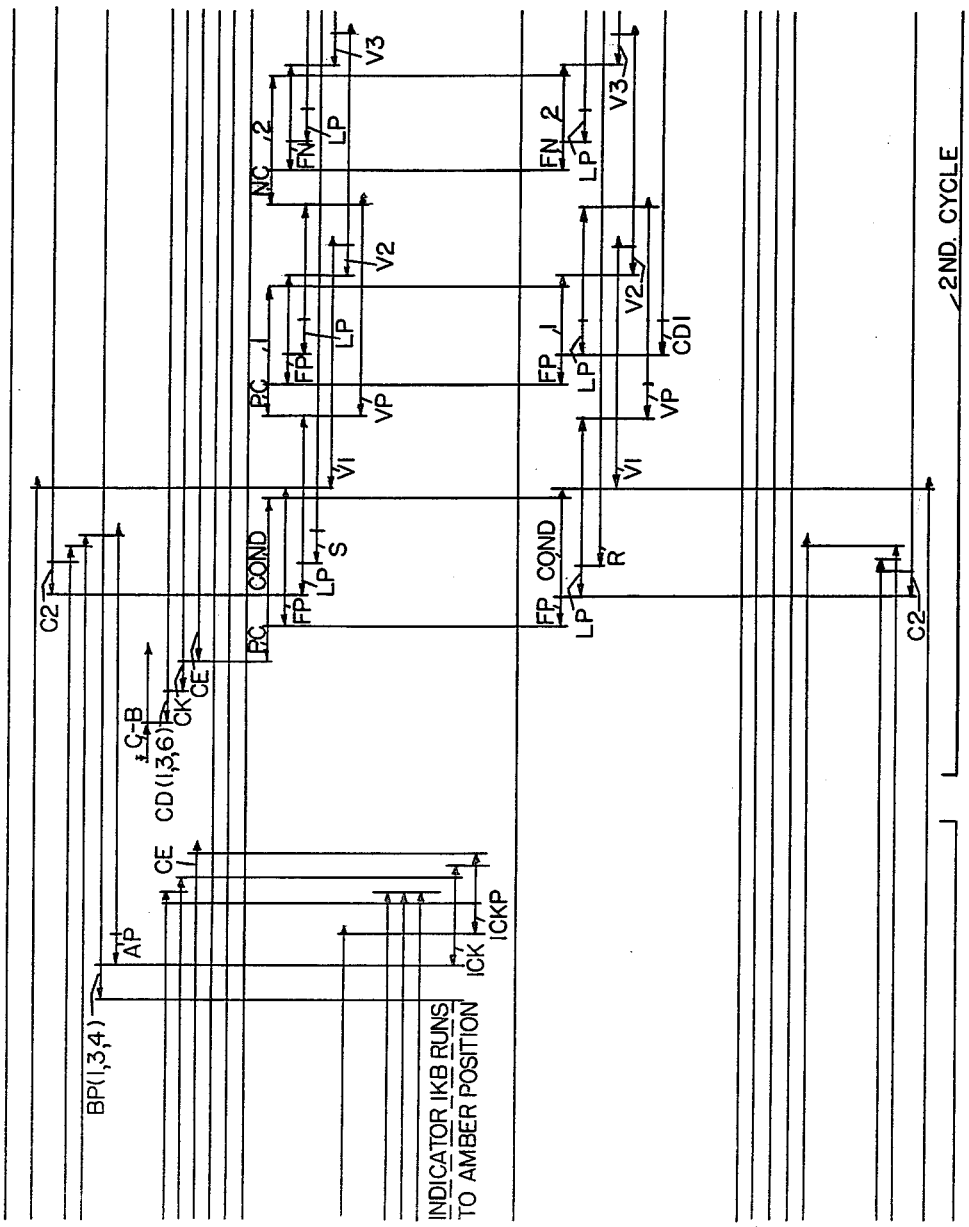

Referring to the sequence chart for station A shown in FIGS. 6A, 6B and 6C, it is seen that the control relay NC and the stepping repeater relay VP are energized simultaneously to initiate the first stepping cycle. Control relay NC is energized by a circuit extending from (+), through front contact 435 of send relay S, over wire 545, through front contact 357 of stepping relay V1, over wire 546, through back contact 296 of code determining relay CD1, over wire 547, through back contact 1 of control relay PC, through the upper winding of control relay NC, through back contact 419 of relay LP, through back contact 455 of relay CO, to (−). At the same time, the energizing circuit for the stepping repeater relay VP extends from (+), through front contact 440 of send relay S, through back contact 11 of line relay FP, through back contact 18 of relay FN, through back contact 421 of line pulsing relay LP, through the lower winding of relay VP, over wire 549, through front contact 363 of stepping relay V1, through back contacts 370, 376, 383, 390, 397, 404 and 413 of stepping relays V2, V3, V4, V5, V6, V7 and V8 respectively, over wire 528, through back contact 456 of relay CO, to (−). Following the energization of control relay NC, the energizing circuit for the line relays FN located at both stations A and B over the line wires L1 and L2 is established. A similar circuit for the line relay FP located at both stations A and B has been previously given with reference to FIG. 7. Referring again to FIG. 7, it is seen that for the present condition, the energizing circuit for the line relays FN extends from (+), through the variable resistor 50R, through front contact 8 of control relay NC located at station A, through back contact 3 of control relay PC, through back contact 16 of line relay FP, through diode 41D, through the winding of line relay FN, over line wire L1, through back contact 16 of line relay FP located at station B, through diode 41D, through the winding of line relay FN located at station B, through back contact 3 of control relay PC, through back contact 8 of relay NC, through back contact 9 of relay NC, through back contact 4 of relay PC, over line wire L2, through back contact 4 of control relay PC located at station A, through front contact 9 of control relay NC, to (−). The line relays FN are energized simultaneously when the control relay NC is energized at either station A or station B. In this manner, the code communication apparatus located at station A as well as station B are simultaneously conditioned by the stepping cycles. The conditioning of the code communication apparatus located at station A during these stepping cycles will be considered now only with reference to station A in order to show how the succeeding stepping cycles are accomplished.

Following the energization of line relay FN located at station A, the energizing circuit for the line pulsing relay LP is established and extends from (+), through the upper winding of relay LP, through front contact 17 of line relay FN, through back contact 451 of relay CO, to (−). Upon the energization of line pulsing relay LP, the energization circuit established through back contact 419 of relay LP is disconnected. Control relay NC is thus deenergized. It follows that the line relay FN is also deenergized following the deenergization of control relay NC. The line pulsing relay LP is deenergized upon the deenergization of line relay FN due to the front contact 17 of line relay FN being opened. The relay LP releases slowly due to its slow release characteristics described heretofore which permits an energizing circuit for the stepping relay V2 to be established. This energizing circuit extends from (+), through front contact 440 of send relay S, through back contact 11 of relay FP, through back contact 18 of relay FN, through front contact 421 of relay LP, over wire 531, through front contact 417 of relay VP, over wire 551, through front contact 359 of stepping relay V1, through the winding of stepping relay V2, over wire 552, through back contacts 376, 383, 390, 404 and 413 of stepping relays V3, V4, V5, V6, V7 and V8 respectively, over wire 528, through back contact 456 of relay CO, to (−). The stick circuit for stepping relay V1 which extends from (+), through front contact 361 of relay V1, through the winding of stepping relay V1, over wire 533, through back contacts 370, 376, 383, 390, 397, 404 and 413 of stepping relays V2, V3, V4, V5, V6, V7 and V8 respectively, over wire 528, through back contact 456 of relay CO, to (−) is disconnected upon the energization of stepping relay V2 as given above.

Following the slow release of line pulsing relay LP, the second stepping cycle is initiated as control relay PC is energized by a circuit extending from (+), through front contact 435 of send relay S, over wire 545, through back contact 357 of stepping relay V1, through front contact 365 of stepping relay V2, through front contact 304 of code determining relay CD2, over wire 521, through back contact 6 of control relay NC, through the upper winding of control relay PC, through back contact 419 of relay LP, through back contact 455 of relay CO, to (−). The stick circuit for relay VP which extends from (+), through back contact 178 of relay RC, over wire 554, through front contact 423 of relay LP, over wire 555, through front contact 415 of relay VP, through the upper winding of stepping relay VP, to (−) is disconnected following the release of line pulsing relay LP. The line relay FP and the line pulsing relay LP are again energized in order by energizing circuits heretofore described. The energizing circuit for control relay PC is disconnected as before upon the energization of pulsing relay LP and thus control relay PC is dropped away. Following the deenergization of control relay PC, the energizing circuit for line relay FP is disconnected, thus relay FP is deenergized. Upon the deenergization of line relay FP, the energizing circuit for relay LP is disconnected to thus deenergize relay LP. Before relay LP is released, however, the energizing circuit for stepping relay V3 is established and extends from (+), through front contact 440 of send relay S, through back contact 11 of relay FP, through back contact 18 of relay FN, through front contact 421 of relay LP, over wire 531, through back contact 417 of relay VP, over wire 532, through back contact 360 of relay V1, through front contact 367 of relay V2, through the winding of relay V3, through back contacts 383, 390, 397, 404 and 413 of stepping relays V4, V5, V6, V7 and V8 respectively, over wire 528, through back contact 456 of relay CO, to (−). Upon the energization of stepping relay V3, the energizing circuit including back contact 376 of relay V3 for stepping relay V2 is disconnected, thereby deenergizing relay V2.

Following the release of relay LP, control relay NC and stepping repeater relay VP are again energized to initiate the third stepping cycle. The energizing circuit for control relay NC extends from (+), through front contact 435 of send relay S, over wire 545, through back contacts 357 and 365 of stepping relays V1 and V2 respectively, through front contact 371 of stepping relay V3, through back contact 371 of code determining relay CD3, over wire 547, through back contact 1 of relay PC, through the upper winding of control relay NC, through back contact 419 of relay LP, through back contact 455 of relay CO, to (−). The energizing circuit for relay VP extends from (+), through front contact 440 of send relay S, through back contact 11 of relay FP, through back contact 18 of relay FN, through back contact 421 of relay LP, to the lower winding of relay VP, over wire 549, through front contact 376 of relay V3, through back contacts 383, 390, 397, 404 and 413 of stepping relays V4, V5, V6, V7 and V8 respectively, over wire 528, through back contact 456 of relay CO, to (−). The line relay FN and the line pulsing relay LP are similarly enregized following the energization of control relay NC. The control relay NC is similarly deenergized when its energizing circuit through back contact 419 of relay LP is opened. The line relay FN and the pulsing relay LP are again deenergized in sequence. Upon the deenergization of line relay FN, the energizing circuit for stepping relay V4 is established from (+), through front contact 440 of send relay S, through back contact 11 of relay FP, through back contact 18 of relay FN, through front contact 421 of relay LP, over wire 531, through front contact 417 of relay VP, over wire 551, through front contact 373 of relay V3, through the winding of stepping relay V4, through back contacts 390, 397, 404 and 413 of stepping relays V5, V6, V7 and V8 respectively, over wire 528, through back contact 456 of relay CO, to (−). Stepping relay V3 is released following the energization of relay V4 since its energizing circuit including back contact 383 of relay V4 is disconnected.

Following the release of line pulsing relay LP, the fourth stepping cycle is initiated as control relay NC is again energized. The energizing circuit for control relay NC is as described before except that it includes back contact 371 of relay V3 in lieu of front contact 371 of relay V3, front contact 378 of relay V4, over wire 559, and through back contact 319 of code determining relay CD4 in lieu of back contact 311 of code determining relay CD 3. Relay VP is released following the deenergization of relay LP since its stick circuit includes front contact 423 of relay LP, as described before. The line relay FN and the line pulsing relay LP are again energized as before following the energization of control relay NC. Following the energization of relay LP, control relay NC is deenergized since its energizing circuit includes back contact 419 of relay LP. The line relay FN is again deenergized following the release of control relay NC. The line pulsing relay LP is released following the release of line relay FN as before. Before line pulsing relay LP releases, stepping relay V5 is energized by a circuit extending from (+), through front contact 440 of send relay S, through back contact 11 of relay FP, through back contact 18 of relay FN, through front contact 421 of relay LP, over wire 531, through back contact 417 of relay VP, over wire 532, through back contact 360 of relay V1, through front contact 380 of relay V4, through the winding of relay V5, through back contacts 397, 404 and 413 of stepping relays V6, V7 and V8 respectively, over wire 528, through back contact 456 of relay CO, to (−). Upon the energization of relay V5, the energizing circuit for relay V4 including back contact 390 of relay V5 is disconnected to thus deenergize relay V4.

Following the release of line pulsing relay LP, the fifth stepping cycle is initiated as control relay PC is energized through a circuit similar to that disclosed heretofore except that such circuit includes back contact 378 of relay V4 in lieu of front contact 378 of relay V4, front contact 385 of relay V5, over wire 560, through front contact 562 of relay C1A, over wire 564 and through front contact 338 of code determining relay CD6. The energizing circuit for stepping repeater relay VP is similar to that given heretofore except that the circuit includes front contact 390 of relay V5 in lieu of front contact 376 of relay V3, back contact 383 of relay V4 and back contact 390 of relay V5. The energizing circuits for line relay FP and line pulsing relay LP are established as before to energize these relays. Following the energization of relay LP, control relay PC is deenergized since its energizing circuit includes back contact 419 of relay LP. The line relay FP is deenergized following the release of control relay PC. The line pulsing relay LP is released following the release of line relay FP as before. Before relay LP releases, however, stepping relay V6 is energized by a circuit extending from (+), through front contact 440 of send relay S, through back contact 11 of relay FP, through back contact 18 of relay FN, through front contact 421 of relay LP, over wire 531, through front contact 417 of relay VP, over wire 551, through front contact 387 of relay V5, through the winding of relay V6, through back contacts 404 and 413 of stepping relays V7 and V8 respectively, over wire 528, through back contact 456 of relay CO, to (−). Upon the energization of relay V6, the energizing circuit for relay V5 including back contact 397 of relay V6 is disconnected to thus deenergize relay V5.

Following the release of line pulsing relay LP, the sixth stepping cycle is initiated as control relay PC is energized through a circuit similar to that disclosed heretofore except that such circuit includes back contact 385 of relay V5 in lieu of front contact 385 of relay V5, over wire 562, through front contact 561 of relay C1A, over wire 571 and through front contact 327 of relay CD5. Relay VP is released following the deenergization of relay LV since its stick circuit includes front contact 423 of relay LP, as described before. The line relay FP and the line pulsing relay LP are energized as before following the energization of control relay PC. The energizing circuit for control relay PC is disconnected as before upon the energization of pulsing relay LP and thus control relay PC is released. Following the deenergization of control relay PC, the energizing circuit for relay FP is disconnected, thus relay FP is deenergized. Upon the deenergization of line relay FP, the energizing circuit for LP is disconnected to thus deenergize relay LP. Before relay LP is released, however, the energizing circuit for stepping relay V7 is established and extends from (+), through front contact 440 of send relay S, through back contact 11 of line relay FP, through back contact 18 of relay FN, through front contact 421 of relay LP, through back contact 417 of relay VP, over wire 532, through front contact 394 of relay V6, through the winding of relay V7, through back contact 413 of relay V8, over wire 528, through back contact 456 of relay CO, to (−). The energizing circuit for relay V6 is disconnected since it includes back contact 404 of relay V7 to thus deenergize relay V6. Upon the energization of stepping relay V7, the energizing circuit for receive relay R is established and extends from (+), through the lower winding of receive relay R, over wire 574, through front contact 445 of relay LO, over wire 575, through front contact 405 of relay V7, to (−). Following the energization of receive relay R, the stick circuit for send relay S which extends from (+), through back contact 409 of relay V8, over bus 577, through back contact 428 of receive relay R, through front contact 439 of send relay S, through the upper winding of send relay S, over bus 578, through back contact 456 of relay CO to (−) is disconnected. The send relay S is thus released. Following the release of relay LP, the energizing circuit for the stepping repeater relay VP is again established through the usual circuit as described heretofore except that it includes front contact 404 of relay V7 in lieu of front contact 390 of relay V5, back contact 397 of relay V6 and back contact 404 of relay V7.

It will be noted in referring to the sequence chart for station A shown in FIG. 6B, that following the energization of relay VP, there is a time lapse in which no further relays or other elements employed in the code communication apparatus of station A are energized or deenergized. During this lapse of time, it is indicated at station B that the indicator 1KB is operated to an amber position for displaying an amber symbol. On each reservation cycle of operation, whether it be for an amber reservation or a green reservation, the same condition will exist at the control designated station. It will also be noted that the receive relay R has been energized while the send relay S has been deenergized. This is to condition the code communication apparatus at station A to be responsive to the controls initiated at station B after indicator 1KB has been properly operated to its amber position. How this is accomplished at station B will be explained with reference to station B hereinafter; but, it is considered expedient to continue with the operation of the code communication apparatus at station A to avoid confusion keeping in mind the control relays PC and NC are energized in sequence at station B.

With the above in mind, let it be assumed that the indicator 1KB located at station B operates properly and that the control relay PC is energized to initiate the seventh stepping cycle. With reference to FIG. 7, the line relay FP is energized by a circuit extending from (+), through front contact 3 of relay PC located at station B, through back contact 23 of relay FN, through the relay FP located at station B, through diode 40D, over line wire L1, through back contact 23 of relay FN located at station A, through the winding of line relay FP located at station A, through diode 40D, through back contact 3 of relay PC, through back contacts 8 and 9 of relay NC, through back contact 4 of relay PC, over line wire L2, through front contact 4 of relay PC located at station B, through variable resistor 51R, to (−). With the line relay FP thus energized, the energizing circuit for relay LP is established as described heretofore. At the same time, the energizing circuit for the code determining relay CD7 is established and extends from (+), through front contact 430 of receive relay R, through front contact 15 of relay FP, over wire 579, through back contacts 362, 369, 375, 382, 389 and 396 of stepping relays V1, V2, V3, V4, V5 and V6 respectively, through front contact 403 of relay V7, over wire 580, through the lower winding of relay CD7, over wire 582, through back contact 454 of relay CO, to (−). Following the release of control relay PC at station B, the line relay FP is deenergized. Upon the release of relay FP, the energizing circuit for stepping relay V8 is established and extends from (+), through back contact 440 of relay S, through front contact 429 of receive relay R, through back contact 11 of relay FP, through back contact 18 of relay FN, through front contact 421 of relay LP, over wire 531, through front contact 417 of relay VP, over wire 551, through front contact 401 of relay V7, through the winding of stepping relay V8, over wire 528, through back contact 456 of relay CO, to (−). Relay V8 is thus energized which disconnects the stick circuit for relay V7 which includes back contact 413 of relay V8. Following the release of line pulsing relay LP, the stick circuit for relay VP is disconnected as before.

The control relay NC is now energized at station B to initiate the eighth stepping cycle. This will be explained in more detail hereinafter, but for the present it will be assumed that it is energized and establishes the energizing circuit for the line relays FN. Referring to FIG. 7, this circuit extends from (+), through front contact 9 of relay NC located at station B, through back contact 4 of relay PC, over line wire L2, through jack contact 4 of relay PC located at station A, through back contacts 9 and 8 of relay NC, through back contact 3 of relay PC, through back contact 16 of relay FP, through diode 41D, through the winding of relay FN located at station A, over line wire L1, through back contact 16 of relay FP located at station B, through diode 41D, through the winding of relay FN located at station B, through back contact 3 of relay PC, through front contact 8 of relay NC, through resistor 51R, to (−). The line pulsing relay LP is energized as before in response to the energization of line relay FN. At the same time, the energizing circuit for the code determining relay CD8 is established and extends from (+), through front contact 430 of receive relay R, through front contact 22 of line relay FN, over wire 584, through front contact 412 of relay V8, over wire 585, through the lower winding of relay CD8, over wire 582, through back contact 454 of relay CO, to (−). In this eighth stepping cycle before the relays FN and LP are released, the code communication apparatus is further conditioned and the indicator 1KB is initiated into operation as is shown in the sequence chart of FIGS. 6B and 6C. Following the energization of relay CD8, the energizing circuit for the operate relay O is established for connecting the control buses 1CB to 6CB to a negative (−) potential through opened and closed contacts of the CD relays for operating the indicator 1KB. The energization of relays CD7 and CD8 establish an energizing circuit for operate relay O which extends from (+), through back contact 210 of amber transfer relay AT, over wire 535, through back contact 54 of relay BK, over wire 536, through back contact 441 of send relay S, through front contact 431 of receive relay R, over wire 537, through front contact 355 of relay CD8, through front contact 350 of CD7, over wire 538, through front contact 448 of relay LO, over wire 539, through front contact 159 of check relay CK, over wire 540, through the lower winding of operate relay O, over wire 541, through back contact 458 of relay CO, to (−). With the energization of operate relay O and the previous energization of code determining relays CD2, CD5 and CD6, a negative (−) potential is supplied directly to control buses 2CB, 5CB and 6CB for operating indicator 1KB to the amber position. The display tape of the changeable display indicator 1KB is continually moved by a suitable gear train as long as the motor M is energized as disclosed in the above Maynard application. It has been stated heretofore that sufficient current must flow through resistor 18R associated with indicator 1KB to cause a substantial potential drop across resistor 18R to thereby place the base of transistor 12Q at a (−) potential. Energization of transistor 12Q is now established as a result of one or more of the electrical paths established through the changeable contacts 2C, 5C and 6C. One such path for changeable contact 2C extends from the (+) terminal of battery 48, through diode 15D, through resistor 23R, over wire 508, over wire 529, through resistor 18R associated with indicator 1KB, through transistor 11Q, through closed commutator contact 2C, through diode 2D, over column bus B2, through resistor 2R, over control bus 2CB, through front contact 189 of operate relay O, through front contact 309 of relay CD2, over wire 587, over wire 530, to the (—) terminal of battery 48. The electrical paths for commutator contacts 5C and 6C are similarly established over their respective control buses 5CB and 6CB during the operation of the motor M. Each of these three circuits is effective to cause the transistor 12Q to be energized for establishing the motor M energizing circuit which extends from (+) developed by the voltage divider including resistors 21R and 23R and diodes 13D and 15D, through the transistor 12Q, through the motor M, to (—). The transistor 12Q will be energized until such time as the indicator 1KB displays the amber symbol. When the amber symbol is displayed by indicator 1KB, each of the three electrical paths established through commutator contacts 2C, 5C and 6C will be disconnected since each of the these three contacts will be open. At this point, the transistor 12Q will be deenergized thus deenergizing the motor M.

It will be noted that when the indicator 1KB is initially operated, the bus repeater relays 2BP, 3BP and 4BP previously energized are now deenergized. This is due to the fact that their respective NPN transistors 2Q, 5Q and 6Q are each deenergized since a negative (—) potential is effectively applied to their respective bases when the control buses 2CB, 5CB and 6CB are energized with a negative (—) potential as described above. The amber relay AP whose energizing circuit is established through the front and back contacts of the bus repeater relays 1BP to 6BP is disconnected and the relay AP releases. The line relay FN is denergized following the release of control relay NC located at station B. The stick circuit for receive relay R which extends from (+), through front contact 21 of relay FN, over wire 590, through back contact 439 of send relay S, through front contact 428 of receive relay R, through the winding of receive relay R, over wire 591, through back contact 456 of relay CO, to (—) is obviously disconnected upon the release of relay FN. When the receive relay R is released, the column repeater relay CP is energized to provide the necessary circuits for the energization of column relay C2 and the subseqeunt deenergization of column relay C1A. As will be explained hereinafter, energization of column relay C2 conditions the indicator 2KB for operation. Before column repeater relay CP is energized, however, receive relay R must be released following the release of line relay FN as described above. The energizing circuit for relay CP then extends from (+), through back contact 440 of send relay S, through back contact 429 of receive relay R, through diode 68D, through back contact 12 of relay FP, through back contact 20 of relay FN, over bus 593, through the upper winding of relay CP, through front contact 46 of relay C1A, through back contacts 86, 92, 98, 104 and 109 of column relays C2, C3, C4, C5 and C6 respectively, over bus 504, through back contact 451 of relay CO, to (—). The line pulsing relay LP is deenergized as usual following the release of line relay FN.

When the changeable display indicator 1KB is operated to the amber position wherein the amber symbol is displayed by such indicator, its commutator contacts 2C, 5C and 6C are open while the commutator contacts 1C, 3C and 4C are closed. These closed commutator contacts are effective to establish energizing circuits for the transistors 1Q, 3Q and 4Q associated with bus repeater relays 1BP, 3BP and 4BP respectively. The transistors 1Q, 3Q and 4Q are energized by similar circuits to that described heretofore for transistor 2Q in connection with the operation at station A with the subsequent energization of their respective bus repeater relays 1BP, 3BP and 4BP. The amber repeater relay AP is again energized by a circuit including the front and back contacts of the relays 1BP to 6BP which extends from (+), through front contact 52 of relay C1B, over wire 509, through front contact 293 of relay 1BP, through back contact 287 of relay 2BP, through front contact 282 of relay 3BP, through front contact 277 of relay 4BP, through the upper winding of relay AP, through back contact 273 of relay 5BP, through back contact 267 of relay 6BP, to (—). At the same time, an energizing circuit for the check relay 1CK is established through front and back contacts of the relays 1BP to 6BP and the relays CD1 to CD8 now energized. This circuit extends from (+), through front contact 189' of operate relay O, over wire 594, through front contact 291 of relay 1BP, over wire 595, through front contact 308 of relay CD2, over wire 596, through front contact 281 of relay 3BP, through front contact 276 of relay 4BP, over wire 598, through front contact 333 of relay CD5, through front contact 342 of relay CD6, through front contact 349 of relay CD7, through front contact 354 of relay CD8, over wire 600, through the winding of relay 1CK, to (—). It is obvious from this circuit that the energizing circuit for the check relay 1CK is dependent upon the code determining relays CD previously energized as well as the bus repeater relays BP energized in response to the correct operation of the changeable display indicator 1KB. It will be noted by referring to FIGS. 3J and 3K that the code determining relays CD1 to CD6 are each connected in shunt with their corresponding bus repeater relays BP1 to BP6, i.e., for example, code determining relay CD1 is connected in shunt with bus repeater relay 1BP. Each such combination is then connected in series with each of the other combinations. It should be obvious then that when three of the six code determining relays CD1 to CD6 are energized, the complementary bus repeater relays BP1 to BP6 must be energized following an indicator operation to complete the energizing circuit for check relay 1CK. Following the energization of relay 1CK, the energizing circuit for the check repeater relay 1CKP is established and extends from (+), through front contact 133 of check relay 1CK, through the winding of check repeater relay 1CKP, to (—). Also, the stepping relay V8 held energized by its stick circuit extending from (+), through back contact 132 of check relay 1CK, over wire 602, through front contact 411 of relay V8, through the winding of relay V8, over wire 528, through back contact 456 of relay CO, to (—) is obviously disconnected. When the check repeater relay 1CKP is energized, the stick circuits for the operate relay O and each of the code determining relays CD1 to CD8 previously energized are disconnected. The stick circuit for operate relay O extends from (+), through back contact 126 of check repeater relay 1CKP, over wire 543, through front contact 191 of operate relay O, through the upper winding of relay O, over wire 541, through back contact 458 of relay CO, to (—). The stick circuits for relays CD1 to CD3 are dependent upon back contact 123 of check repeater relay 1CKP while the stick circuits for relays CD4 to CD8 are dependent upon back contact 122 of check repeater relay 1CKP. One such stick circuit for relay CD2 extends from (+), through front contact 156 of relay CK, through diode 65D, over wire 604, through back contact 123 of relay 1CKP, through back contact 140 of relay BKP, over wire 605, through front contact 305 of relay CD2, through the upper winding of relay CD2, over wire 512, through back contact 455 of relay CO, to (—). A stick circuit for relay CD6, for example, extends from (+), through front contact 156 of relay CK, through diode 65D, over wire 604, through back contact 122 of relay 1CKP, through back contact 139 of relay BKP, over wire 606, through front contact 339 of relay CD6, through the upper winding of relay CD6, over wire 582, through back contact 454 of relay CO, to (—). The relays CD2, CD5, CD6, CD7 and CD8 and relay O are thus deenergized. The check relay CK dependent upon the front and back contacts of code determining relays CD1 to CD6 for its energizing circuit is released following the deenergization of the CD relays. The stick circuit for relay 1CK which extends from (+), through front contact 155 of relay CK, over wire 516, through diode 81D, over wire 608, through front contact 134 of relay 1CK, through the winding of relay 1CK, to (−) is disconnected. Following the release of check relay 1CK, the energizing circuit for relay 1CKP including front contact 133 of relay 1CK is disconnected to thus deenergize relay 1CKP. The cycle light CE has been held energized through the cycle by a circuit including front contact 156 of relay CK. Upon the release of relay CK, the cycle light CE was continually held energized by a stick circuit extending from (+), through front contact 123 of relay 1CKP, over wire 604, through diode 66D, through the cycle light CE, to (−). Following the release of relay 1CKP, this energizing circuit for the cycle light CE is disconnected and the cycle light CE is thus deenergized. The deenergization of cycle light CE tells the controller at station A that the system including the code communication apparatus and indicator 1KB at both stations A and B has responded to the buttons designated at station A. The system now permits the controller at station A to designate a flight data button for the second cycle of operation in altitude 2. Before this second cycle of operation is considered, however, it is necessary to consider the operation of the code communication apparatus and the indicator 1KB located at station B in response to the altitude selector button 2AS and the amber button AB designated at station A.

The operation of the code communication apparatus shown in FIGS. 3A to 3T will now be considered with respect to station B. It must be assumed that the code communication apparatus shown in FIGS. 3A to 3T is in its at-rest condition. In this respect, a lockout relay LO would be energized while all other relays including the control relays PC and NC are deenergized. Again, although the indicator 1KB is indicated to be in its amber position, it is assumed to be in the blank position for the present consideration.

Referring now to FIGS. 6A, 6B and 6C, and more particularly to FIG. 6A, it is seen that nothing happens to the code communication apparatus at station B after the altitude selector button 2AS and the amber AB are designated at station A until the control relay PC is energized at station A. Following the energization of control relay PC at station A, the line relay FP located at stations A and B are energized. This initiates the conditioning cycle at station B as is shown in FIG. 6A. The lockout relay at station B is held energized by a stick circuit extending from (+), through back contact 21 of relay FN, through back contact 13 of relay FP, through front contact 443 of relay LO, through resistor 5R, through the lower winding of relay LO, to (−). With relay FP thus deenergized and knowing that the stick circuits established by front contacts of the relays CK, C1B and RRP are not established, the relay LO is deenergized. Following the release of lockout relay LO, an energizing circuit for cycle light CE is established and extends from (+), through back contact 447 of relay LO, over wire 609, through diode 83D, over wire 610, through diode 66D, through the cycle light CE, to (−). The cycle light CE is thus illuminated to indicate to the controller at station B that the controller at station A has initiated a reservation cycle of operation and that he should not designate controls on his control panel CP for causing operation of the code communication apparatus at either station B or at both stations A and B. Also, following the release of lockout relay LO, a stick circuit for the column relay C1A is established and extends from (+), through back contact 447 of relay LO, over wire 609, over wire 624, through diode 85D, over wire 625, through front contact 45 of column relay C1A, through the upper winding of relay C1A, through back contacts 86, 92, 98, 104 and 109 of column relays C2, C3, C4, C5 and C6 respectively, over wire 504, through back contact 451 of relay CO, to (−). Following the energization of line relay FP, the column relays C1A and C1B are energized in sequence corresponding with the energization of such relays at station A. The line pulsing relay LP is energized following the energization of line relay FP by the energizing circuit described heretofore. Following the energization of line pulsing relay LP, the energizing circuit for receive relay R is established and extends from (+), through the lower winding of receive relay R, over bus 574, through back contact 444 of relay LO, through front contact 14 of relay FP, through front contact 422 of relay LP, over wire 527, through back contacts 363, 370, 376, 383, 390, 397, 404 and 413 of stepping relays V1, V2, V3, V4, V5, V6, V7 and V8 respectively, over wire 528, through back contact 456 of relay CO, to (−).

Following the energization of receive relay R, the control relay PC at station A is indicated as being deenergized which deenergization disconnects the energizing circuit for the line relays FP. Following the deenergization of line relay FP at station B, the stepping relay V1 is energized simultaneous with the energization of stepping relay V1 located at station A in the same manner. In each of the eight stepping cycles wherein the FN and FP relays along with the stepping relays V1 through V8 and the VP and LP relays are energized, it is considered unnecessary to repeat the energizing circuits for these various relays or the sequence in which they are energized since it is obvious from the sequence charts shown in FIGS. 6A, 6B and 6C that the operation in sequence corresponds precisely to that shown for the station A. It will be noted, however, that the code determining relays CD2, CD5, and CD6 are energized in sequence with respect to their respective stepping cycles 2, 5 and 6. It will also be noted that the line relay FP is again energized for each of the stepping cycles 2, 5 and 6. This energization of the line relay FP and the code determining relays CD for the respective cycles of operation is in agreement with the assumptions made in connection with the code chart shown in FIG. 4. One of the energizing circuits for relay CD2, for example, extends from (+), through front contact 430 of receive relay R, through front contact 15 of relay FP, over wire 579, through back contact 362 of relay V1, through front contact 369 of relay V2, over wire 612, through the lower winding of relay CD2, over wire 512, through back contact 455 of relay CO, to (−). The energizing circuits for relays CD5 and CD6 may be similarly traced through their respective circuits including front and back contacts of the stepping relays V1 through V6.

Referring now to FIG. 6B, it may be seen that the relay CK is energized following the energization of relay CD6. The same energizing circuit through the front and back contacts of the relays CD1 to CD6 has been given in connection with the relay CK located at station A. Since this circuit is exactly the same, it is believed unnecessary to repeat it here. The row relay RA is energized by a circuit such as that described for station A. Following the energization of relay RA, the relay RRP and the altitude light 2AE are both energized by similar circuits to those described heretofore. Also, following the energization of relay RA, the base of transistor 11Q associated with indicator 1KB is again conditioned to thereby energize transistor 11Q. With the transistor 11Q in its energized condition and having the commutator contacts 2C, 3C and 4C closed, the transistors 2Q, 3Q and 4Q are energized as before by reason of their bases being placed at a positive (+) potential. The relays 1BP, 3BP and 4BP are thus energized. The energizing circuit for amber repeater relay AP including the front and back contacts of the relays 1BP to 6BP and front contact 52 of relay C1B is again established to energize relay AP. The energizing circuit for the operate relay O is dependent upon the energization of the send relay S and the deenergization of the receive relay R. Referring to FIG. 6B, it is seen that the send relay S is energized following the energization of stepping relay V7 which energizing circuit extends from (+), through the lower winding of send relay S, over wire 525, through back contact 445 of relay LO, over wire 575, through front contact 405 of stepping relay V7, to (−). Upon the energization of the send relay S, the stick circuit for the receive relay R is disconnected. Such stick circuit extends from (+), through back contact 409 of stepping relay V8, over wire 577, through back contact 439 of send relay S, through front contact 428 of receive relay R, through the winding of receive relay R, over wire 591, through back contact 456 of relay CO, to (−). With the send relay S energized and the receive relay R deenergized, the energizing circuit for the operate relay O extends from (+), through back contact 210 of relay AT, over wire 535, through back contact 54 of blank relay BK, over wire 536, through front contact 441 of send relay S, through back contact 432 of receive relay R, over wire 613, through back contact 53 of relay C1B, over wire 615, through back contact 448 of relay LO, over wire 539, through front contact 159 of relay CK, over wire 540 through the lower winding of operate relay O, over wire 541, through back contact 458 of relay CO, to (−). Upon the energization of operate relay O, the control buses 2CB, 5CB and 6CB are energized directly with a negative (−) potential from the (−) terminal of the battery 48 as described heretofore. The indicator 1KB for station B operates to its amber position whereat the commutator contacts 2C, 5C and 6C are opened and the commutator contacts 1C, 3C and 4C are closed. The relays 1BP, 3BP and 4BP associated with the control buses 1CB, 3CB and 4CB respectively are energized following the operation of indicator 1KB to its amber position. As stated heretofore, the transistors 1Q, 3Q and 4Q are energized when their respective bases are placed at a positive (+) potential and the transistor 9Q included in the disabling circuit is energized. The energizing circuit for the amber repeater relay AP is established through the front and back contacts of the relays 1BP to 6BP as described heretofore for station A. Also, the energizing circuit including the front contact of the code determining relays CD2, CD5 and CD6 and the bus repeater relays 1BP, 3BP and 4BP is established to energize the relay 1CK. The energizing circuit for the check repeater relay 1CKP including front contact 133 of relay 1CK is established to energize relay 1CKP. Following the energization of relay 1CKP, the stick circuits for the relays CD2, CD5 and CD6 including back contacts 122 and 123 of relay 1CKP are disconnected to thus deenergize these relays. Also, the stick circuit for the operate relay O including back contact 126 of relay 1CKP is disconnected to thus deenergize relay O. At the same time the check repeater relay 1CKP was energized, the seventh stepping cycle was initiated as the control relay PC was energized.

It has been stated heretofore that the station responding to controls initiated at the other station takes over transmission of controls after its selected indicator is operated to the called for position. Referring to FIG. 6B, it will be seen that the control relay PC is energized following the energization of relay 1CK, as noted above. This energizing circuit for control relay PC extends from (+), through front contact 435 of relay S, over wire 545, through back contacts 357, 365, 371, 378, 385 and 392 of stepping relays V1, V2, V3, V4, V5 and V6 respectively, over wire 619, through front contact 130 of relay 1CK, over wire 620, through front contact 300 of relay V7, over wire 521, through back contact 6 of relay NC, through the upper winding of control relay PC, through back contact 419 of relay LP, through back contact 455 of relay CO, to (−). The code communication apparatus located at station B thus takes over control of transmission for effecting the stepping cycles 7 and 8 to thus complete the reservation cycle of operation. To continue the seventh stepping cycle then, the line relay FP and the line pulsing relay LP are energized in sequence by circuits described heretofore. Upon the energization of line relay LP, the energizing circuit for relay PC including back contact 419 of relay LP is disconnected to thus deenergize relay PC. The relays FP and LP are deenergized in sequence following the release of relay PC. Before relay LP drops away, the stepping relay V8 is energized by a circuit described heretofore which energization disconnects the energizing circuit for stepping relay V7 to thus deenergize relay V7. When the relay LP is released, the energizing circuit for the control relay NC is established to initiate the eighth stepping cycle.

The circuit established for energizing control relay NC is the same as the energizing circuit for the control relay PC given above up to and including front contact 130 of relay 1CK with such circuit extending over wire 620, through back contact 399 of relay V7, through front contact 407 of relay V8, over wire 547, through back contact 1 of relay PC, to the upper winding of control relay NC, through back contact 419 of relay LP, through back contact 455 of relay CO, to (−). Following the energization of control relay NC, the stick circuit for relay VP including front contact 423 of relay LP is disconnected to thus deenergize relay VP. The relays FN and LP are energized in sequence by circuits given heretofore. Following the energization of relay LP, the energizing circuit for control relay NC is disconnected to thus deenergize relay NC. Following the release of relay NC, the energizing circuit for line relay FN is disconnected to thus deenergize relay FN. The send relay S has been held energized by several stick circuits after its energization following the energization of stepping relay V7. The first such circuit for holding send relay S energized extends from (+), through back contact 409 of relay V8, over wire 577, through back contact 428 of relay R, through front contact 439 of send relay S, over wire 578, through back contact 456 of relay CO, to (−). Another stick circuit is established when the relay VP is energized which extends from (+), through front contact 416 of relay VP, through back contact 428 of receive relay R, through front contact 439 of send relay S, through the upper winding of relay S, over wire 578, through back contact 456 of relay CO, to (−). Another stick circuit which is required to maintain send relay S energized following the release of relay VP and before relay FN is energized extends from (+), through back contact 178 of relay RC, over wire 554, through back contact 423 of relay LP, over wire 590, through back contact 428 of relay R, through front contact 439 of send relay S, through the upper winding of relay S, over wire 578, through back contact 456 of relay CO, to (−). When the line pulsing relay LP is energized, a stick circuit for holding send relay S energized has been established and includes a front contact of relay FN and extends from (+), through front contact 21 of relay FN, over wire 590, through back contact 428 of relay R, through front contact 439 of relay S, through the upper winding of relay S, over wire 578, through back contact 456 of relay CO, to (−). Following the release of relay FN as stated above, this stick circuit for the send relay S is disconnected to thus deenergize relay S.

Following the release of send relay S, the check relays 1CK and 1CKP are released in sequence while the column repeater relay CP is energized to provide for the conditioning of the code communication apparatus located at station B to respond to the controls designated at station A for the second cycle of operation. More particularly, the stick circuit for the stepping relay V8 extending from (+), through front contact 440 of relay S, through the diode 83D, over wire 622, through front contact 411 of relay V8, through the winding of relay V8, over wire 528, through back contact 456 of relay CO, to (−) is disconnected upon the release of send relay S. Also, upon the release of send relay S the energizing circuit for the column repeater relay CP extending from (+), through back contact 440 of send relay S, through back contact 429 of receive relay R, through diode 68D, through back contact 12 of relay FP, through back contact 20 of relay FN, over wire 593, through the upper winding of relay CP, through front contact 46 of relay C1A, through back contacts 86, 92, 98, 104 and 109 of column relays C2, C3, C4, C5 and C6 respectively, over wire 504, through back contact 451 of relay CO, to (—) is established to thus energize relay CP. Following the release of stepping relay V8, the check relay 1CK is released since its stick circuit includes front contact 409 of relay V8. The relay 1CKP is deenergized following the release of relay 1CK.

The above completes the operation of the code communication apparatus including the indicator 1KB located at station B for the amber reservation cycle designated by the controller at station A. The code communication apparatus located at both stations A and B are ready to respond to controls designated by the controller at station A for posting an item of flight data in the second indicator 2KB in the selected altitude 2. It will be noticed by referring to the sequence charts shown in FIGS. 6A to 6E that the cycle light CE stays energized at the station B after it is initially energized. This is provided to convey to the controller at station B that the controller at station A has designated controls for reserving an altitude and intends to post items of flight data therein. When the cycle light CE is thus illuminated continuously, the controller at station B should not initiate controls to disrupt the operation of his code communication apparatus which is being conditioned in response to the controls designated at station A.

*Posting of Flight Data*

Following the selection of an altitude and the completion of the reservation cycle for that altitude in response to the designation of appropriate buttons at one of two stations, the code communication apparatus at both of such stations is conditioned for a second cycle of operation wherein an item of flight data may be displayed in corresponding changeable display indicators in the selected altitude at both of such stations when a suitable flight data button is designated at one of such stations. In the present case, it has been shown and described how the altitude selector button 2AS and the amber button AB has been designated at station A to cause the changeable display indicator 1KB at both stations A and B to display an amber symbol. It also has been shown that the code communication apparatus at both stations A and B has been conditioned after such indicator operation for responding to the designation of a flight data button.

Let it be assumed that it is desired to post the letter C in the respective changeable display indicators 2KB at both stations A and B. Assuming that the code communication apparatus at both stations A and B has been conditioned as shown and described, it would only be necessary for the controller at station A to designate the button CB on his control panel CP in order for the code communication apparatus at both stations A and B to respond automatically to cause the respective indicators 2KB to be operated to the position characteristic of the letter C. The response of the code communication apparatus and the respective indicator 2KB for both stations A and B is shown in the sequence chart of FIGS. 6C, 6D and 6E.

Referring now to the sequence chart shown in FIGS. 6A to 6E, it will be noted that the indicator 2KB located at station A and the indicator 2KB located at station B are shown timewise to be operated simultaneous. For this reason, it is considered necessary to provide the sequence chart for the operation of the code communication apparatus at both stations A and B when the flight data button CB is designated by the controller at station A. Also, it will be noted that the manner in which the several relays are energized and deenergized for the conditioning cycle and the eight stepping cycles with respect to the code communication apparatus located at both stations A and B is precisely the same as for the conditioning cycle and eight stepping cycles shown and described for the reservation cycle. For this reason, it is believed to be unnecessary to repeat the description of the circuitry required to energize these various relays, but is only considered necessary to describe how the transition is effected from the first cycle of operation to the second cycle of operation in response to the designation of the flight data button CB. Also, it is considered necessary to describe the circuitry included herein to effect the simultaneous operation of the indicators 2KB located at stations A and B. These differences will be explained first with respect to station A and second with respect to station B.

Following the designation of the flight data button CB disposed on the control panel CP which is located at station A, three of the six code determining relays CD are energized by circuits established through the button CB. Referring to the code chart shown in FIG. 4, and being cognizant of the assumptions made heretofore in connection with such code chart, it is obvious for the letter C that the code determining relays CD1, CD3 and CD6 must be energized upon the designation of button CB. Referring to FIG. 3, it will be seen that the energizing circuits for these three relays are established upon the designation of button CB. For example, the energizing circuit for code determining relay CD3 extends from (+), through front contact 450 of relay LO, over wire 500, through front contact 470 of cancel button CNB, through front contacts 471, 472, 473, 474 and 475 of correction buttons CB6, CB5, CB4, CB3 and CB2 respectively, over wire 501, through front contacts 477 and 478 of transfer buttons 2TB and 1TB respectively, through front contact 259 of relay RRP, over wire 628, through back contact 127 of relay 1CKP, over wire 629, through back contact 160 of relay CK, over wire 630, through back contact 488 of flight data button CB, through diode 89D, over code determining bus 3CDB, through the lower winding of code determining relay CD3, over wire 512, through back contact 455 of relay CO, to (—). The energizing circuits for relays CD1 and CD6 may be similarly traced. The energizing circuit for the check relay CK is established through the front and back contacts of the code determining relay CD1 to CD6 and extends from (+), through front contact 340 of relay CD6, through back contact 329 of relay CD5, through back contact 321 of relay CD4, through front contact 313 of relay CD3, through back contact 306 of relay CD2, through front contact 299 of relay CD1, through the winding of relay CK, to (—). Following the energization of the relay CK in this manner, the conditioning cycle and the six stepping cycles are sequentially effected.

It will be noted by referring to the sequence chart shown in FIG. 6C that the column relay C2 is energized during the conditioning cycle following the energization of line relay FP. The energizing circuit for relay C2 extends from (+), through back contact 440 of relay S, through back contact 429 of relay R, through diode 63D, through front contact 12 of relay FP, over wire 630, through front contact 37 of column repeater relay CP, through front contact 43 of column relay C1A, through the upper winding of relay C2, through back contacts 92, 98, 104 and 109 of column relays C3, C4, C5 and C6 respectively, over wire 504, through back contact 451 of relay CO, to (—). Upon the energization of column relay C2, the stick circuit for column relay C1A which includes back contact 86 of relay C2 is disconnected to thus deenergize column relay C1A. The energizing circuit for relay C1B which includes front contact 44 of relay C1A is disconnected to thus deenergize relay C1B. The energizing circuit for the amber repeater relay AP which includes front contact 52 of relay C1B is disconnected upon the release of relay C1B to thus deenergize relay AP. To insure that the stick circuit for the column relay C2 has sufficient time for it to be effected, the column repeater relay CP is held energized by a stick circuit which includes a front contact of relay FP and which extends from (+), through the lower winding of relay CP, through front contact 38 of relay CP, through diode 90D, over wire 632, through front contact 10 of relay FP, through back contact 451 of relay CO, to (—). Following the release of the line relay FP, this stick circuit for the relay CP will be disconnected to thus deenergize relay CP. The conditioning cycle and the six stepping cycles for the several relays are then effected sequentially as stated above.

Figure 6D:
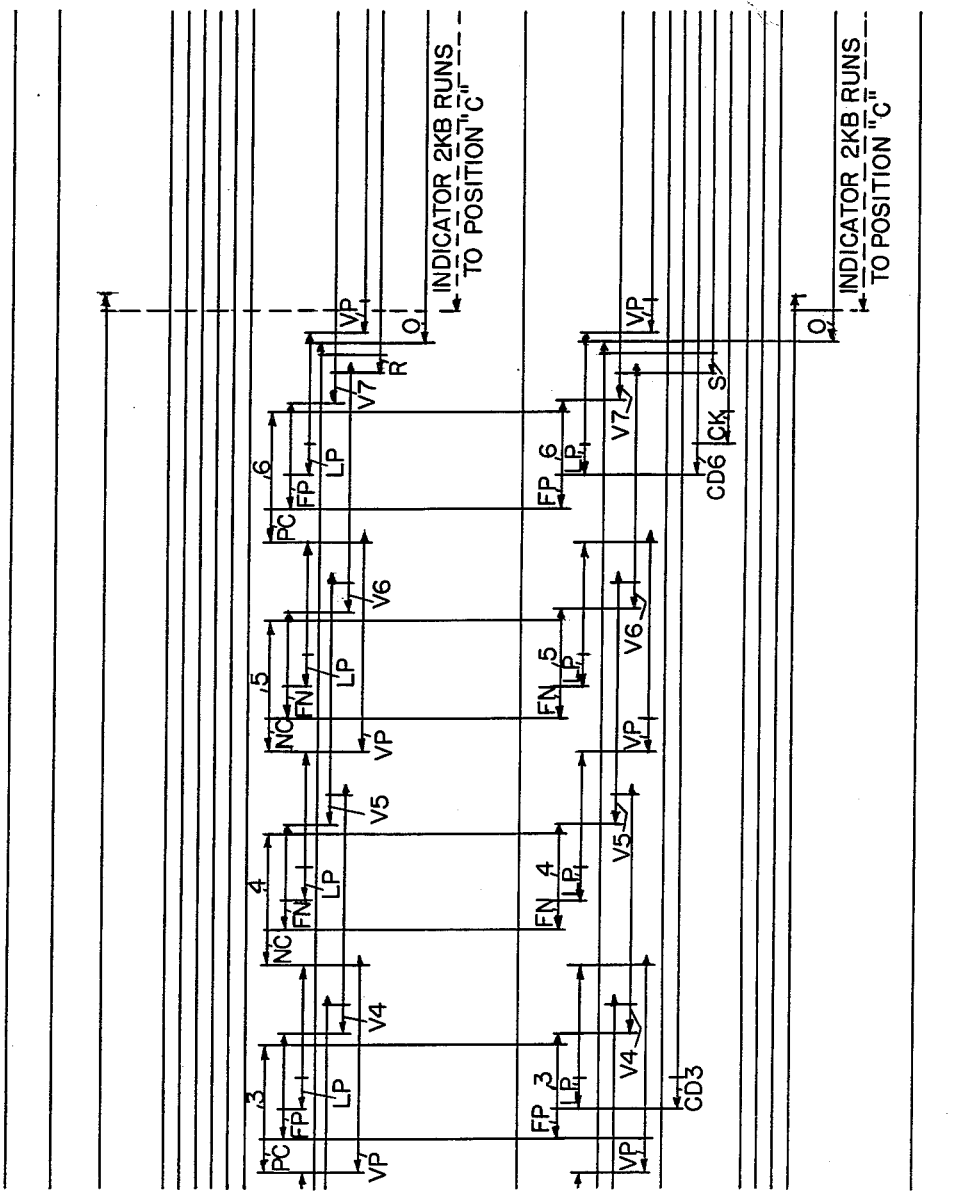

Referring to FIG. 6D for station A, it will be noted that the operate relay O is energized following the release of send relay S. The energizing circuit established for effecting the energization of operate relay O extends from (+), through back contact 210 of relay AT, over wire 535, through back contact 54 of blank relay BK, over wire 536, through back contact 441 of relay S, through front contact 431 of relay R, over wire 537, through back contact 47 of column relay C1A, over wire 538, through front contact 448 of relay LO, over wire 539, through front contact 159 of relay CK, over wire 540, through the lower winding of operate relay O, over wire 541, through back contact 458 of relay CO, to (—). It will be noted here that the energizing circuit is established through the back contact 47 of column relay C1A whereas for the first cycle of operation or the reservation cycle, a similar circuit to energize the operate relay O was established through the front contacts 350 and 355 of code determining relays CD7 and CD8 respectively. With this in mind then, it is obvious that for each succeeding cycle of operation the operate relay O will be energized following the release of the send relay S after the sixth stepping cycle.

Figure 6E:
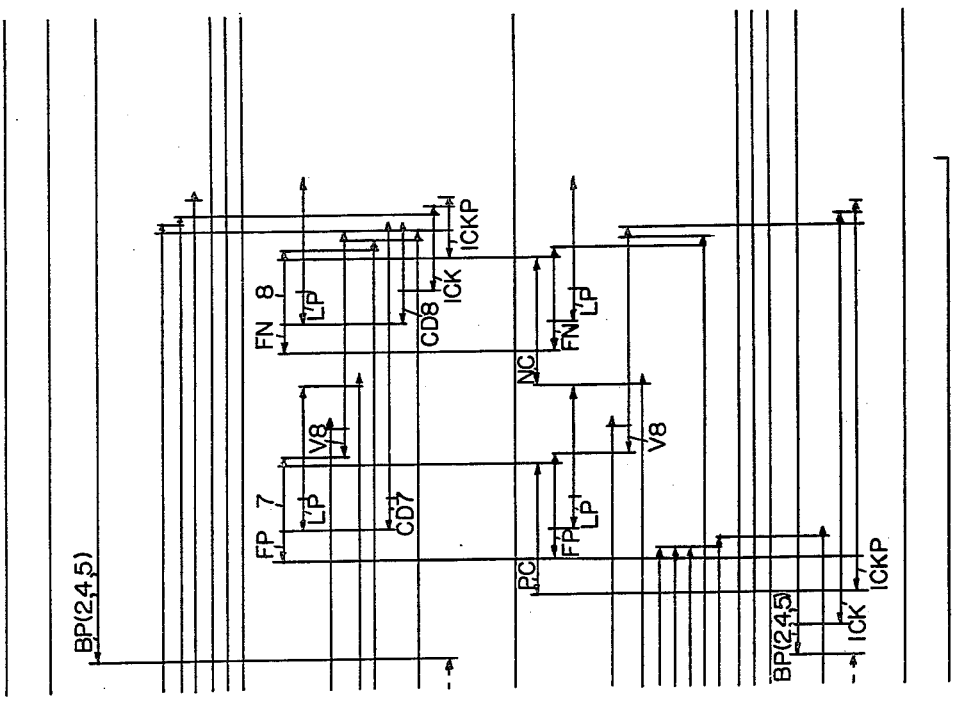

Following the energization of the operate relay O, the control buses 1CB, 3CB and 6CB are energized with a negative (—) potential in a manner similar to that described heretofore. The indicator 2KB then operates to a position characteristic of the code assigned to the letter C as shown in the code chart of FIG. 4 and whereat the letter C is displayed by the indicator 2KB. Referring to FIG. 6E, it will be noted that following the operation of indicator 2KB, the bus repeater relays 2BP, 4BP and 5BP are energized. These relays correspond to the closed commutator contacts 2C, 4C and 5C respectively and are energized in a similar manner to that described heretofore. It will be noted that the amber repeater relay AP is not energized following the energization of the relays 2BP, 4BP and 5BP. This should be obvious since the energizing circuit for the relay AP includes a front contact 52 of column relay C1B which is now deenergized. The sequence of operation for the several relays included in the stepping cycles 7 and 8 as well as the check relays 1CK and 1CKP is similar to that described for these relays in connection with the first cycle of operation. For this reason, it is considered unnecessary to repeat the description of operation for these relays.

Referring now to the circuitry shown in FIGS. 3A to 3T with respect to the operation of such circuitry for station B, the differences in the energization of relays and their energizing circuits etc. will be described with reference to the sequence chart shown in FIGS. 6C, 6D and 6E. By referring to the sequence chart shown in FIGS. 6C, 6D and 6E, it is obvious that there is little difference between the operation of the code communication apparatus and the indicator 2KB for the second cycle of operation and the code communication apparatus and the indicator 1KB for the first cycle of operation. It will be noted with reference to FIG. 6C, however, that the column C2 is energized simultaneously with the energization of relay C2 located at station A. The release of column relays C1A and C1B in sequence as well as the amber repeater relay AP and the column repeated relay CP is simultaneous with similar relays located at station A. In this connection, only the stick circuit for column relay C2 differs from the stick circuit for the column relay C2 located at station A in that in lieu of front contact 262 of relay RRP, the stick circuit for the relay C2 located at station B includes back contact 447 of relay LO, wire 609, wire 624 and diode 85D.

It will be noted in the description for the first cycle of operation wherein the energizing circuit for the operate relay O was given, the energizing circuit for operate relay O included front contact 223 of amber repeater relay AP. In the present case, since this relay AP is deenergized, such energizing circuit includes back contact 53 of column relay C1B in lieu of such front contact 223 of relay AP. Energization of operate relay O similarly energizes the control buses 1CB, 3CB and 6CB with a negative (—) potential to cause the operation of indicator 2KB to the position characteristic of the letter C for displaying such letter C. Following the operation of the indicator 2KB, the bus repeater relays 2BP, 4BP and 5BP are energized simultaneously with the corresponding BP relays energized at station A. Also, the amber repeater relay AP remains deenergized since its energizing circuit includes front contact 52 of column relay C1B. The check relays 1CK and 1CKP as well as the several relays normally energized and deenergized for the seventh and eighth stepping cycles are operated in a similar manner to that shown for the first cycle of operation.

Referring to the control panel shown in FIG. 1, it is seen that the remaining indicators located in altitude 2 sequentially display the numeral 2, the letter D, the numeral 3 and the numeral 2. In connection with these displays, it is considered unnecessary to describe the operation of the code communication apparatus at both or either of stations A and B. The operation of the code communication apparatus at both stations for each of these numerals or letters will be almost identical to the operation shown for the second cycle. The main difference between these succeeding cycles of operation will lie in the area of code determining relay energization. The combinations of code determining relays CD energized for each of the numerals and the letter should be obvious from the code chart shown in FIG. 4 if such code chart is interpreted in light of the assumptions and explanations given heretofore.

It will be noted in referring to the sequence chart shown in FIGS. 6A to 6E that the time allotted to the indicator 1KB to operate to an amber position and the time allotted to the indicator 2KB to operate to the position C is indicated to be the same. This time of indicator operation for different positions is shown to be the same for convenience herein. It is to be understood, however, that the time that it takes a given indicator to operate to a called for position after the appropriate potentials have been applied to control the indicator operation depends upon the position of the display inscribed upon the movable tape with respect to the face of the given indicator. In this regard, the time of operation of a given indicator to each of its positions from a given position will obviously be a different time.

*Correction of Flight Data*

In designation of the flight data buttons for items of flight data, it is obvious that the controller could possibly designate one such button when he should have designated another of such buttons as a result of inadvertence. Also, the controller may learn that the flight plan for a particular aircraft has changed somewhat in connection with one or more of the items included in the flight plan. In this connection, it is obvious that the controller after designating certain flight data buttons for causing the changeable display indicators in a selected altitude to be operated to the called for positions must have some way of changing the display of the affected changeable display indicators in the selected altitude.

The present invention provides correction means which may be designated by the controller and circuit means which responds to the designation of the correction means for causing the code communication apparatus located at each of the two remotely spaced stations to be simultaneously conditioned to the characteristic position allotted to the changeable display indicator wherein it is desired to change the display. In other words, assuming that an altitude has been selected and a reservation made and each of the changeable display indicators in that selected altitude has posted therein an item of flight data, correction of an item of flight data in one of the changeable display indicators may be accomplished in either one of two ways depending upon whether or not an item of flight data has been posted in the last changeable display indicator of the selected altitude and the code communication apparatus has been subsequently cleared out. Assuming that the altitude has been selected and the reservation made as well as several items of flight data being posted in the succeeding changeable display indicators, it is possible to cause the code communication apparatus at both stations after posting in one of the changeable display indicators in the selected altitude to be changed to the characteristic position of a preceding changeable display indicator by merely designating the appropriate correction button CB2 to CB6. Also, the characteristic positioning of the code communication apparatus located at both stations A and B may be effected after the changeable display indicators of a selected altitude are operated to desired positions and the code communication apparatus at both stations A and B has been automatically cleared out. This may be accomplished by the controller at one of the stations by first designating the altitude selector button for that altitude and the same type of reservation button previously designated in addition to the appropriate correction button CB2 to CB6 corresponding to the position of the changeable display indicator in the altitude in which the affected indicator is located.

For the present consideration of the present invention in this connection, it is assumed that the changeable display indicator 3KB has been operated at both stations A and B to display the numeral 2 which is indicated on the control panel as shown in FIG. 1. In order to describe the circuitry provided herein to effect the characteristic positioning of the code communication apparatus in response to designation of an appropriate correction button CB2 to CB6, it is assumed that the controller at station A desires to post the letter D in the indicator 2KB in lieu of the letter C which he previously caused to be posted therein. In describing the circuitry for accomplishing this, description will be given with reference first to station A and second to station B.

In view of the assumptions made above, the controller at station A designates the correction button CB2 to effect the characteristic positioning of the code communication apparatus at both stations A and B. At station A, following the designation of the correction button CB2, the code communication apparatus located thereat is conditioned in accordance with the relays which would be energized following the operation of changeable display indicator 3KB. These energized relays include the lockout relay LO, the column relay C3, the column repeater relay CP, the row or altitude selection relay RA, the row repeater relay RRP and the bus repeater relays 1BP, 3BP and 5BP. It is not considered necessary to describe the various energizing circuits for these relays since the energizing circuits are similar to those circuits described above.

Figure 3Q:
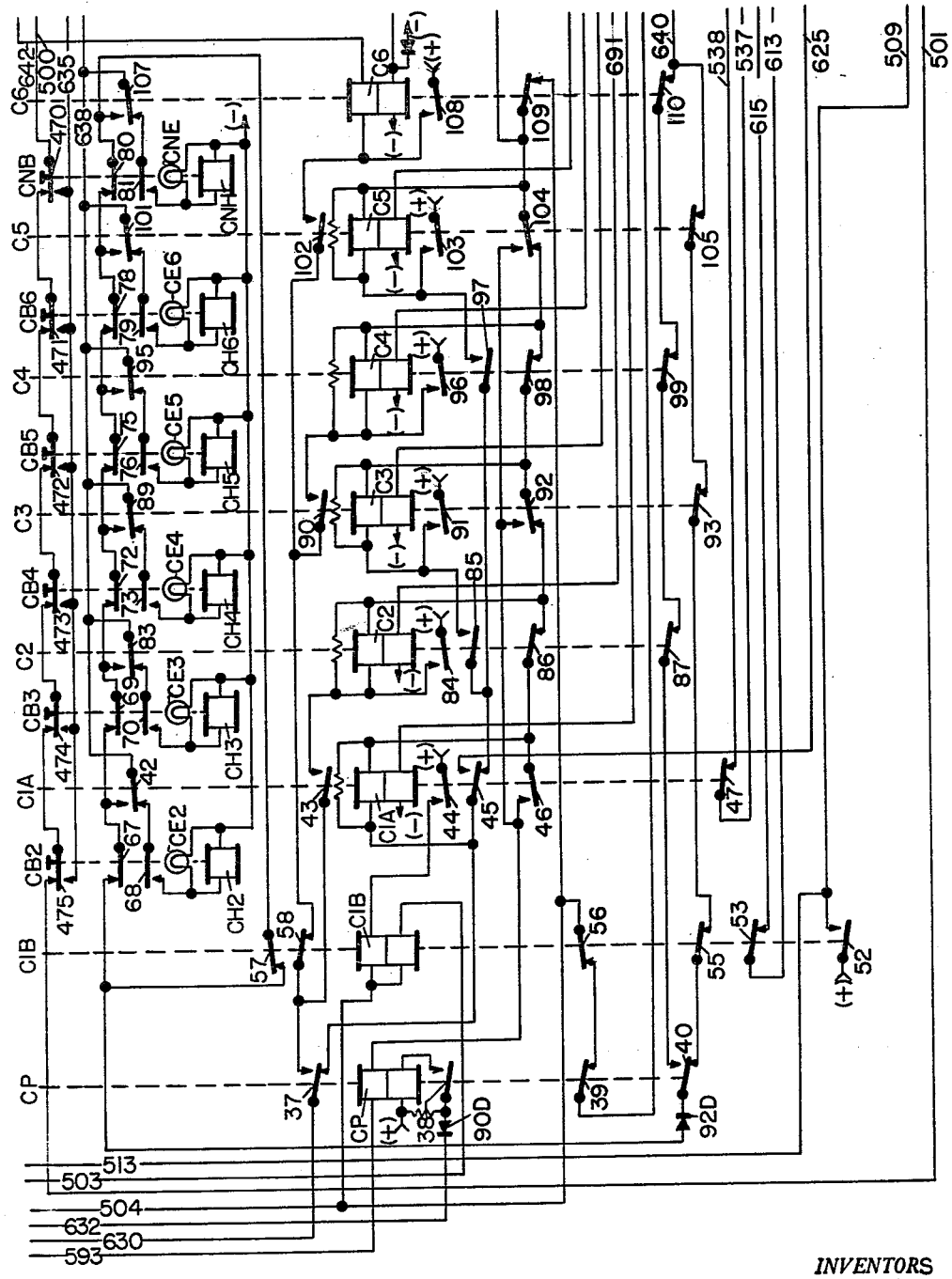
Figure 3S:
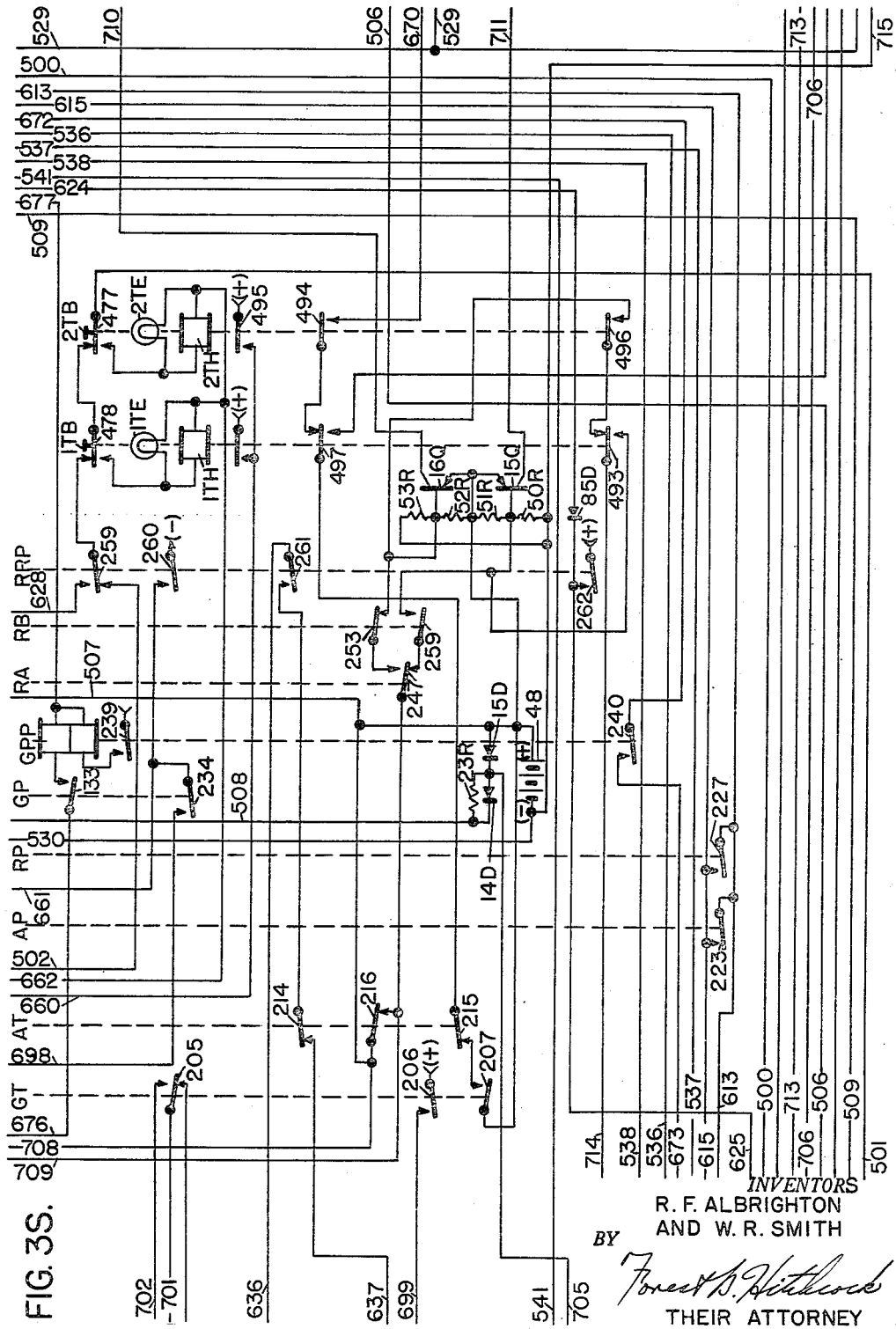

Following the designation of correction button CB2, the holding coil CH2 for maintaining the correction button CB2 actuated is energized along with the correction light CE2 which is provided here to indicate to the controller that the code communication apparatus is being conditioned in response to the designation of correction button CB2. With reference to FIG. 3Q, it will be seen that the correction light CE2 is connected in shunt with the holding coil CH2. From this, it is obvious that the holding coil CH2 and the correction light CE2 have the same energizing circuit which circuit extends from (+), through front contact 450 of relay LO, over wire 500, through front contact 470 of cancel button CNB, through front contacts 471, 472, 473 and 474 of correction buttons CB6, CB5, CB4 and CB3 respectively, through back contact 475 of correction button CB2, over wire 635, through back contact 161 of relay CK, over wire 636, through front contact 261 of relay RRP, through back contact 214 of relay AT, over wire 637, through back contact 169 of relay RCP, over wire 638, through back contact 42 of column relay C1A, through back contact 68 of correction button CB2, through the holding coil CH2 and the correction light CE2 connected in shunt, to (−). The holding coil CH2 and the correction light CE2 are thus energized and are maintained energized until the code communication apparatus is effectively conditioned whereat the controller may designate another flight data button representative of the desired item of flight data.

At the same time that the holding coil CH2 and the correction light CE2 are energized as described above, an energizing circuit is established for the control relay NC to thus energize such relay NC to initiate the first stepping cycle. This circuit is identical to the energizing circuit for the holding coil CH2 and the correction light CE2 up to and including back contact 169 of relay RCP and continues from such back contact 169 over wire 638, through front contact 89 of column relay C3, through front contacts 75 and 78 of correction buttons CB5 and CB6 respectively, through front contact 80 of cancel button CNB, through back contact 57 of column relay C1B, through diode 92D, through front contact 40 of column repeater relay CP, through back contacts 87, 99 and 110 of column relays C2, C4 and C6 respectively, over wire 640, over wire 547, through back contact 1 of control relay PC, through the upper winding of control relay NC, through back contact 438 of send relay S, through back contact 427 of receive relay R, through back contact 455 of relay CO, to (−). Following the energization of the control relay NC in this manner, the line relay FN is energized in the manner described heretofore. Following the energization of the line relay FN, respective energizing circuits through front contacts of the line relay FN are established for the column relay C4, the line repeater relay FNP and the line pulsing relay LP. The energizing circuit for the column relay C4 extends from (+), through back contact 440 of relay S, through back contact 429 of relay R, through diode 68D, through back contact 12 of relay FP, through front contact 20 of relay FN, over wire 630, through front contact 37 of relay CP, through back contact 58 of relay C1B, through front contact 90 of column relay C3, through the winding of column relay C4, through back contacts 104 and 109 of column relays C5 and C6 respectively, over wire 504, through back contact 451 of relay CO, to (−). The energizing circuit for the line repeater relay FNP extends from (+), through back contact 440 of relay S, through back contact 429 of relay R, through front contact 19 of line relay FN, through the winding of relay FNP, to (−). The energizing circuit for the line pulsing circuit LP is the same as that described heretofore which includes front contact 17 of line relay FN. Following the energization of the column relay C4, the stick circuit for column relay C3 which includes back contact 98 of relay C4 is disconnected to thus deenergize column relay C3. Upon the energization of column relay C4, the energizing circuit for control relay NC which includes back contact 99 of column relay C4 is disconnected to thus deenergize control relay NC. It follows then that the line relay FN is deenergized following the release of control relay NC. Upon the release of line relay FN, the stick circuit for column repeater relay CP which extends from (+), through the lower winding of relay CP, through diode 90D, over wire 632, through front contact 17 of line relay FN, through back contact 451 of relay CO, to (−) is disconnected to thus deenergize column repeater relay CP. At this point, a similar energizing circuit to that described above for the control relay NC is established to initiate a second stepping cycle wherein the column relay C5 is energized and the column relay C4 is released.

The energizing circuit for the control relay NC established to initiate the second stepping cycle is similar to the circuit described above for the energization of control relay NC except that it includes back contact 40 of column repeater relay CP, back contacts 44, 93 and 105 of column relays C1B, C3 and C5 respectively in lieu of front contact 40 of column repeater relay CP and back contacts 87, 99 and 110 of column relays C2, C4 and C6 respectively. It follows that the line relay FN is again energized by the circuit established through front contacts of the control relay NC. Upon the energization of line relay FN, the energizing circuit for the column relay C5 is established and extends from (+), through back contact 440 of relay S, through back contact 429 of relay R, through diode 68D, through back contact 12 of relay FP, through front contact 20 of relay FN, over wire 630, through back contact 37 of relay CP, through back contact 45 of relay C1A, through front contact 97 of column relay C4, through the upper winding of column relay C5, through back contact 109 of column relay C6, over wire 504, through back contact 451 of relay CO, to (−). Following the energization of column relay C5, the stick circuits and energizing circuits for the relays C4, NC and FN are sequentially disconnected to thus deenergize these relays. Following the release of line relay FN, the energizing circuit for the column repeater relay CP is established and extends from (+), through back contact 440 of relay S, through back contact 429 of relay R, through diode 68D, through back contact 12 of relay FP, through back contact 20 of relay FN, over wire 593, through the upper winding of relay CP, through front contact 104 of column relay C5, through back contact 109 of relay C6, over wire 504, through back contact 451 of relay CO, to (−). With relay CP thus energized, the third stepping cycle is initiated as the energizing circuit for the control relay NC is again established.

To initiate the third stepping cycle, the energizing circuit for the control relay NC is established when the column repeater relay CP is energized. This energizing circuit for the control relay NC includes front contact 40 of relay CP and the back contacts 87, 99 and 110 of column relays C2, C4 and C6 which, it will be noted, is the exact circuit established to energize the control relay NC in connection with the first stepping cycle described above. Upon the energization of control relay NC, it follows that the line relay FN will be energized. Following the energization of line relay FN, the energizing circuit for column relay C6 is established and extends from (+), through back contact 440 of relay S, through back contact 429 of relay R, through diode 68D, through back contact 12 of relay FP, through front contact 20 of relay FN, over wire 630, through front contact 37 of relay CP, through back contact 58 of relay C1B, through front contact 102 of relay C5, through the upper winding of column relay C6, over wire 642, through back contact 165 of relay RCP, over wire 643, through front contact 36 of relay CP, over wire 504, through back contact 451 of relay CO, to (−). Following the energization of the column relay C6 in this manner, the stick circuits and energizing circuits for the relays C5, NC, FN and CP dependent directly or indirectly upon back contacts of the column relay C6 are disconnected to thus deenergize these relays in the sequence stated. It should be noted here that two stick circuits are provided to maintain column relay C6 energized during the release of line relay FN and after such relay FN is released so as to maintain column relay C6 energized during a portion of the fourth stepping cycle. The stick circuit for maintaining the column relay C6 energized during the release of line relay FN extends from (+), through front contact 108 of relay C6, through the upper winding of column relay C6, over wire 642, through back contact 165 of relay RCP, over wire 643, through front contact 36 of relay CP, over wire 504, through back contact 451 of relay CO, to (−). The second stick circuit for maintaining column relay C6 energized after the line relay FN is released extends from (+), through front contact 108 of relay C6, through the upper winding of column relay C6, over wire 642, through back contact 165 of relay RCP, over wire 643, over wire 646, through back contact 17 of relay FN, through back contact 451 of relay CO, to (−). Upon the release of column repeater relay CP following the release of line relay FN, the fourth stepping cycle is initiated as control relay NC is again energized.

With the column repeater relay CP and the column relay C5 released, the energizing circuit for the control relay NC for the fourth stepping cycle is exactly the same as that described for the second stepping cycle. For this reason, it is considered unnecessary to repeat such circuit. It follows that the line relay FN is energized following the energization of control relay NC. When the line relay FN is energized, the stick circuit for column relay C6 which includes back contact 17 of relay FN is disconnected to thus deenergize relay C6. Following the release of column relay C6, the energizing circuit for column relay C1A described heretofore which includes back contact 109 of relay C6 is established to thus energize relay C1A. It follows that the energizing circuit for relay C1B which includes front contact 44 of relay C1A is established to thus energize relay C1B. Following the energization of relay C1B, the energizing circuit for the holding coil CH2 and the correction light CE2 which includes back contact 57 of relay C1B is disconnected to thus deenergize the holding coil CH2 and the correction light CE2. Deenergization of the correction light CE2 is effective to indicate to the controller at station A that the flight data button DB for the letter D may be designated since the code communication apparatus located at both stations A and B is positioned to be responsive to the designation of such button. Also, following the energization of relay C1B, the relay GP is energized by a circuit which extends from (+), through front contact 52 of relay C1B, over wire 509, through front contact 293 of relay 1BP, through back contact 287 of relay 2BP, through front contact 282 of relay 3BP, through back contact 277 of relay 4BP, through the winding of relay GP, through front contact 273 of relay 5BP, through back contact 267 of relay 6BP, to (−). The energization of relay GP is only incidental here as a result of the relays 1BP, 3BP and 5BP being previously energized and the energization of relay C1B. The energizing circuit for the control relay NC which includes back contact 57 of relay C1B is disconnected upon the energization of relay C1B to thus deenergize control relay NC. It follows that the line relay FN is deenergized following the release of control relay NC. Following the release of line relay FN, the energizing circuits for the line repeater relay FNP and the line pulsing relay LP are disconnected to thus deenergize these relays. By referring to FIG. 3D, it will be noted that the relay FNP includes a stick circuit including resistor R75, capacitor C14 and its front contact 26 which circuit is effective to maintain the relay FNP energized between succeeding cycles where the line relay FN is deenergized and then subsequently energized again. The relay FNP must be maintained energized during this time since the energizing circuit for the clearout relay CO includes a back contact of the FNP relay and a front contact of the column relay C6. It is not desirable to have the clearout relay energized at this time since some of the energizing circuit stated above include back contact 451 of such relay CO. Also, following the release of line relay FN the energizing circuit for the column repeater relay CP which includes front contact 46 of relay C1A and which has been described heretofore in connection with the reservation cycle is established to energize relay CP. This concludes the relay operation in the code communication apparatus located at station A.

The relay operation of the code communication apparatus shown in FIGS. 3A to 3T will now be considered with respect to station B. There is actually little difference in the operation of the relays with respect to station B in contrast to the operation of the relays at station A. It will be noted, however, that the cycle light CE is illuminated by a circuit previously described while the lockout relay LO is deenergized in contrast to the energization of such relay at station A. The remaining relays which are responsive to the energization of the control relay NC at station A for the four stepping cycles are energized and deenergized simultaneously with the energization and deenergization of comparable relays located at station A.

It would only be necessary now for the controller at station A to designate the flight data button DB for the letter D to cause the letter D to be displayed in the indicators 2KB at both stations A and B. The operation of the code communication apparatus at both stations A and B will be similar to that described heretofore when the flight data button for the letter C was designated at the station A. When such button DB is designated by the controller at station A, the code determining relays CD1, CD3 and CD4 are energized. The code communication apparatus at both stations A and B is then accordingly conditioned in the manner described heretofore. After the indicator 2KB has operated to the position whereat the letter D is displayed and the cycle light CE indicates that another item of flight data may be caused to be displayed in the succeeding indicators, the controller at station A proceeds to designate the flight data buttons sequentially to thereby cause the changeable display indicators in altitude 2 to display sequentially the items of flight data represented by the designated flight data buttons.

Assuming that the controller located at station A had posted an item of flight data in each of the indicators located in altitude 2, it would be necessary to again select the altitude and repeat the first cycle of operation or the reservation cycle by designating the altitude selector button 2AS and the amber reservation button AB. In this way, the relays which are normally energized during the initial conditioning period and which remain energized until the clear out period are energized to provide the code communication apparatus responsive to the designation of the correction button CB2.

*Automatic Clear Out of System*

Assuming that all of the changeable display indicators located in row B or altitude 2 have been operated to display the reservation symbol, the numerals and the letters as indicated on the control panel CP shown in FIG. 1, it is considered reasonable to expect that some automatic means should be included herein to be responsive to the correct operation of the last changeable display indicator in row B or altitude 2. Such an automatic means is included herein and will be described with reference to the sequence chart shown in FIGS. 6A to 6E and more particularly to FIG. 6E. For the present consideration of such automatic means, the assumptions made above will also prevail in this instance. That is, it is assumed that all of the indicators in row B or altitude 2 have been operated to display the indications shown in FIG. 1. With this assumption in mind, reference will be made to the portion of the sequence chart shown in FIG. 6E wherein it will be assumed for the present that column relay C6 is energized in lieu of column relay C2 being energized. Also, the bus repeater relays 1BP, 3BP and 5BP will be energized in lieu of the relays 2BP, 4BP and 5BP shown as being energized. In addition, the code determining relays CD2, CD4 and CD6 will be energized in lieu of the code determining relays CD1, CD3 and CD6 shown as being energized. All other conditions of the code communication apparatus located at both stations A and B are as shown in the sequence chart of FIG. 6E except for those conditions which will now be described. As before, the description will be rendered first with respect to station A and second with respect to station B.

Referring to FIG. 6E and the portion of the sequence chart shown for station A, it is seen that the check repeater relay 1CKP is energized following the energization of check relay 1CK. The energization of the check repeater relay 1CKP completes an energizing circuit for the clear out relay CO which extends from (+), through back contact 173 of relay RC, over wire 649, through front contact 136 of column relay C6, over wire 650, through front contact 120 of relay 1CKP, over wire 651, through front contact 410 of relay V8, over wire 652, through back contact 25 of relay FNP, through back contact 426 of relay R, through back contact 437 of relay S, through the upper winding of relay CO, to (—). It is seen that the stepping relay V8 is normally released as the check repeater relay 1CKP is being energized. In order to establish the energizing circuit for the clear out relay CO through the front contact 410 of the stepping relay V8, the relay V8 is held energized by a stick circuit which extends from (+), through front contact 131 of column relay C6, over wire 602, through front contact 411 of relay V8, through the winding of relay V8, over wire 528, through back contact 456 of relay CO, to (—). When clear out relay CO is energized, this stick circuit is disconnected since it includes back contact 456 of relay CO. During the longer period of time which stepping relay V8 is maintained energized, a stick circuit for the check relay 1CK is established and extends from (+), through front contact 409 of relay V8, over wire 603, through front contact 134 of relay 1CK, through the winding of relay 1CK, to (—). This insures that the energizing circuit for the clear out relay CO is established and has sufficient time to suitably energize such relay CO. Following the energization of the clear out relay CO, the row relay RA and the column relay C6 are deenergized since their stick circuits include back contacts 457 and 451 of relay CO respectively. Following the release of these two relays, the circuits which are established when these two relays are deenergized to remove the positive (+) potential from the base of the transistor 11Q associated with the last indicator in the row B or altitude 2 are again established to place the base of transistor 11Q at a positive (+) potential to thus deenergize such transistor 11Q. The energizing circuits for the NPN transistor 1Q, 3Q and 5Q associated with the relays 1BP, 3BP and 5BP are thereby deenergized to cause the subsequent deenergization of their respective BP relays. Also, following the release of the relay RA, the energizing circuit for the relay RRP and the altitude light 2AE which are dependent upon front contacts 244 and 245 of relay RA respectively are disconnected to thus deenergize such relay and light. Following the release of the check repeater relay 1CKP, the stick circuit for the clear out relay CO which extends from (+), through front contact 126 of relay 1CKP, over wire 654, through front contact 452 of relay CO, through the upper winding of relay CO, to (—) is disconnected to thus deenergize clear out relay CO. Also, the energizing circuit for the cycle light CE established when the relay 1CKP was energized and which includes front contact 123 of relay 1CKP is now disconnected to thus deenergize light CE.

With the deenergization of the altitude light 2AE as described above, the controller at station A is cognizant of the fact that all of the changeable display indicators in the row B or altitude 2 has been operated to the desired position and that the code communication apparatus located at both stations A and B will not be responsive to the designation of another flight data button. With the deenergization of the cycle light CE, the controller at station A is cognizant of the fact that the code communication apparatus at both stations A and B has properly responded to the designation of the flight data button 2B for the numeral 2 and that the cycle of operation has been successfully completed.

In connection with the operation of the code communication apparatus located at station B in this regard, there is little difference to that described for the code communication apparatus located at station A. It will be noted by referring to the sequence chart shown in FIG. 6E that the cycle light CE is illuminated while the relay LO is shown indirectly to be deenergized. Following the energization of the relay CO, the reverse conditions of these two elements occur, i.e., the relay LO is energized and the cycle light CE is deenergized. Upon the energization of relay CO, the energizing circuit for the relay LO extends from (+), through front contact 457 of relay CO, over wire 655, through the upper winding of lockout relay LO, to (−). Following the energization of the relay LO, the energizing circuit for the cycle light CE which includes back contact 447 of relay LO is disconnected to thus deenergize the cycle light CE. As before, the clear out relay CO is released following the release of check repeater relay 1CKP.

Following the deenergization of the cycle light CE, the controller at station B knows that the code communication apparatus condition in accordance with the designation of the appropriate buttons by the controller at station A has been cleared out. If he chooses, the controller at station B may now designate suitable buttons to condition the code communication apparatus for the subsequent operation of other desired changeable display indicators.

*Manual Clear Out of System*

It is considered reasonable to assume that during the time that the controller is sequentially designating the flight data buttons after he has first designated the altitude selector button and the reservation button for causing the changeable display indicators in the selected altitude to be operated to display desired items of flight data, some appropriate reason may alter the proposed flight plan to the extent that the particular airplane in question will not now or in the future fly according to such flight plan. After the controller is informed of such change, he will not wish to continue to post the items of flight data in the remaining changeable display indicators in the selected altitude. To conserve time of operation, it is considered necessary to include means which may be manually designated to subsequently clear out the code communication apparatus located at the affected stations.

The present system provides a cancel button CNB which may be normally designated by the controller to effect the clear out of the code communication apparatus located at both of the stations A and B at appropriate times during the posting of items of flight data in a selected altitude. In considering the operation of the code communication apparatus at both stations A and B, it will be assumed that the controller at station A designates the cancel button CNB after the changeable display indicator 3KB located in row B or altitude 2 has been operated to the position where the numeral 2 has been displayed in response to the designation of the flight data button 2B for the numeral 2 by the controller at station A.

With these assumptions in mind, it should be obvious that the same relays would be energized in this instance as the relays assumed energized in connection with the correction of flight data described above. These relays again would include the relay LO, the column relay C3, the column repeater relay CP, the row relay RA, the row repeater relay RRP and the relays BP1, BP3 and BP5. Knowing this, it will be assumed that the controller at station A designates the cancel button CNB for effecting the clear out of the system. As before, the operation of the code communication apparatus will be considered first with respect to station A and second with respect to station B.

Before considering the description of the operation of the code communication apparatus at stations A and B, it should be noted that the circuits responsive to the designation of the cancel button CNB are similar to the circuits responsive, in this instance, to the designation of the correction button CB2 and the circuits for effecting the automatic clear out of the system. In other words, when the cancel button CNB is designated, the control relay NC is energized for a number of steps depending upon which one of the column relays is then energized. It will be recalled that in the description of the circuitry responsive to the designation of the correction button CB2, the column relays C1A and C1B were sequentially energized following the deenergization of column relay C6. In connection with the designation of the cancel button CNB, the column relays C1A and C1B are not energized following the deenergization of column relay C6, but circuitry is included herein to energize the clear out relay CO before the column relay C6 is released.

When the cancel button CNB is designated at the station A by the controller, two energizing circuits are immediately established to energize the cancel holding coil CNH, the cancel light CNE and the control relay NC. More particularly, the energizing circuit for the cancel holding coil CNH and the cancel light CNE which are connected in shunt extends from (+), through front contcontact 450 of relay LO, over wire 500, through back contact 470 of cancel button CNB, over wrie 635, through back contact 161 of relay CK, over wire 636, through front contact 261 of relay RRP, through back contact 214 of relay AT, over wire 637, through back contact 169 of relay RCP, over wire 638, through back contact 107 of relay C6, through back contact 81 of cancel button CNB, through the cancel holding coil CNH and the cancel light CNE connected in shunt, to (−). The holding coil CNH is thus energized to maintain cancel button CNB depressed while the cancel light CNE is illuminated to convey to the controller that the code communicaiton apparatus is being cleared out in response to the designation of the cancel button CNB. The circuit for the control relay NC extends from (+), through front contact 450 of relay LO, over wire 500, through back contact 470 of cancel button CNB, over wire 635, through back contact 161 of relay CK, over wire 636, through front contact 261 of relay RRP, through back contact 214 of relay AT, over wire 637, through back contact 169 of relay RCP, over wire 638, through front contact 89 of column relay C3, through front contacts 72, 69 and 67 of correction buttons CB4, CB3 and CB2 respectively, through diode 92D, through front contact 40 of relay CP, through back contacts 87, 99 and 110 of column relays C2, C4 and C6 respectively, over wire 640, over wire 547, through back contact 1 of relay PC, through the upper winding of control relay NC, through back contact 438 of relay S, through back contact 427 of relay R, through back contact 455 of relay CO, to (−). With the control relay NC thus energized the line relay FN, the line pulsing relay LP, the column relay C4 and the line repeater relay FNP are energized in the same manner described heretofore in connection with the designation of the correction button CB2. It is considered unnecessary for this reason to repeat the description of such energizing circuits. The control relay NC is energized and deenergized for the second and third stepping cycles to condition the line relay FN, the column relays C4, C5 and C6 and the column repeater relay CP as described heretofore in connection with the correction button CB2. Following the energization of relay C6 during the third stepping cycle, the energizing circuit for the cancel holding coil CNH and the cancel light CNE which includes back contact 107 of relay C6 is disconnected to thus deenergize cancel holding coil CNH and cancel light CNE. The cancel button CNB is subsequently released. Timewise, the cancel button CNB is released before the line relay FN is released. This prevents an energizing circuit similar to that described for the first stepping cycle for energizing the control relay NC from being established which would, if established, include front contact 107 of relay C6 and back contact 470 of cancel button CNB. Since the control relay NC is not energized for a fourth stepping cycle, the line pulsing relay LP and the line repeater relay FNP are released slowly due to their slow release characteristics. Upon the release of relay FNP, the energizing circuit for the clear out relay CO which has been described heretofore in connection with the automatic clear out is established to thus energize the clear out relay CO. Upon the energization of clear out relay CO, the stick circuit for relay C6 which includes back contact 451 of relay CO is disconnected to thus deenergize relay C6. Also, the stick circuit for row relay RA dependent upon back contact 457 of relay CO is disconnected to thus deenergize relay RA. The relay RRP and the relays 1BP, 3BP and 5BP dependent upon the energized conditions of the relays RA and C6 are released following the deenergization of such relays RA and C6. Following the release of relay RRP, the stick circuit for the relay CO which includes front contact 253 of relay RRP is disconnected to thus deenergize relay CO.

Similar circuits are established at station B in response to the energization and deenergization of the line relay FN for the three stepping cycles. The relay CO is simultaneously energized with the relay CO located at station A by the identical circuit described heretofore. Following the energization of the relay CO, in addition to the relay C6 and the relay RA being deenergized, the energizing circuit for the relay LO including front contact 457 of relay CO is established to energize such relay LO. The energizing circuit for the cycle light CE including back contact 447 of relay LO is disconnected to thus deenergize cycle light CE. The code communication apparatus located at both stations A and B is thus cleared out and will be responsive to appropriate buttons designated by the controller at station A or station B to cause the operation of desired indicators.

*Change of Reservation Indication*

It has been stated above that three different colored symbols are utilized in connection with the reservation of a given altitude. The three colors chosen herein for representing three different conditions are amber, green and red. The amber color is used to denote herein that the altitude selected is reserved for the plane identified by the items of flight data which will be occupying the selected altitude at some future time whereas the green color is used to denote that the airplane identified by the items of flight data is occupying the selected altitude at the designating station while the red color is used to denote that the airplane identified by the items of flight data is occupying the selected altitude and that the airplane is flying under the supervision of the controller at the other station. In this connection, it is desirable to have a system wherein the colored symbol or blank indication displayed in the first indicator of a selected altitude may be changed in accordance with the location of the airplane identified by the items of flight data. The present system includes means with which a portion of the code transmitted over the line wires L1 and L2 is changed in order to operate the first indicator of a selected altitude at the designating station to display a green symbol while the first indicator in the selected altitude at the other station is operated to display a red symbol. In this manner, the green and red symbols convey the information noted above to the respective controllers assigned to their respective stations. Also, the present system includes circuitry which permits a controller at a given station to select an altitude by designating the appropriate button and to reserve that selected altitude as long as the reservation indicator in the selected altitude is displaying either a blank or an amber symbol. If such indicator is displaying a red symbol which obviously means that the corresponding indicator in the selected altitude at the other station should be displaying a green symbol, the reservation indicators at both stations would not be operated if either the amber button or the green button was designated following the designation of the altitude selector button.

The circuitry included herein to effect the operation of the reservation indicator at the designating station to a position whereat the green symbol is displayed and the operation of the reservation indicator located at the other station to the position whereat the red symbol is displayed includes front and back contacts 561 and 562 of column relay C1A. In order to describe how the inclusion of these contacts herein effect the above, it will be assumed that it is desired to change the amber signal displays on the indicators 1KB located at stations A and B to the green symbol and the red symbol respectively. To facilitate in this description, reference will be made to the sequence chart shown in FIGS. 6A, 6B and 6C. Before continuing with such description, however, it is considered expedient to refer to the code chart shown in FIG. 4 wherein the control bus 6 is indicated to be energized for altitude 2 and a green reservation while the control bus 5 is indicated to be energized for the altitude 2 and a red reservation. If such code chart is interpreted in light of the assumptions made above, it will be seen that in order to operate the indicator 1KB located at station A to the green position, the code determining relay CD6 must be energized. Also, in order to operate the indicator 1KB located at station B to the position where the red symbol is displayed, the code determining relay CD5 thereat must be energized. The above circuitry will now be described to effect the energization of relays CD5 and CD6 in this manner with reference first to station A and second to station B.

When the controller at station A designates the altitude selector button 2AS and the reservation button GB, the code determining relays CD2, CD4 and CD6 will be energized by circuits similar to that described in connection with the sequence chart shown in FIGS. 6A, 6B and 6C. For this reason, it is considered unnecessary to repeat the operation of the code communication apparatus responsive to the designation of these two buttons, but to describe how the circuitry included herein effects the operation of the indicators 1KB located at stations A and B.

The operation of the code communication apparatus located at station A is similar to that described heretofore when the altitude selector button 2AS and the reservation button AB was designated by the controller at station A. In the present case, however, the code determining relays CD2, CD4 and CD6 would be energized in lieu of the code determining relays CD2, CD5 and CD6 energized when the reservation button AB was designated by the controller at station A. Being cognizant of the assumptions made in connection with the code chart shown in FIG. 4, it follows that the control relay PC should be energized for the second, fourth and sixth stepping cycles. In order to provide that the code determining relay CD5 is energized at station B, the above indicated circuitry included herein provides for the energization of control relay PC in the fifth stepping cycle and the energization of control relay NC in the sixth stepping cycle. More particularly, following the release of the line pulsing relay, the fifth stepping cycle is initiated as the control relay PC is energized by a circuit extending from (+), through front contact 435 of relay S, over wire 545, through back contacts 357, 365, 371 and 378 of stepping relays V1, V2, V3 and V4 respectively, through front contact 385 of relay V5, over wire 560, through front contact 562 of column relay C1A, over wire 564, through front contact 338 of relay CD6, over wire 521, through back contact 6 of relay NC, through the upper winding of control relay PC, through back contact 419 of relay LP, through back contact 455 of relay CO, to (—). Following the release of line pulsing relay LP initiated during the fifth stepping cycle, the control relay NC is energized to initiate the sixth stepping cycle. Its energizing circuit extends from (+), through front contact 435 of relay S, over wire 545, through back contacts 357, 365, 371, 378 and 385 of stepping relays V1, V2, V3, V4 and V5 respectively, through front contact 392 of relay V6, over wire 562, through front contact 561 of relay C1A, over wire 571, through back contact 327 of relay CD5, over wire 547, through back contact 1 of relay PC, through the upper winding of control relay NC, through back contact 419 of relay LP, through back contact 455 of relay CO, to (—). It will be noted that this is a deviation from the assumptions made in connection with the code chart shown in FIG. 4. It will also be noted that, by referring to the code chart shown in FIG. 4, for each of the three altitudes and the respective codes allotted to the amber reservation, both control buses 5 and 6 are either energized or deenergized for each of the three code combinations. By energizing or deenergizing the control buses 5 and 6 in this manner, the circuitry including front and back contacts 561 and 562 of column relay C1A does not affect the normal sequence of operation of the control relays PC and NC for the respective code combinations.

By referring to the sequence chart shown in FIGS. 6A and 6B with respect to station B, it is seen that the code determining relays are energized following the energization of the line relay FP in their respective stepping cycles. In the present case, the relays CD2 and CD4 would be normally energized following the energization of the line relay FP during stepping cycles 2 and 4 respectively. The relay CD5 would be energized in response to the energization of the line relay FP since the control relay PC was energized to initiate the fifth stepping cycle instead of the sixth stepping cycle which was effected by the circuitry noted above at station A. With the code determining relays CD2, CD4 and CD5 thus energized, the indicator 1KB is operated to display the red symbol in a manner described heretofore in connection with the designation of the amber button AB.

In order to show that the controller at station B cannot cause the green symbol displayed in the indicator 1KB located at station A to be changed, let it be assumed that he designates the altitude selector button 2AS and the amber button AB. The operation of the code communication apparatus would be identical to that shown in the sequence chart of FIGS. 6A and 6B except that it would be in a reverse manner up to the time where the operate relay O is supposed to be energized. Since the designating station is station B, the operate relay O located at station A would normally be energized first. In order to complete the energizing circuit for the operate relay O located at station A, either the front contact 223 of the amber repeater relay AP or front contact 227 of the red repeater relay RP must be closed. It will be noted that the relays AP and RP along with the relay GP are energized through front and back contacts of the bus repeater relays 1BP to 6BP and a front contact of the column relay C1B. It will also be noted that the bus repeater relays 1BP to 6BP are energized in combination in accordance with the position of the reservation indicator in the selected altitude. In this case, it is assumed that the indicator 1KB located at station A is in the position whereat the green symbol is displayed by such indicator. Following the energization of the row relay RA at station A, the relays 1BP, 3BP and 5BP will be energized to complete an energizing circuit for the relay GP which in this case extends from (+), through front contact 52 of relay C1B, over wire 509, through front contact 293 of relay 1BP, through back contact 287 of relay 2BP, through front contact 282 of relay 3BP, through back contact 277 of relay 4BP, through the winding of relay GP, through front contact 273 of relay 5BP, through back contact 267 of relay 6BP, to (—). Since neither the relay AP or the relay RP is energized, the energizing circuit which must include either front contact 223 or front contact 227 of these relays respectively is not established. The negative (—) potential is not then supplied to the control buses 1CB to 6CB in a combination to operate the indicator 1KB. As a result, no further operation of the code communication apparatus located at either station A or station B is effected in this connection. Manual clear out of the code communication apparatus located at both stations A and B is thus in order.

*Posting of Flight Data With Occupancy Reservation*

It has been stated above that it is desirable to have a system wherein the colored symbol or blank indication displayed in the first indicator of a selected altitude may be changed in accordance with the location of the airplane identified by the items of flight data. In this connection, it has been described how the amber symbol displayed in the indicators 1KB located at stations A and B have been operated to the positions where the green symbol and red symbol have been displayed respectively. This should not be construed to mean that the controller at one of the stations should designate appropriate buttons to cause an amber symbol to be displayed in the first indicator of a selected altitude and to then designate flight data buttons to cause each of the remaining indicators in the selected altitude to display an item of flight data before he can cause the displays of the first indicators in the selected altitude to be changed to a green symbol and red symbol respectively. In some instances, the controller at a given station may receive information to the effect that a given airplane is flying in a given altitude which is under his supervision. In such a case, it would be proper for the controller having supervision of that altitude to designate appropriate buttons to cause a green symbol to be displayed in the first indicator of that selected altitude and a red symbol to be displayed in the first indicator of that selected altitude at the other station. The present system includes circuitry which allows the items of flight data to be displayed at the designating station only with a minimum of operation of the code communication apparatus at the other station. It is considered unnecessary for the controller at the other station to know anything except that the selected altitude is being occupied at the first station.

Generally speaking, the code communication apparatus located at both stations A and B is responsive to the designation of an altitude selector button and the green reservation button GB in the manner described above. At the designating station following the operation of the indicator to the position where the green symbol is displayed, the relay GP and the relay 1CK are energized in response to the energization of the bus repeater relays 1BP to 6BP in a code combination to cause the energizing circuit for the relay GPP to be established. With the relay GPP thus energized, the control relay NC located at the designating station is energized only once following the designation of a given flight data button. The energization of the control relay NC is effective to cause the operate relay O to be energized for causing the indicator in the selected altitude to be operated to the position whereat the item of flight data is displayed. The column relays C1A to C6 and the column repeater relay CP are energized by circuits similar to those described above in accordance with the energization and deenergization of the line relay FN.

In order to describe the circuitry included herein to effect the above, let it be assumed that each of the changeable display indicators in row B or altitude 2 is in the blank position. Also, let it be assumed that it is desired to operate the indicator 1KB located at station A to the green position and the indicator 1KB located at station B to the red position while the remaining indicators in row B located at station A are operated to positions corresponding to the items of flight data indicated as being displayed by such indicators in the control panel CP as shown in FIG. 1. In this connection, the operation of the indicators 1KB located at stations A and B is similar to that described above. For this reason, it is believed unnecessary to describe any of the operation in this connection, but to describe the circuitry included herein to effect the operation of the indicators located in row B when the flight data buttons are designated. As indicated above, the relay GPP is energized following the energization of the relays GP and 1CK during the first cycle of operation. This circuit extends from (+), through front contact 132 of check relay 1CK, over wire 676, through front contact 233 of relay GP, through the upper winding of relay GPP, over wire 677, through back contact 456 of relay CO, to (—). This relay GPP is maintained energized until the last cycle of operation has been completed for the selected altitude by a stick circuit which extends from (+), through front contact 239 of relay GPP, through the lower winding of relay GPP, over wire 677, through back contact 456 of relay CO, to (—). Realizing that the relay GPP is thus energized, a circuit included herein to effect the operation of the indicator 2KB to the position where the letter C is displayed by such indicator will now be described. Following the designation of the flight data button CB for the letter C, the code determining relays CD1, CD3 and CD6 will be energized by circuits similar to that described heretofore. The relay CK will then be energized through front and back contacts of the CD relays. Following energization of the relay CK, the control relay NC will be energized by a circuit which extends from (+), through front contact 155 of relay CK, over wire 516, through back contact 408 of relay V8, over wire 517, through back contact 112 of relay RO, over wire 518, through back contact 425 of relay R, through back contact 434 of relay S, over wire 519, through back contact 119 of relay 1CKP, over wire 520, through front contact 256 of relay RRP, through front contact 237 of relay GPP, over wire 547, through back contact 1 of relay PC, through the upper winding of control relay NC, through back contact 438 of relay S, through back contact 427 of relay R, through back contact 455 of relay CO, to (—). Also, following the energization of relay CK, the cycle light CE is energized by a circuit described heretofore and will remain energized until after the indicator 2KB has been operated to the position where the letter C is displayed. The line relay FN at both stations A and B is energized in response to the energization of control relay NC. Following the energization of the line relays, the column relay C2, the line pulsing relay LP and the line repeater relay FNP are each energized at both stations A and B. The energizing circuits for these relays have been described heretofore and will not be repeated here. As before, following the energization of column relay C2 the column relays C1A and C1B are sequentially released. Following the energization of the line repeater relay FNP an energizing circuit for the operate relay O is established and extends from (+), through back contact 210 of relay AT, over wire 535, through back contact 54 of relay BK, over wire 536, through back contact 441 of relay S, through front contact 27 of relay FNP, over wire 672, through front contact 240 of relay GPP, over wire 673, over wire 538, through front contact 448 of relay LO, over wire 539, through front contact 159 of relay CK, over wire 540, through the lower winding of operate relay O, over wire 541, through back contact 453 of relay CO, to (—). With the operate relay O thus energized, a negative (—) potential is applied directly to the control buses 1CB, 3CB and 6CB to operate the indicator 2KB to the position where the letter C is displayed. Following the indicator operation, the check circuit including relays 1CK and 1CKP are energized in sequence as usual. Following the energization of the relay 1CKP, the energizing circuit for the control relay NC which includes back contact 119 of relay 1CKP is disconnected to thus deenergize control relay NC. The energizing circuit for the cycle light CE which includes front contact 125 of relay 1CKP is disconnected upon the release of relay 1CKP to thus deenergize light CE. The other relays energized in response to the designation of the button CB and the operation of the indicator 2KB are deenergized in the normal sequence. The operation of remaining indicators in row B or altitude 2 is similarly effected upon the designation of the respective flight data buttons in sequence. It is believed unnecessary to describe the operation here. Following the operation of the last indicator in row B or altitude 2 wherein the numeral 2 would be displayed, the code communication apparatus at both stations A and B would be automatically cleared out.

Transfer of Flight Data

It is considered reasonable to assume that the airplane identified by the flight data posted in the indicators of altitude 2 as described above may have its flight plan changed to the effect that it should fly at another altitude. The present invention provides that the flight data may be transferred to the indicators of such other altitude at both stations or at only one of the stations depending upon whether the airplane is intending to fly at such other altitude or whether the airplane is occupying such other altitude. In general, should it be desired to transfer the items of flight data from one altitude to another altitude at both stations, the controller at one station would first designate the altitude selector button corresponding to the altitude to which he desires to transfer the items of flight data followed by the designation of the amber reservation button AB and the transfer button corresponding to the altitude or row of changeable display indicators having the items of flight data posted therein wherefrom it is desired to transfer. In this connection, the first indicator or the reservation indicator of the selected altitude will operate in the normal sequence at both of the stations while each succeeding changeable display indicator located at the designating station will operate simultaneously with the corresponding changeable display indicator in the selected altitude located at the other station with such simultaneous operations being effected in sequence. If it is desired to transfer the items of flight data previously posted in the changeable display indicators of a particular row to the changeable display indicators in another row at only the designating station, the controller must first designate the altitude selector button for the altitude or row having therein the changeable display indicators which he desires to have operate followed by the designation of the reservation button GB. The first indicator or reservation indicator in the selected altitude would operate to a position where the green symbol is displayed while the first indicator or reservation indicator in the selected altitude at the other station would operate to display a red symbol. Following such indicator operation, the transfer button corresponding to the altitude or row of changeable display indicators wherefrom it is desired to transfer items of flight data is designated by the controller to effect the transfer of the items of flight data from each of the changeable display indicators to their correspondingly located changeable display indicators in the selected altitude at only the designating station.

With this in mind, it shall be assumed that the flight plan for the airplane identified by the items of flight data indicated on the control panel CP shown in FIG. 1 has been changed to the effect that the airplane will be flying at the first altitude identified by the changeable display indicators in row A. In light of this assumption, the controller at station A would designate the altitude selector button 1AS, the reservation button AB and the transfer button 2TB to effect the transfer of the items of flight data from the indicators of row B to the indicators of row A. Generally speaking, following the designation of the altitude selector button 1AS and the reservation button AB, the code communication apparatus located at both stations A and B would be conditioned in the normal manner for causing the indicators 1KA to be sequentially operated to the position where the amber symbol is displayed by both such indicators. Designation of the transfer button 2TB introduces circuits which, in conjunction with the circuits responsive to the designation of the altitude selector button 1AS and the reservation button AB, are effective to initiate the conditioning period for each cycle of operation following the release of the check repeater relay 1CKP in the preceding cycle of operation. During each such conditioning period for the respecttive cycles of operation wherein the column relay corresponding to that cycle of operation is energized, the bus repeater relays 1BP to 6BP are energized in a combination according to the closed commutator contacts of the indicator wherefrom it is desired to transfer an item of flight data. Also, during each such conditioning period, the receive relay R is energized at the designating station in lieu of the seond relay S. During the six stepping cycles following the conditioning cycle, the code determining relays CD1 to CD6 are energized in code combinations in accordance with the stepping cycles wherein the control relay PC is energized. The control relays PC and NC are energized in the proper combinations in accordance with the bus repeater relays 1BP to 6BP energized during the conditioning cycle. In effect, the code communication apparatus located at the designating station is conditioned partly as though it was initiating or transmitting controls over the line circuit while at the same time receiving controls over the line circuit. It should be noted that the code communication apparatus and the changeable display indicators located at station B in the selected altitude are conditioned and operated in the manner described heretofore in connection with the sequence chart shown in FIGS 6A to 6E. The description of the additional circuits introduced by the designation of the transfer button 2TB will presently be given in order to show how the transfer of items of flight data from the indicators in one altitude to the indicators in another altitude is accomplished at both stations A and B.

With respect to station A, following the designation of the altitude selector button 1AS, the relays C1B 2BP, 3BP, 4BP and AP are energized in the normal manner. Following the energization of relay AP, the holding coil 1AH associated with the altitude selector button 1AS is energized by a circuit similar to that described for holding coil 2AH. Following the designation of the amber reservation button AB, an energizing circuit for the relay CDO is established which is similar to that described heretofore for the energization of relay CD2 except that it continues through the closed contact 490 of amber button AB, through the diode 60D, through closed contact 492 of altitude selector button 1AS, through diode 63D, through the winding of relay CDO, to (—). This relay CDO is included here to facilitate in the connection of the code determining buses 1CDB to 6CDB to a positive (+) potential following the designation of an altitude selector button and a reservation button. In the present case, the relays CD1, CD3 and CD4 should be energized following the designation of the buttons 1AS and AB. The energizing circuit for the relay CD4, for example, includes back contact 490 of amber button AB, diode 61D, and front contact 31 of relay CDO. It will be noted that the front and back contacts of the relay CDO are included in the energizing circuits for the relays CD4, CD5 and CD6 which provides for the energization of these relays for each altitude according to the reservation button designated. The code communication apparatus located at station A then responds to the designation of the respective buttons in accordance with the code determining relays energized.

Following the designation of the transfer button 2TB, the amber transfer relay AT is energized by a circuit extending from (+), through closed contact 495 of transfer button 2TB, over wire 660, through the winding of relay AT, through front contact 222 of relay AP, over wire 661, through front contact 260 of relay RRP, to (—). Following the energization of relay AT, the energizing circuit for the holdling coil 2TH and the transfer light 2TE is established and extends from (+), through front contact 450 of relay LO, over wire 500, through front contact 470 of cancel button CNB, through front contacts 471, 472, 473, 474 and 475 of correction buttons CB6, CB5, CB4, CB3 and CB2 respectively, over wire 501, through back contact 477 of transfer button 2TB, through the holding coil 2TH and the transfer light 2TE connected in shunt, over wire 662, through front contact 213 of relay AT, over wire 661, through front contact 260 of relay RRP, to (—). It will be noted that the holding coil 2TH and the transfer light 2TE will be maintained energized until the last cycle of operation corresponding to the last indicator in the row has been completed and the relay RRP has been subsequently released. The contacts of the transfer button 2TB will thus be maintained closed to complete various circuits during the cycles of operation while the light 2TE is effective to inform the controller at station A that items of flight data are being transferred from row B or altitude 2 and that such transfer is in progress. During the normal conditioning of the code communication apparatus and more particularly following the energization of stepping relay V7 and the subsequent release of V6, the read-out relay RO is energized by a circuit which extends from (+), through front contact 210 of relay AT, through back contacts 358, 366, 372, 379, 386 and 393 of stepping relays V1, V2, V3, V4, V5, and V6 respectively, through front contact 400 of stepping relay V7, over wire 657, through the lower winding of read-out relay RO, to (—). Energization of relay RO in this manner is effective to condition the base of transistor 11Q associated with indicator 1KB during the time that the indicator 1KA is being operated to the amber position so that the indicator 1KB cannot be erroneously operated to interfere with the operation of indicator 1KA. Following the release of relay 1CKP after the indicator 1KA has operated, the second cycle of operation is initiated as the energizing circuit for the control relay PC is established from (+), through front contact 210 of relay AT, through back contacts 358, 366, 372, 379, 386, 393, 400 and 408 of stepping relays V1, V2, V3, V4, V5, V6, V7 and V8 respectively, over wire 517, through back contact 112 of relay RO, over wire 518, through back contact 425 of relay R, through back contact 434 of relay S, over wire 519, through back contact 119 of relay 1CKP, over wire 520, through front contact 256 of relay RRP, through back contact 237 of relay GPP, over wire 521, through back contact 6 of relay NC, through the upper winding of control relay PC, through back contact 438 of relay S, through back contact 427 of relay R, through back contact 455 of relay CO, to (—). It should be noted here that the read-out relay RO previously energized was maintained energized by a stick circuit extending from (+), through front contact 135 of relay 1CK, through front contact 115 of relay RO, through the lower winding of relay RO, to (—). Following the release of relay 1CK in the normal manner, the relay RO was released. With the control relay PC energized to initiate the conditioning cycle for the second cycle of operation, the line relay FP and the relay LP are energized in sequence by circuits described heretofore. Following the energization of relay LP, the energizing circuit for the receive relay R is established and extends from (+), through the lower winding of relay R, over wire 574, through front contact 211 of relay AT, over wire 526, through front contact 444 of relay LO, through front contact 14 of relay FP, through front contact 422 of relay LP, over wire 527, through back contacts 363, 370, 376, 383, 390, 397, 404 and 413 of stepping relays V1, V2, V3, V4, V5, V6, V7 and V8 respectively, over wire 528, through back contact 456 of relay CO, to (—). Following the release of the column relay C1B and the energization of the column relay C2, the base of the transistor 11Q associated with indicator 2KB is conditioned to the extent that such transistor 11Q is energized for effecting the energization of the BP relays in combination in accordance with the closed commutator contacts 2C, 4C and 5C of indicator 2KB. More specifically, the positive (+) potential placed at the base of transistor 11Q as a result of the potential drop across resistor 19R is effectively changed to a negative (—) potential to thus energize transistor 11Q. Each of the two circuits for causing the potential drop across resistor 19R are disconnected. One such circuit extends from the (+) terminal of battery 48, through diode 15D, over wire 705, through back contact 61 of column relay C2, over wire 713, through diode 11D associated with indicator 2KB, through resistor 19R associated with indicator 2KB, to the (—) terminal of battery 48 while the other circuit extends from the (+) terminal of battery 48, through transistor 16Q, over wire 710, through diode 12D associated with indicator 2KB, through resistor 19R associated with indicator 2KB, over wire 715, to the (—) terminal of battery 48. The first such circuit is disconnected when the column relay C2 is energized while the second circuit is disconnected when the transistor 16Q included therein is deenergized. The transistor 16Q is deenergized when its base is placed at a positive (+) potential by a circuit extending from the (+) terminal of battery 48, over wire 708, through back contact 118 of relay RO, through back contact 54 of relay C1B, over wire 714, through back contact 493 of transfer button 1TB, through back contact 496 of transfer button 2TB, to the base of transistor 16Q. The transistors 2Q, 4Q and 5Q associated with relays 2BP, 4BP and 5BP are energized in a manner described heretofore upon the energization of transistor 11Q associated with indicator 2KB to cause the subsequent energization of their respective relays. During the six stepping cycles following the conditioning cycle, the control relay PC is energized on stepping cycles 1, 3 and 6 while the control relay NC is energized on stepping cycles 2, 4 and 5. It will be seen that the stepping cycles in which the control relay NC is energized corresponds to the BP relays energized while the stepping cycles in which the control relay PC is energized corresponds to the BP relays left deenergized. One such circuit established for energizing control relay PC to initiate the first stepping cycle extends from (+), through front contact 210 of relay AT, through front contact 358 of relay V1, through back contact 290 of relay 1BP, over wire 521, through back contact 6 of relay NC, through the upper winding of control relay PC, through back contact 419 of relay LP, through back contact 455 of relay CO, to (—). Similar circuits for the control relays NC and PC may be traced for the remaining five stepping cycles. The relays CD1, CD3 and CD6 are energized by circuits similar to those described heretofore following the energization of the line relay FP in the respective stepping cycles. The read-out relay RO is again energized following the energization of relay V7 and the subsequent release of relay V6 by a circuit similar to that described above. The operate relay O is then energized by a circuit similar to that described above except that it includes back contact 47 of relay C1A in lieu of front contacts 350 and 355 of relays CD7 and CD8 respectively and front contact 113 of relay RO. The energizing circuits for the operate relay O for the subsequent cycles of operation wherein the remaining indicators in row A or altitude 1 are operated will also include back contact 47 of relay C1A in lieu of front contacts 350 and 355 of relays CD7 and CD8 respectively. The operate relay O is effective after being energized to connect the control buses 1CB, 3CB and 6CB directly to the (—) terminal of battery 48 through front contacts 301, 316 and 343 of relays CD1, CD3 and CD6 respectively. The indicator 2KA then operates to the position where the letter C is displayed by such indicator in the normal manner. Following the release of the relay 1CKP energized in the normal manner after the operation of indicator 2KA, the third cycle of operation is initiated as the control relay PC is energized by a circuit similar to that described heretofore. Since the cycles of operation following the second cycle of operation are similar in nature to that of the second cycle, it is considered unnecessary to describe the conditioning of the code communication apparatus and the subsequent operation of the respective changeable display indicators for each of these remaining cycles of operation.

The code communication apparatus located at station B is conditioned in a manner typical of a reservation cycle of operation and subsequent posting cycles of operation following the designation of the altitude selector button 1AS and the reservation button AB located at station A. For this reason, it is considered unnecessary to described the conditioning of the code communication apparatus and the operation of the respective indicators for the cycles of operation.

In order to describe the circuitry included herein for effecting the transfer of items of flight data from one altitude to another altitude at only the designating station, it shall be assumed that the flight plan for the airplane identified by the items of flight data indicated on the control panel CP shown in FIG. 1 has been changed to the effect that such airplane is flying in the first altitude identified by the changeable display indicators in row A. In light of this assumption, the controller at station A would designate the altitude selector button 1AS and the reservation button GB to cause the first indicators in altitude 1 or row A to be operated to the respective positions whereat the green symbol is displayed by the respective indicator located at station A and the red symbol is displayed by the respective indicators located at station B. Following the indicator operation at station A, the controller would designate the transfer button 2TB to subsequently cause the transfer of items of flight data displayed in the indicators of the altitude wherefrom it is desired to transfer to the corresponding indicators in the selected altitude. In this connection, the code communication apparatus located at station B would not be conditioned in any manner following the designation of the transfer button 2TB. Generally speaking, the transfer at station A is effected in the manner described in the above named Wilcox application, i.e., all of the control buses 1CB to 6CB are connected directly to a negative (—) potential which is effective to condition the respective groups of column buses connected thereto in a manner depending upon the closed changeable contacts of the conditioned indicators in the row wherefrom it is desired to transfer. In general, this is accomplished by causing a potential drop across a resistor connected in a given column bus which is associated with a closed changeable contact of a given indicator. Such potential drop effectively establishes a positive (+) potential on that column bus to render it ineffective to operate another indicator connected in the same column.

More specifically, it is assumed that the indicators 1KA located at stations A and B are operated to their respective positions in a manner similar to that described heretofore. Following the designation of the transfer button 2TB by the controller as station A, the green transfer relay GT is energized by a circuit extending from (+), through back contact 495 of transfer button 2TB, over wire 660, through the winding of relay GT, over wire 698, through front contact 234 of relay GP, through front contact 260 of relay RRP, to (—). Energization of relay GT in this manner is effective to establish other circuits for energizing each of the control buses 1CB to 6 CB with a negative (—) potential and to condition all the indicators located in row A except indicator 1KA to be responsive to the energization of their respective groups of column buses in different code combinations. Following the energization of relay GT, the energizing circuit for the holding coil 2TH and the transfer light 2TE is established. Such circuit is similar to that described in connection with the amber transfer except that it includes front contact 204 of relay GT in lieu of front contact 213 of relay AT. Also, following the energization of relay GT, the energizing circuit for relay RC which extends from (+), through front contact 206 of relay GT, over wire 699, through the winding of relay RC, to (—) is established. Following the energization of relay RC, the energizing circuit for the relay RCP is established and extends from (+), through front contact 175 of relay RC, over wire 701, through front contact 205 of relay GT, over wire 702, through the winding of relay RCP, over wire 703, through back contact 51 of relay C1B, to (—). Also, the energizing circuits for the column relays C2 and C6 are energized through front contacts of the relay RC. One such circuit for column relay C2, for example, extends from (+), through front contact 180 of relay RC, over wire 691, through the lower winding of relay C2, to (—). With each of the column relays C2 to C6 thus energized and the relay RB previously energized following the designation of the reservation button GB, the transistors 11Q associated with their respective indicators located in row A are conditioned to be responsive to a negative (—) potential applied to their respective collector circuits through the closed changeable contacts of their associated indicators. Following the energization of such relays C2 to V6, the energizing circuit for the relay RCPP is established and extends from (+), through front contact 174 of relay RC, through front contact 166 of relay RCP, through the winding of relay RCPP, to (—). With relay RCPP thus energized, each of the control buses 1CB to 6CB is connected to the (—) terminal of battery 48 through a front contact of the relay RCPP. For example, the control bus 2CB is connected to the (—) terminal of battery 48 through front contact 198 of relay RCPP, over wire 587, over wire 530, to the (—) terminal. With each of the control buses 1CB to 6CB thus energized, the transfer operation is initiated between the indicators of row B and the indicators of row A except for the first indicator of each such row.

More specifically, in order to show how the above transfer operation is effected between the indicators of row B and the indicators of row A, an example will now be given wherein it will be described how the indicators 2KB and 2KA are conditioned for effecting the transfer between such two indicators. With reference to indicator 2KB, the common connection to the changeable contacts 1C to 6C is connected to the (+) terminal of battery 48 through diode 9D, over wire 670, through back contact 494 of transfer button 2TB, through front contact 497 of transfer button 1TB, through back contact 215 of relay AT, through front contact 207 of relay GT, to the (+) terminal. The column buses B1 to B6 associated with indicator 2KB are then energized in a code combination in accordance with the closed changeable contacts 2C, 4C and 5C when the control buses 1CB to 6CB are connected to the (—) terminal of battery 48. For example, a circuit is established through changeable contact 2C which causes the resistor 10R to have a potential drop therein which effectively places the column bus B2 to a positive (+) potential. This circuit extends from the (+) applied to the common connection of the commutator contacts 1C to 6C, through closed contact 2C, through diode 2D, over column bus B2, through resistor 10R, to the control bus 2CB energized with a negative (—) potential. The base of transistor 11Q associated with indicator 2KA has been conditioned by two circuits previously established. Such two circuits are effective to remove the positive (+) potential from the base of such transistor 11Q when they are disconnected. One such circuit is dependent upon the energization of transistor 15Q which energization is effective to connect the base of transistor 11Q to the (+) terminal of battery 48. Transistor 15Q is deenergized to disconnect such circuit when the relay RB is energized. More specifically, the base of transistor 15Q is connected to the (+) terminal of battery 48 through front contact 254 of relay RB, through back contact 247 of relay RA, through back contact 216 of relay AT, to the (+) terminal. A positive (+) potential is also removed from the base of transistor 11Q when the column relay C2 is energized. Such positive (+) potential is supplied to the base of transistor 11Q from the (+) terminal of battery 48, through diode 15D, over wire 705, through back contact 61 of relay C2, over wire 713, through diode 11D, to the base. With the transistor 11Q thus conditioned, the indicator 2KA will operate in response to the effective energization of column buses B1, B3 and B6 to the position where the letter C is displayed by such indicator. The remaining indicators in row A will be operated simultaneous with the operation of indicator 2KA since their respective transistor circuits are conditioned simultaneously with the transistor circuit associated with indicator 2KA. It should be noted here, however, that, although the initiation of the indicator operations are simultaneous, one indicator may be operated for a longer period than another indicator depending upon the position that the indicator is in and the position of the item of flight data inscribed on the tape element with respect to the face of the indicator. Following the transfer of the items of flight data in this manner, the code communication apparatus located at both stations A and B would be cleared out by the respective controllers when they designate their respective reset button RSB which, in each case, is effective to energize the clearout relay CO. The energizing circuit for relay CO would extend from (+), through back contact 498 of reset button RSB, through the upper winding of relay CO, to (—). Upon the energization of relay CO, the relay RRP would be released followed by the release of other relays in the proper sequence which were previously energized. The light 2TE is also deenergized following the release of relay RRP which thus conveys to the controller at station A that the transfer operation has been completed and that the code communication apparatus is being cleared out.

*Blanking of Indicators*

It has been shown and described above by way of examples how a controller at one of two stations can cause correspondingly located indicators at the two stations to be operated to display reservation symbols after he designates the appropriate altitude selector button and reservation button. Thereafter, the controller may cause the remaining indicators in the selected altitude or row of indicators to be sequentially operated to display items of flight data by designating appropriate flight data buttons. Also, it has been shown and described above by way of examples how the controller at the same station may cause the items of flight data to be transferred to corresponding indicators disposed at both stations after he designates the appropriate altitude selector button and reservation button for another altitude or row of indicators. This transfer operation was performed under the assumption that the airplane identified by the items of flight data was going to fly or was flying at the different altitude. After the transfer has been effected, it is obvious that the reservation symbol displayed by the first indicator of the first selected altitude is obsolete as far as the whereabouts of the airplane identified by the items of flight data. To avoid confusion, it would be suitable to provide some means which would enable the controller to cause all of the indicators in the altitude wherein the first indicator displays a reservation symbol which is obsolete with respect to the location of the airplane to be operated to their blank positions. The present system provides such a means.

In the present case, in order for a controller to operate all indicators in a given altitude or row to the blank position at both stations, he needs only to designate the altitude selector button for that altitude and the blanking button BB. The code communication apparatus located at both stations would then be conditioned in accordance with the reservation symbol displayed by the first indicators in the selected altitude. The indicators located at both of the stations in the selected altitude would then be operated to their blank positions in a similar manner to that described for the operation of indicators 1KB located at stations A and B. That is, following the designation of the appropriate buttons, the conditioning of the code communication apparatus at both stations and the six stepping cycles at both stations, all of the indicators in the selected altitude located at the nondesignating station are simultaneously operated to their blank positions after which all of the indicators in the selected altitude at the designating station are simultaneously operated to their blank positions following the seventh and eighth stepping cycles. The code communication apparatus at both stations is then automatically cleared out in the manner described above.

In order to describe the circuitry included herein to effect the blanking operation as indicated above, it is assumed that the indicator 1KB located at station A displays a green symbol while the indicator 1KB located at station B displays a red symbol while the remaining indicators in row B or altitude 2 displays the letters and numerals as indicated on the control panel in FIG. 1. It is also assumed that the airplane identified by the items of flight data is flying at another altitude which is, of course, sufficient reason to make the reservation symbols obsolete and to thus require the blanking operation to be effected.

Following the designation of the altitude selector button 2AS and the blanking button BB by the controller at station A, the code communication apparatus located at station A is conditioned during the stepping cycles similar to that described above wherein the reservation button GB was designated. That is, in the above case it was shown and described how the control relay PC was energized during the fifth stepping cycle and the control relay NC was energized during the sixth stepping cycle with the aid of front contacts 561 and 562 of column relay C1A. In effect, with the assumptions made in connection with the code chart shown in FIG. 4 in mind, the code determining buses 1CDB to 6CDB are energized in the combination shown for each of the three altitudes and the R or red type of reservation. Using such code combinations for a given altitude and the blanking button BB, the control relay NC is energized during the fifth stepping cycle and the control relay PC is energized during the sixth stepping cycle for each of the altitudes in order to condition the code communication apparatus at both stations A and B to operate the appropriate indicators to their blank positions. Since the energization of the control relay NC and control relay PC during the fifth and sixth stepping cycles respectively is accomplished in a similar manner to that described above, it is considered unnecessary to extend this description here. In order to describe the circuitry included herein for blanking purposes, it will be assumed that the code communication apparatus located at station A has responded to the control of the control relays PC and NC located at station B for the seventh and eighth stepping cycles. With this assumption in mind, the description will be rendered first with respect to station A and second with respect to station B.

At station A, following the energization of relay CD8 in the manner described above, the blank relay BK is energized by a circuit extending from (+), through front contact 446 of relay LO, over wire 682, through front contacts 331, 348 and 353 of relays CD5, CD7 and CD8 respectively, over wire 683, through front contact 230 of relay GP, over wire 684, through back contact 341 of relay CD6, over wire 685, through the upper winding of relay BK, over wire 686, through back contact 458 of relay CO, to (−). With the relay BK thus energized, energizing circuits for the code determining relays CD1, CD5 and CD6 are established as a result of a positive (+) potential being connected respectively to their code determining buses 1CDB, 5CDB and 6CDB through front contacts 148, 147 and 146 respectively of relay BK. One such energizing circuit, for example, extends from (+), through front contact 147 of relay BK, over bus 5CDB, through the lower winding of relay CD5, over wire 582, through back contact 454 of relay CO, to (−). With the energization of relays CD1, CD5 and CD6 in this manner, the energizing circuit for the relay CK is disconnected to thus deenergize relay CK. Following the release of relay CK, the energizing circuit for the blank repeater relay BKP is established and extends from (+), through back contact 156 of relay CK, over wire 688, through front contact 150 of relay BK, through the winding of relay BKP, to (−). With the subsequent energization of relay BKP, the stick circuits for relays CD2 and CD4 including back contacts 130 and 140 of relay BKP are disconnected to thus deenergize these relays. Following the release of relays CD2 and CD4, relay CK is again energized. Also, following the energization of relay BKP, the energizing circuit for relay RC is established and extends from (+), through front contact 138 of relay BKP, over wire 690, through the winding of relay RC, to (−). Following the energization of relay RC, an energizing circuit for each of the column relays C2 to C6 is established to thus energize each of the relays. One such circuit, for example, for column relay C2 extends from (+), through front contact 180 of relay RC, over wire 691, through the lower winding to column relay C2, to (−). The other energizing circuits may be similarly traced. Following the energization of relay CK as described above, the energizing circuit for the operate relay O is established to thus energize relay O. This circuit is the same as that described heretofore except that it includes front contact 142 of relay BKP in lieu of back contact 54 of relay BK. With the energization of these relays in this manner, the respective motor controlling circuits for the indicators in row B or altitude 2 are conditioned to be responsive to the negative (−) potential applied directly to the control buses 1CB, 5CB and 6CB through front contacts 301, 334 and 343 of relays CD1, CD5 and CD6 and front contacts 200, 186 and 185 of operate relay O respectively. All of the indicators in row B or altitude 2 are operated to their blank positions from their respective positions as indicated by the symbol, numerals and letters as shown on the control panel in FIG. 1. Following the operation of all of these indicators, the check circuit including relays 1CK and 1CKP is established in the usual manner to further establish and effect the automatic clear-out of the code communication apparatus located at station A. It should be noted that relay BK was maintained energized by a stick circuit which extended from (+), through front contact 152 of relay BK, through back contact 125 of relay 1CKP, over wire 715, through front contact 149 of relay BK, through the lower winding of relay BP, over wire 686, through back contact 458 of relay CO, to (−). Upon energization of relay 1CKP, this stick circuit was disconnected. Also, a stick circuit for relay BKP extended from (+), through front contact 141 of relay BKP, through front contact 150 of relay BK, through the winding of relay BKP, to (−). This circuit was, of course, disconnected when relay BK was released. Consideration of the blanking operation will now be given with reference to station B.

The code communication apparatus located at station B is conditioned in the same general manner as that described heretofore when it was assumed that the controller at station A designated the altitude selector button 2AS and the reservation button GB. Following the sixth stepping cycle, however, the energizing circuit for the relay BK is established. This circuit extends from (+), through back contact 446 of relay LO, over wire 694, through front contact 158 of relay CK, through back contact 332 of relay CD5, over wire 695, through front contact 226 of relay RP, over wire 696, through front contact 341 of relay CD6, over wire 685, through the upper winding of relay BK, over wire 686, through back contact 458 of relay CO, to (—). With the relay BK thus energized, similar relays to those described above for station A following the energization of relay BK are energized in the same sequence. The motor controlling circuits of the indicators in row B or altitude 2 located at station B are conditioned in a manner similar to that described heretofore and are responsive to the negative (—) potential applied directly to the control buses 1CB, 5CB and 6CB to simultaneously cause the operation of their respective indicators to the blank position. The operation of the relays and the automatic clear-out of the code communication apparatus located at station B is then similar to that described above and thus will not be further described here.

If it would have been assumed that the indicator 1KB at both stations A and B was in the position where the amber symbol was displayed by such indicators, the code communication apparatus at both stations A and B would be conditioned in response to the designation of altitude selector button 2AS and blanking button BB in almost an identical manner as that described above. Of course, since it is assumed that the indicators are in their amber positions, the relays CD5 and CD6 would be energized following the designation of the buttons 2AS and BB. In this connection, the front contacts 561 and 562 of column relay C1A would be included in the energizing circuits for the control relays PC and NC, but the relays PC and NC would be energized in accordance with the assumptions made in connection with the code chart shown in FIG. 4. The only other difference for effecting the blanking operation in this connection is in the energizing circuit for the blank relay BK located at both the stations A and B. At station A, the energizing circuit for relay BK would include front contact 219 of relay AP in lieu of front contact 230 of relay GP. At station B the energizing circuit for the relay BK would include front contact 220 of relay AP in lieu of front contact 226 of relay RP. Other than these differences pointed out, the operation of the code communication apparatus at both stations A and B is identical to that described above.

*Local Manual Reset*

In the scope of the present invention, it should be assumed that various normal and abnormal operations of the apparatus included in the system could occur which would require that the controllers at their respective stations designate button means included with their respective apparatus to cause their respective apparatus to be returned to its at-rest condition. Inasmuch as such button means is concerned with a normal operation of the system, one example has been described above in connection with the transfer operation wherein the indicators 1KA located at stations A and B were operated to display the green and red symbols respectively. Following the operation of the indicators 1KA, it was described in a general manner how the code communication apparatus located at stations A and B could be cleared out following the designation of the reset button RSB by the controllers at the respective stations. This is one example where the respective controllers would be required to designate their respective reset puttons RSB in order to clear out their respective apparatus.

To consider where the reset button RSB may be utilized by the controller in connection with an abnormal operation of the system, it is assumed that, following the designation of the flight data button CB after the altitude selector button 2AS and the reservation button AB has been designaed to select the altitude 2 and cause the first indicator or indicator 1KB at each station to be operated to its amber position, the indicator 2KB located at station B fails to operate correctly. With this assumption in mind, it should be obvious that the commutator contacts 1C to 6C will not be positioned correctly in order to cause the energization of the proper bus repeater relays 1BP to 6BP. It will be remembered that the energizing circuit for the relay 1CK includes a combination of the relays CD1 to CD6 previously energized and the relays 1BP to 6BP energized in response to the indicator operation. From this, it is obvious that the energizing circuits for the control relays PC and NC for the seventh and eighth stepping cycles respectively will not be established at station B. Since such relays PC and NC are not energized, the code communication apparatus located at station A will not be conditioned to operate the indicator 2KB to the position C in response to the designation of the flight data button CB by the controller thereat. Should the controller at station A or station B desire to cause the operation of other indicators in another altitude before the malfunctioning indicator or other element is replaced or repaired, it would be necessary to clear out the respective code communication apparatus. To accomplish this, it would only be necessary for the respective controllers to designate their respective reset button RSB which, in each case, would be effective to energize the clear out relay CO. The respective code communication apparatus would then be cleared out as described above.

*Modification of System*

It has been stated above that the present system can be modified to the extent that the code chart shown in FIG. 5 would be applicable. In this connection, there are three general areas in which the present system can be modified. That is, the 36 position changeable display indicator type described in the above named Maynard application may be employed in order to increase the number of items of flight data inscribed on the tape element of such indicator. In employing the 36 position type indicator, it would be necessary to expand the system to an eight bus wire system in lieu of the six bus wire system shown and described above. In using an eight bus wire system, more code combinations are available with which the code communication apparatus can be altered accordingly to provide for more altitudes or rows of changeable display indicators. The system may be expanded a third way by increasing the number of columns of changeable display indicators merely by including additional column relays and other necessary circuits therefor.

In employing the 36 position type indicator, it would be necessary to add two additional code determining relays CD with relays CD1 to CD6 in order that four of such relays may be energized following the designation of an altitude selector button and a reservation or flight data button in order to condition the system accordingly. Obviously, the altitude selector buttons, reservation and flight data buttons will have to be connected in a suitable manner to energize four of the eight code determining relays. This could be accomplished similar to that shown in FIG. 3A. Also, two additional relays and the circuits therefor will have to be included for the stepping relays V and the bus repeater relays BP similar to those shown in FIG. 3.

In order to provide for the additional altitudes or rows, more row relays such as RA and RB should be included opening upon the number of additional altitudes or row of indicators. The rows of changeable display indicators may be conditioned then by similar circuits to that shown in FIG. 3. In order to increase the number of columns of indicators, it would be necessary to increase the number of column relays and the circuits therefor in the manner shown in FIG. 3. It should be noted, however, that the present circuitry for the column relays requires that an even number of column relays be added to the present circuit shown in FIG. 3.

Should the present system be expanded in the manner described above, more items of flight data could be posted for each of several reserved altitudes to thereby increase the amount of information pertaining to an airplane as well as the comparable information for several other airplanes. In this manner, the different kinds of information pertaining to an airplane which have been indicated above can be caused to be posted in the indicators of a selected altitude or row of changeable display indicators.

RESUME

It has been shown and described above how either of two controllers governing the airplane flights in the airway between their respective stations can cause various information pertaining to the airplane flights to be displayed in changeable display indicators arranged according to altitudes in order to aid them in the governing of such airplane flights. More specifically, it has been shown and described how each of the two controllers can designate appropriate buttons to select an altitude and to thereafter cause the changeable display indicators in that altitude to be operated to positions where a type of reservation and items of flight data are displayed in a predetermined manner at either one station or both stations. It has also been shown and described how the controller can cause the system apparatus to be responsive to the designation of various buttons to further provide for various operations of the changeable display indicators such as correction, transfer and blanking operations.

It should be noted that various relays included in FIGS. 3A to 3T are shown to be shunted by a resistor or a diode each of which has not been described above. Such resistors and diodes are included in this manner to provide for the proper sequence of operation of the various relays when they respond to the designation of appropriate buttons. Also, other diodes are included in the circuitry shown in FIGS. 3A to 3T, each of which is employed to permit the respective wires to be energized in the desired manner.

Having described an air traffic control system, as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What we claim is:

1. An air traffic control system comprising, in combination, two remotely spaced stations, a control panel means located at each of said stations having disposed thereon a plurality of manually operable botton means some of which are individually associated with a lamp means, a cycle light means, and a plurality of changeable display indicators, each such indicator being operable to a plurality of display positions, normally at-rest code communication apparatus, and a line circuit for connecting the code communication apparatus located at each of the two stations, said code communication apparatus located at both of said two stations being responsive to the designation of certain of said button means at one of said stations in a predetermined manner to effect the transmission of controls between the two stations over the line circuit for causing the operation of selected indicators located at both stations to positions representative of the button designations for displaying similar indications to those assigned to such buttons designated, such indicators being effective in combinations to display identifying information relating to an airplane flight, designation of the remaining button means in a predetermined manner being effective to cause the operation of changeable display indicators responsive to the conditioning of the respective code communication apparatus located at each station in accordance with such button means designated for displaying the identifying information in accordance with the changed location of the airplane, said lamp means and said cycle light means being provided to convey indications of various conditions of the system in response to the designation of the button means in a predetermined manner and the subsequent conditioning of the code communication apparatus located at both stations.

2. An air traffic control system of communication connecting two remotely spaced stations for facilitating the governing of airplane flights therebetween comprising, in combination, a control panel located at each of said two stations having disposed thereon manually operable means for each of a plurality of altitudes for designating its respective altitude, manually operable means for designating reservation of each flight altitude in accordance with the designated condition of its said altitude selecting means, and a plurality of changeable display indicators corresponding in number to the altitudes, each said indicator being provided for displaying a symbolic indication representative of a reservation designation, normally at-rest code communication apparatus including a duplex line circuit effective to transmit in response to selection of an altitude and to designation of a reservation at one station a step by step control code characteristic of that altitude and reservation selected over the duplex line circuit from that station for effecting the operation of the corresponding indicator for that altitude at the other station to display the desired symbolic reservation indication when the transmission of such control code is completed, the effective operation of such indicator being effective to cause the normally at-rest code communication apparatus disposed at said other station to transmit a step by step control code of less steps than transmitted by said one station for effecting the operation of the corresponding altitude indicator at said one station to display a similar reservation indication.

3. An air traffic control system as specified in claim 2, wherein the control panel located at each of said two stations includes a plurality of changeable display indicators with each of the changeable display indicators provided for displaying reservation symbols for its respective altitude, each of said plurality of changeable display indicators adapted to be operated to a plurality of positions for displaying one item of flight data in each position, means included with the code communication apparatus at each station for effecting sequential control of such indicators for the altitude selected, and said panel including and having disposed thereon a plurality of manually operable means for selecting items of flight data, means included with said code communication apparatus responsive to the designation of an item selecting means for causing the step by step control code to be transmitted over said duplex line circuit for effecting the operation of corresponding display indicators located at both stations in accordance with the designation of an altitude selecting means and reservation selecting means, the sequential control of the changeable display indicators being effective to cause such indicators to display a plurality of items of flight data for providing the identifying information concerning an airplane flight.

4. An air traffic control system as specified in claim 3, wherein the code communication apparatus located at both stations includes first means which are conditioned in accordance with the designation of the altitude selecting means and the reservation selecting means and which remain conditioned until the last changeable display indicator in the selected altitude has been operated, and the code communication apparatus located at each of said two stations includes second means which are conditioned during each cycle of operation in which corresponding indicators located at both stations are effectively operated and which are released following the operation of such indicators in order to permit the code communication apparatus located at both stations to be conditioned for the succeeding cycle of operation, said first means and said second means in combination being effective to cause the plurality of indicators in the selected altitude to be operated sequentially in accordance with the designation in sequence of several of the item selecting means.

5. An air traffic control system as specified in claim 4, wherein each of the changeable display indicators provided for each of the altitudes includes a plurality of changeable contacts operable to a plurality of opened and closed combinations characteristic of the different positions to which the indicator can be operated, and the code communication apparatus located at each of the stations includes means responsive to the positioning of the changeable contacts of an operated indicator for automatically releasing said second means following the indicator operation for each cycle of operation.

6. An air traffic control system as specified in claim 5, wherein the duplex line circuit includes a first similar means located at each station each simultaneously responsive to energization of such line circuit in one direction and a second similar means located at each station each simultaneously responsive to energization of such line circuit in the opposite direction, said first means and said second means located at both stations being adapted to be energized in a predetermined combination during transmission of the step by step control code in response to the designation of said altitude selecting means and said reservation means or an item selecting means for operating simultaneously the corresponding indicators located at the stations, said means responsive to the positioning of the changeable contacts of an operated indicator include other means which remain energized until the next indicator located in the altitude is initiated into operation, such other means being provided for causing the conditioning of the respective code communication apparatus in a prescribed manner.

7. An air traffic control system as specified in claim 6, wherein the control panel located at each of said two stations includes a cycle light means disposed thereon, said cycle light means located at the designating station being adapted to be illuminated during each cycle of operation for indicating at the designating station that the code communication apparatus is being conditioned in accordance with the designation of such selecting means and being adapted to be deenergized following the operation of each cycle for indicating that another item selecting means may be designated, the cycle light means located at the other station being adapted to be illuminated during the initial conditioning of the associated code communication apparatus thereat and remains illuminated for each succeeding cycle of operation to effectively indicate that the code communication apparatus is being conditioned in response to the designation of such buttons at the first station.

8. An air traffic control system as specified in claim 7, wherein the code communication apparatus located at each station includes normally energized lock out means adapted to effect the illumination of the cycle light located at the nondesignating station during the conditioning period and thereafter and clear out means responsive to the operation of the last positioned indicator in the selected altitude at both stations for automatically effecting the release of respective elements energized during the initial conditioning period and thereafter, said lock out means located at the nondesignating station being effectively energized to cause the cycle light thereat to be deenergized, the deenergization of the respective cycle lights being effective to convey to the respective controllers that all of the changeable display indicators in the selected altitude have been operated to desired positions and that the code communication apparatus located at the respective stations will be responsive to the designation of other appropriate button means.

9. An air traffic control system as specified in claim 2, wherein each of the plurality of changeable display indicators includes a plurality of changeable contacts operable to a plurality of opened and closed positional combinations representative of the different positions to which the indicator can be operated, means included with the code communication apparatus located at each station responsive to the designation of an altitude selecting means at one station for indicating the display position or reservation of the indicator in the selected altitude at that station through its changeable contacts, said code communication apparatus located at the designating station being adapted to be conditioned in accordance with the display position or reservation position of the affected indicator and the reservation designation for further conditioning the code communication apparatus at both stations to effect the operation of corresponding indicators in the selected altitude to reservation positions.

10. An air traffic control system of communication connecting two remotely spaced stations for facilitating the control of airplane flights comprising, in combination, normally at-rest code communication apparatus at each station, a control panel at each station having disposed thereon manually operable means for each of a plurality of altitudes for designating its respective altitude, manually operable means for designating reservation of each flight altitude, and a plurality of changeable display indicators corresponding in number to the altitudes, each said indicator including changeable contacts and an electroresponsive means, said electroresponsive means being provided for governing the operation of its indicator to the different opened and closed positional combinations of said changeable contacts for displaying indications representative of reservation designations, circuit means responsive to said altitude designating means and said reservation designation means for conditioning the code communication apparatus at said one station, a duplex line circuit for connecting the code communication apparatus at said two stations, said code communication apparatus being effective in response to its conditioning caused by said circuit means at one station to transmit a control code characteristic of a particular reservation designation and altitude designation for effecting the operation of the corresponding indicator for that altitude at the other station to display the desired reservation indication when the transmission of such control code is completed, the operation of such indicator being effective to cause the normally at-rest code communication apparatus at said other station to transmit a control code for effecting the operation of the corresponding altitude indicator at said one station to display a similar reservation indication.

11. An air traffic control system comprising, in combination, two remotely spaced stations, a line circuit connecting the two stations, a control panel located at each station having disposed thereon manually operable means for each of a plurality of altitudes each for selecting its respective altitude, manually operable means for designating reservation of each flight altitude in accordance with the designation of its said altitude selecting means, a plurality of manually operable means for selecting items of flight data, and a plurality of changeable display indicators for each altitude, the first of said indicators for each altitude being provided for displaying an indication representative of a reservation indication and the remaining indicators for each altitude being provided for displaying the items of flight data, normally at-rest code communication apparatus located at each station effective to transmit controls over said line circuit in response to selection of an altitude and to designation of a reservation at one station for effecting the operation of the corresponding indicators for that altitude at both stations to display the desired reservation indication, a plurality of means included with the code communication apparatus located at each station for effecting sequential operative control of the corresponding indicators for the altitude selected in response to the designation of the item selecting means for causing corresponding indicators to display similar items of flight data, said panel having disposed thereon manually operable corrective means for each group of flight data indicators assigned to a corresponding position in their respective flight altitudes, each said corrective means when designated being provided for causing the code communication apparatus located at each station to assume the characteristic condition for its assigned group of flight data indicators for permitting a different item of flight data to be displayed by the respective indicator in accordance with the designation of an item selecting means.

12. An air traffic control system as specified in claim 11, wherein the line circuit includes a first similar means located at each station each simultaneously responsive to energization of such line circuit in one direction and a second similar means located at each station each simultaneously responsive to energization of such line circuit in the opposite direction, one of said similar means being adapted to be energized and deenergized in response to designation of a corrective means for a predetermined number of times corresponding to the number of changeable display indicators including the last operated indicator and the remaining unoperated changeable display indicators in the selected altitude plus each indicator preceding the desired indicator in position, the energization and deenergization of said one similar means being effective to condition the plurality of means provided for effecting the sequential operative control of the indicators located at both stations to the position characteristic of the designated corrective means, thereby rendering the code communication apparatus located at both stations responsive to the designation of another item selecting means for causing the desired indicator to be operated to the desired position.

13. An air traffic control system as specified in claim 11, wherein the line circuits includes a first similar means located at each station each simultaneously responsive to energization of such line circuit in one direction and a second similar means located at each station each simultaneously responsive to energization of such line circuit in the opposite direction, one of said similar means being adapted to be energized and deenergized in response to designation of a corrective means for a predetermined number of times corresponding to the number of changeable display indicators preceding in position the indicator which is desired to be operated, the energization and deenergization of said one similar means being effective to condition the plurality of means provided for effecting the sequential operative control of the indicators located at both stations to the position characteristic of the designated corrective means, thereby rendering the code communication apparatus located at both stations responsive to the designation of another item selecting means for causing the desired indicator to be operated to the desired position.

14. An air traffic control system as specified in claim 11, wherein each of the plurality of corrective means includes a lamp means and a holding coil means, circuit means included with the code communication apparatus responsive to the designation of a corrective means for energizing the respective said lamp means and said holding coil means, said lamp means and said holding coil means being adapted to remain energized during the conditioning of the code communication apparatus located at both stations and deenergized when the code communication apparatus located at both stations is conditioned in a manner to be responsive to the designation of another item selecting means, thereby conveying to the controller at the designating station that such item selecting means may be designated.

15. An air traffic control system comprising, in combination, two remotely spaced stations, a line circuit connecting the two stations, a control panel located at each station having disposed thereon manually operable means for each of a plurality of altitudes each for selecting its respective altitude, manually operable means for designating reservation of each flight altitude in accordance with the designation of its said altitude selecting means, a plurality of manually operable means for selecting items of flight data, a plurality of changeable display indicators for each altitude, and a manually operable cancelling means for automatically effecting the clear out of the system while posting in a selected altitude, the first of said indicators for each altitude being provided for displaying an indication representative of a reservation indication and the remaining indicators for each altitude being provided for displaying the items of flight data, normally at-rest code communication apparatus located at each station effective to transmit controls over said line circuit in response to selection of an altitude and to designation of a reservation at one station for effecting the operation of the corresponding indicators for that altitude at both stations to display the desired reservation indication, a plurality of means included with the code communication apparatus located at each station for effecting sequential operative control of the corresponding indicators for the altitude selected in response to the designation of the items selecting means for causing corresponding indicators to display similar items of flight data, said cancelling means being adapted to be designated after an altitude has been selected, a reservation made and a given number of items of flight data has been posted in the respective indicators, said cancelling means when designated being provided for causing the code communication apparatus located at each station to assume the characteristic condition representative of at-rest condition for permitting the controller to designate other appropriate button means for providing desired operations of the system.

16. An air traffic control system as specified in claim 15, wherein the line circuit includes a first similar means located at each station each simultaneously responsive to energization of such line circuit in one direction and a second similar means located at each station each simultaneously responsive to energization of such line circuit in the opposite direction, one of said similar means being adapted to be energized and deenergized in response to designation of the cancelling means for a predetermined number of times corresponding to the number of changeable display indicators located in the selected altitude which were not operated, the code communication apparatus located at both stations includes means responsive to the deenergization of said one similar means during the last of the predetermined number of times for effecting the release of elements energized during the conditioning period of the system and thereafter, thereby rendering the system responsive to the designation of other appropriate button means.

17. An air traffic control system as specified in claim 16, wherein the cancelling means includes a lamp means and a holding coil means, circuit means included with the code communication apparatus responsive to the designation of the cancelling means for energizing said lamp means and said holding coil means, said lamp means and said holding coil means being adapted to remain energized during the predetermined number of times that said one similar means is energized and deenergized during the last of such predetermined number of times, such deenergization of the lamp means being effective to convey to the controller at the designating station that the system is being returned to its at rest condition.

18. An air traffic control system of communication connecting two remotely spaced stations for indicating occupancy of an altitude by an airplane flying under the supervision of a controller assigned to one of said stations comprising, in combination, a control panel at each station having disposed thereon manually operable means for each of a plurality of altitudes for selecting its respective altitude, manually operable means for designating occupancy of each flight altitude in accordance with the designated condition of its said altitude selecting means, and a plurality of changeable display indicators corresponding in number to the altitudes, each said indicator being provided for displaying distinctive occupancy indications for its assigned altitude at its respective station, norrmally at-rest code communication apparatus including a duplex line circuit effective to transmit in response to the selection of an altitude and to the designation of occupancy means at one station a step by step control code over the duplex line circuit from that station for effecting the operation of a corresponding indicator for that altitude at the other station to display a distinctive occupancy indication indicating occupancy of such altitude at said one station, said code communication apparatus at each station including circuit means for changing the control code transmitted from the designating station to the nondesignating station for less than the total number of steps to provide such distinctive occupancy indications for each station, the operation of such indicator being effective to cause the normally at rest code communication apparatus at said other station to transmit a step by step control code for effecting the operation of the corresponding indicator for that altitude selected at said one station to display another distinctive occupancy indication to indicate occupancy of that altitude controlled by said one station.

19. An air traffic control system comprising, in combination, two remotely spaced stations, a line circuit connecting the two stations, a control panel located at each station, said control panel having disposed thereon manually operable means for each of a plurality of altitudes for selecting its respective altitude, manually operable means for designating reservation of each flight altitude in accordance with the designated condition of its said altitude selecting means, a plurality of manually operable means for selecting items of flight data, manually operable transfer means for each of a plurality of altitudes for transferring the items of flight data from one altitude to another altitude, and a plurality of changeable display indicators for each altitude, the first of said indicators for each altitude being provided for displaying a symbol representative of a reservation indication and the remaining indicators for each altitude being provided for displaying the items of flight data, normally at-rest code communication apparatus at each station effective to transmit in response to selection of an altitude and to designation of a reservation at one station a step by step control code characteristic of that selected altitude and reservation over the line circuit from that station for effecting the operation of the corresponding indicator for that altitude at the other station to display the desired reservation indication when the transmission of such code is completed, the effective operation of such indicator being effective to cause the normally at-rest code communication apparatus at said other station to transmit a similar code for effecting the operation of the corresponding altitude indicator at said one station to displaying a similar reservation indication, a plurality of means included with the code communication apparatus at each station for effecting sequential operative control of the indicators for the altitude selected in response to the selection of flight data for displaying items of flight data therein, said transfer means when designated being effective for its assigned altitude in accordance with the designation of said altitude selecting means for another altitude and said altitude reservation means at one station to condition the respective code communication apparatus for causing transfer of flight data from the display indicators corresponding to said altitude selecting means to the display indicators corresponding to said transfer means.

20. An air traffic control system as specified in claim 19, wherein each of the plurality of changeable display indicators includes a plurality of changeable contacts operable to a plurality of opened and closed positional combinations characteristic of the different positions to which the indicator can be operated, means included with the code communication apparatus at the designating station responsive to the designation of an altitude selector means for determining the position of the first indicator in the selected altitude through its changeable contacts, said code communication apparatus located at the designating station being effective to be conditioned in accordance with the determined position of the first indicator, said code communication apparatus located at the designating station including circuit means responsive to the designation of a said transfer means and the respective conditioning of said code communication apparatus for effecting the transfer of items of flight data from the indicators corresponding to the transfer means to the indicators corresponding to the altitude selector means.

21. An air traffic control system as specified in claim 20, wherein the designation of the altitude selector means and reservation means is effective to cause the code communication apparatus located at both stations to be conditioned in accordance with the display position of the first indicator located at the designating station in the selected altitude for causing the affected changeable display indicators at both stations to be operated to the position characteristic of the reservation means designated, said circuit means responsive to the designation of said transfer means being effective to initiate a plurality of cycles of operation in sequence in accordance with the operation of said sequential control means, each such cycle of operation being initiated following the release of elements conditioned during the preceding cycle of operation and characteristic thereof, said code communication apparatus located at both stations being effectively conditioned for each cycle of operation in accordance wtih the position of the changeable contacts of the respective indicators corresponding to the designated transfer means for causing the corresponding indicators located at both stations corresponding to the designated altitude selector means for the respective cycles of operation to be operated to positions similar to those of the respective indicators associated with the designated transfer means.

22. An air traffic control system as specified in claim 21, wherein the code communication apparatus located at the designating station includes circuit means responsive to the designation of the transfer means thereat during each of the cycles of operation effective to condition such code communication apparatus located at the designating station in a manner analogous to a station receiving controls from another station for causing the operation of the corresponding indicators during the respective cycles of operation in a similar manner, said circuit means responsive to the designation of the designated transfer means being effective to maintain a cycle light energized throughout all of the cycles of operation, a similar cycle light located at the nondesignating station being adapted to be maintained energized for a similar period, each such cycle light being effective to convey to its respective controller that the respective code communication apparatus is being conditioned for the sequential transfer operation as indicated by the indicator operations.

23. An air traffic control system as specified in claim 22, wherein each of the plurality of transfer means has included therewith a holding coil means and a lamp means, circuit means included with the respective code communication apparatus responsive to designation of the respective transfer means for energizing its holding coil means and lamp means, said holding coil means and said lamp means being adapted to be energized throughout all of the cycles of operation and adapted to be deenergized following the completion of the last cycle of operation wherein a transfer operation is effected for conveying respectively to the controller at the designating station that the transfer of items of flight data is being effected from one designated row of indicators to another designated row of indicators and that such transfer has been completed between the respective indicators.

24. An air traffic control system as specified in claim 19, wherein designation of the reservation means is effective to cause the first of said indicators located at both stations in the selected altitude to display distinctive symbols, each of such symbols being effective to convey certain information concerning the selected altitude to the respective controllers, said code communication apparatus located at the designating station including means responsive to the operation of the affected indicator to thereby condition such code communication apparatus thereat in a prescribed manner, said code communication apparatus located at the designating station including means responsive to the designation of said transfer means corresponding to another row of indicators for effectively controlling the operation of each of the indicators in the selected altitude at the designating station to positions similar to the positions of the corresponding indicators located in the row of indicators corresponding to the designated transfer button.

25. An air traffic control system as specified in claim 24, wherein each of the plurality of indicators has associated therewith a motor controlling circuit effective when energized to operate its indicator to a plurality of display positions and has a plurality of changeable contacts, said code communication apparatus located at the designating station has included therewith means responsive to the designation of the transfer means and the conditioning of the code communication apparatus following the operation of the first indicator, said means when energized being effective to cause the energization of each of the plurality of sequential control means, energization of said sequential control means being adapted to energize the respective motor controlling circuits for the indicators located in the selected altitude, each such motor control circuit being adapted to be responsive to energy supplied over respective sets of buses and through its changeable contacts in accordance with the closed changeable contacts of the respective indicators corresponding to the designated transfer means for operating the respective indicators to corresponding positions.

26. An air traffic control system as specified in claim 25, wherein each of said plurality of sequential control means is adapted to be energized simultaneously with each of the others for causing simultaneous energization of the motor controlling circuits associated with the indicators in the selected altitude, each set of buses being adapted to be energized simultaneously for causing the operation of each of the affected indicators in the selected altitude to be initiated simultaneously and to be completed within a given period of time consistent with the characteristics of the indicators.

27. An air traffic control system as specified in claim 26, wherein each of the plurality of transfer means has included therewith a holding coil means and a lamp means, circuit means included with the respective code communication apparatus responsive to designation of the respective transfer means for energizing its holding coil and lamp means, said holding coil means and said lamp means being adapted to be energized throughout the given period of time required to operate all of the affected indicators, said panel including manually operable means adapted to be designated for causing the code communication apparatus located at the designating station to be positioned to its at-rest condition, the designation of said means being effective to cause the elements included with the code communication apparatus responsive to the designation of the altitude selecting means, reservation means and transfer means to be released to thereby deenergize the holding coil means and the lamp means, whereby information is conveyed to the controller at the designating station that the transfer operations have been completed and the code communication apparatus thereat is being cleared out.

28. An air traffic control system comprising, in combination, two remotely spaced stations, a line circuit connecting the two stations, a control panel located at each station, said control panel having disposed thereon manually operable means for each of a plurality of altitudes for selecting its respective altitude, manually operable means for designating reservation of each flight altitude in accordance with the designated condition of its said altitude selecting means, a plurality of manually operable means for selecting items of flight data, a plurality of changeable display indicators for each altitude, and a manually operable blanking means for causing each of the changeable display indicators in a selected altitude to be operated to a blank position, the first of said indicators for each altitude being provided for displaying a symbol representative of a reservation indication and the remaining indicators for each altitude being provided for displaying the items of flight data, normally at-rest code communication apparatus located at each station effective to transmit in response to selection of an altitude and to designation of a reservation at one station a step by step control code characteristic of that selected altitude and reservation over the line circuit from that station for effecting the operation of the corresponding indicator for that altitude at the other station to display the desired reservation indication when the transmission of such code is completed, the effective operation of such indicator being effective to cause the normally at-rest code communication apparatus at said other station to transmit a control code for effecting the operation of the corresponding altitude indicator at said one station to display a similar reservation indication, a plurality of means included with the code communication apparatus at each station for effecting sequential operative control of the indicators for the altitude selected in response to the selection of flight data for displaying items of flight data therein, said blanking means when designated being effective in accordance with the designation of an altitude selecting means to cause the code communication apparatus at both stations to be conditioned in a prescribed manner for causing all of the indicators in the selected altitude at both stations to be operated to the blank position.

29. An air traffic control system as specified in claim 28, wherein the code communication apparatus located at both stations is adapted to be conditioned in response to the designation of an altitude selecting means and said blanking means in a prescribed manner for causing all of the affected indicators located at the nondesignated station to be operated to their blank positions, the effective operation of all of such indicators being effective to further condition the code communication apparatus located at both stations for causing all of the affected indicators located at the designating station to be operated to the blank position.

30. An air traffic control system as specified in claim 29, wherein the code communication apparatus located at both stations includes blanking circuit means and a plurality of sets of buses connected to a common set of control buses, one set of said sets of buses being provided for the indicators having corresponding positions in the respective altitudes, said blanking circuit means being effective in response to the designation of the altitude selecting means and blanking means and the subsequent conditioning of the respective code communication apparatus to further condition the respective code communication apparatus for effectively energizing the common set of buses in a predetermined manner for simultaneously initiating the operation of each of the indicators in the selected altitude, said blanking circuit means being effective during tht further conditioning of the respective code communication apparatus to energize each of the plurality of sequential control means, thereby effectively operating all of said indicators to their blank positions in a manner consistent with the characteristics of the respective indicators.

31. In an air traffic control system, two remotely spaced stations, a control panel disposed at each of said stations having disposed thereon a plurality of manually operable means, a plurality of lamps and a plurality of changeable display indicators, a normally at-rest code communication apparatus at each station and a line circuit for connecting the respective code communication apparatus, each said code communication apparatus being responsive to the designation of selected manually operable means for transmitting controls between the two stations for operating the indicators and lights in a predetermined manner, said control panel located at each of said stations includes therewith a manually operable reset means disposed thereon, each said reset means being effective when designated to cause the operation of a clear out means included with the respective code communication apparatus to thereby cause the respective code communication apparatus to be positioned to its at-rest condition, each said reset means being effectively utilized at desirable times following either a normal or abnormal operation of the respective code communication apparatus in response to designation of selected manually operable means at one of said stations.

References Cited in the file of this patent

UNITED STATES PATENTS

| | | |
|---|---|---|
| 2,399,777 | Wight | May 7, 1946 |
| 2,626,382 | Coley | Jan. 20, 1953 |
| 2,838,749 | Rumler | June 10, 1958 |
| 2,848,707 | Emmel | Aug. 19, 1958 |
| 2,903,675 | Downey | Sept. 8, 1959 |
| 2,910,238 | Miles | Oct. 27, 1959 |